United States Patent
Lin et al.

(10) Patent No.: US 11,161,301 B2
(45) Date of Patent: *Nov. 2, 2021

(54) VISCOUS FILM THREE-DIMENSIONAL PRINTING SYSTEMS AND METHODS

(71) Applicant: HOLO, INC., Newark, CA (US)

(72) Inventors: Pierre Lin, San Francisco, CA (US); Jonathan Pomeroy, San Francisco, CA (US); Arian Aghababaie, San Francisco, CA (US); Brian Adzima, Hayward, CA (US)

(73) Assignee: HOLO, INC., Newark, CA (US)

( * ) Notice: Subject to any disclaimer, the term of this patent is extended or adjusted under 35 U.S.C. 154(b) by 13 days.

This patent is subject to a terminal disclaimer.

(21) Appl. No.: 16/539,333

(22) Filed: Aug. 13, 2019

(65) Prior Publication Data

US 2020/0031044 A1    Jan. 30, 2020

Related U.S. Application Data

(63) Continuation of application No. 16/016,257, filed on Jun. 22, 2018, now Pat. No. 10,464,259, which is a
(Continued)

(51) Int. Cl.
*B29C 64/214* (2017.01)
*B29C 64/165* (2017.01)
(Continued)

(52) U.S. Cl.
CPC .......... *B29C 64/214* (2017.08); *B29C 64/165* (2017.08); *B29C 64/209* (2017.08);
(Continued)

(58) Field of Classification Search
CPC ... B29C 64/124; B29C 64/214; B29C 64/129; B29C 64/135
See application file for complete search history.

(56) References Cited

U.S. PATENT DOCUMENTS

| 4,252,887 A | 2/1981 | Dessauer et al. |
| 4,269,933 A | 5/1981 | Pazos et al. |

(Continued)

FOREIGN PATENT DOCUMENTS

| CN | 1418974 A | 5/2003 |
| CN | 1916034 A | 2/2007 |

(Continued)

OTHER PUBLICATIONS

"Final Office action dated Jan. 7, 2019 for U.S. Appl. No. 14/967,055".
(Continued)

*Primary Examiner* — Galen H Hauth
(74) *Attorney, Agent, or Firm* — Wilson Sonsini Goodrich & Rosati

(57) ABSTRACT

The present disclosure provides a system for printing a three-dimensional object. The system may comprise an open platform configured to hold a film of a viscous liquid comprising a photoactive resin. The open platform may comprise a print window. The system may comprise a deposition head comprising a nozzle in fluid communication with a source of the viscous liquid. The deposition head may be configured to move across the platform and deposit the film over the print window. The system may use multiple viscous liquids. The system may comprise an optical source that provides light through the print window for curing at least a portion of the film of the viscous liquid. The system may comprise a controller operatively coupled to direct movement of the deposition head and projection of the light, thereby printing at least a portion of the 3D object.

31 Claims, 10 Drawing Sheets

Related U.S. Application Data continuation of application No. PCT/US2018/032837, filed on May 15, 2018.

(60) Provisional application No. 62/506,523, filed on May 15, 2017.

(51) Int. Cl.

| | | |
|---|---|---|
| *B29C 64/209* | (2017.01) | |
| *B29C 64/35* | (2017.01) | |
| *B29C 64/357* | (2017.01) | |
| *B29C 64/264* | (2017.01) | |
| *B29C 64/393* | (2017.01) | |
| *B29C 64/218* | (2017.01) | |
| *B33Y 70/00* | (2020.01) | |
| *B33Y 10/00* | (2015.01) | |
| *B33Y 30/00* | (2015.01) | |
| *B33Y 50/02* | (2015.01) | |

(52) U.S. Cl.
CPC .......... *B29C 64/218* (2017.08); *B29C 64/264* (2017.08); *B29C 64/35* (2017.08); *B29C 64/357* (2017.08); *B29C 64/393* (2017.08); *B33Y 10/00* (2014.12); *B33Y 30/00* (2014.12); *B33Y 50/02* (2014.12); *B33Y 70/00* (2014.12)

(56) References Cited

U.S. PATENT DOCUMENTS

| | | | |
|---|---|---|---|
| 4,801,477 A | | 1/1989 | Fudim |
| 4,814,370 A | | 3/1989 | Kramer et al. |
| 4,961,154 A | | 10/1990 | Pomerantz et al. |
| 5,006,364 A | * | 4/1991 | Fan ................... B29C 64/135 427/510 |
| 5,096,530 A | | 3/1992 | Cohen |
| 5,137,662 A | | 8/1992 | Hull et al. |
| 5,143,668 A | | 9/1992 | Hida et al. |
| 5,182,056 A | | 1/1993 | Spence et al. |
| 5,184,307 A | | 2/1993 | Hull et al. |
| 5,236,326 A | | 8/1993 | Grossa |
| 5,248,456 A | | 9/1993 | Evans, Jr. et al. |
| 5,330,701 A | | 7/1994 | Shaw et al. |
| 5,474,719 A | | 12/1995 | Fan et al. |
| 5,531,958 A | | 7/1996 | Krueger |
| 5,545,367 A | | 8/1996 | Bae et al. |
| 5,656,297 A | | 8/1997 | Bernstein et al. |
| 5,676,745 A | | 10/1997 | Kelly et al. |
| 5,877,270 A | | 3/1999 | Takayama et al. |
| 5,902,537 A | * | 5/1999 | Almquist ............ B33Y 40/00 264/401 |
| 5,922,507 A | | 7/1999 | Van et al. |
| 5,998,496 A | | 12/1999 | Hassoon et al. |
| 6,090,865 A | | 7/2000 | Dudman et al. |
| 6,093,761 A | | 7/2000 | Schofalvi et al. |
| 6,100,007 A | | 8/2000 | Pang et al. |
| 6,204,316 B1 | | 3/2001 | Schofalvi et al. |
| 6,259,962 B1 | | 7/2001 | Gothait |
| 6,376,585 B1 | | 4/2002 | Schofalvi et al. |
| 6,399,010 B1 | | 6/2002 | Guertin et al. |
| 6,658,314 B1 | | 12/2003 | Gothait |
| 6,664,354 B2 | | 12/2003 | Savu et al. |
| 6,780,472 B2 | | 8/2004 | Hamrock et al. |
| 6,833,043 B1 | | 12/2004 | Parsonage et al. |
| 6,846,862 B2 | | 1/2005 | Schofalvi et al. |
| 6,850,334 B1 | | 2/2005 | Gothait |
| 6,852,781 B2 | | 2/2005 | Savu et al. |
| 7,022,410 B2 | | 4/2006 | Tonapi et al. |
| 7,079,915 B2 | * | 7/2006 | Huang ................ B29C 64/129 700/119 |
| 7,101,618 B2 | | 9/2006 | Coggio et al. |
| 7,173,778 B2 | | 2/2007 | Jing et al. |
| 7,195,472 B2 | | 3/2007 | John |
| 7,209,797 B2 | | 4/2007 | Kritchman et al. |
| 7,223,826 B2 | | 5/2007 | Ali et al. |
| 7,267,850 B2 | | 9/2007 | Coggio et al. |
| 7,288,469 B2 | | 10/2007 | Sharma et al. |
| 7,288,514 B2 | | 10/2007 | Scheuing et al. |
| 7,332,217 B2 | | 2/2008 | Coggio et al. |
| 7,417,099 B2 | | 8/2008 | Savu et al. |
| 7,433,627 B2 | | 10/2008 | German et al. |
| 7,438,846 B2 | | 10/2008 | John |
| 7,491,441 B2 | | 2/2009 | Pokorny et al. |
| 7,511,008 B2 | | 3/2009 | Scheuing et al. |
| 7,575,847 B2 | | 8/2009 | Jing et al. |
| 7,632,560 B2 | | 12/2009 | Filippini Fantoni et al. |
| 7,662,896 B2 | | 2/2010 | Savu et al. |
| 7,718,264 B2 | | 5/2010 | Klun et al. |
| 7,845,930 B2 | | 12/2010 | Shkolnik et al. |
| 7,907,878 B2 | | 3/2011 | Takagi et al. |
| 7,912,411 B2 | | 3/2011 | Takagi et al. |
| 7,961,154 B2 | | 6/2011 | Qi et al. |
| 8,110,135 B2 | | 2/2012 | El-Siblani et al. |
| 8,133,551 B2 | | 3/2012 | Claes |
| 8,147,966 B2 | | 4/2012 | Klun et al. |
| 8,372,330 B2 | | 2/2013 | El-Siblani et al. |
| 8,372,913 B2 | | 2/2013 | Claes |
| 8,394,313 B2 | | 3/2013 | Shkolnik et al. |
| 8,476,398 B2 | | 7/2013 | Klun et al. |
| 8,551,285 B2 | | 10/2013 | Ho et al. |
| 8,623,264 B2 | | 1/2014 | Rohner et al. |
| 8,696,971 B2 | | 4/2014 | Boot et al. |
| 8,716,377 B2 | | 5/2014 | Taden et al. |
| 8,729,211 B2 | | 5/2014 | Klun et al. |
| 8,734,715 B2 | | 5/2014 | Miller et al. |
| 8,741,203 B2 | | 6/2014 | Liska et al. |
| 8,753,464 B2 | | 6/2014 | Khanna |
| 8,753,714 B2 | | 6/2014 | Cheung et al. |
| 8,801,418 B2 | | 8/2014 | Ali et al. |
| 8,829,070 B2 | | 9/2014 | Morita et al. |
| 8,859,642 B2 | | 10/2014 | Miyamoto |
| 8,916,335 B2 | | 12/2014 | Kitano et al. |
| 9,108,358 B1 | | 8/2015 | Herloski et al. |
| 9,120,270 B2 | | 9/2015 | Chen et al. |
| 9,205,601 B2 | | 12/2015 | Desimone et al. |
| 9,211,678 B2 | | 12/2015 | Desimone et al. |
| 9,216,546 B2 | | 12/2015 | Desimone et al. |
| 9,306,218 B2 | | 4/2016 | Pyun et al. |
| 9,360,757 B2 | | 6/2016 | Desimone et al. |
| 9,367,049 B2 | | 6/2016 | Jariwala et al. |
| 9,415,418 B2 | | 8/2016 | Sreenivasan et al. |
| 9,452,567 B2 | | 9/2016 | Syao et al. |
| 9,453,142 B2 | | 9/2016 | Rolland et al. |
| 9,486,944 B2 | | 11/2016 | El-Siblani et al. |
| 9,492,969 B2 | | 11/2016 | Spadaccini et al. |
| 9,498,920 B2 | | 11/2016 | Desimone et al. |
| 9,527,244 B2 | | 12/2016 | El-Siblani et al. |
| 9,533,450 B2 | | 1/2017 | El-Siblani et al. |
| 9,561,623 B2 | | 2/2017 | El-Siblani et al. |
| 9,567,439 B1 | | 2/2017 | Pyun et al. |
| 9,598,606 B2 | | 3/2017 | Rolland et al. |
| 9,676,963 B2 | | 6/2017 | Rolland et al. |
| 9,718,096 B2 | | 8/2017 | Sreenivasan et al. |
| 9,782,934 B2 | | 10/2017 | Willis et al. |
| 9,796,138 B2 | | 10/2017 | Liska et al. |
| 9,833,839 B2 | | 12/2017 | Gibson et al. |
| 9,975,295 B2 | | 5/2018 | Rolland et al. |
| 9,975,296 B2 | | 5/2018 | El-Siblani et al. |
| 9,982,164 B2 | | 5/2018 | Rolland et al. |
| 9,987,653 B2 | | 6/2018 | Sreenivasan et al. |
| 9,987,804 B2 | | 6/2018 | El-Siblani et al. |
| 9,993,974 B2 | | 6/2018 | Desimone et al. |
| 10,011,076 B2 | | 7/2018 | El-Siblani et al. |
| 10,016,938 B2 | | 7/2018 | Desimone et al. |
| 10,072,921 B2 | | 9/2018 | Fu et al. |
| 10,073,424 B2 | | 9/2018 | Lin et al. |
| 10,150,280 B2 | | 12/2018 | Aghababaie et al. |
| 10,166,725 B2 | | 1/2019 | Willis et al. |
| 10,213,956 B2 | | 2/2019 | Willis et al. |
| 10,245,785 B2 | | 4/2019 | Adzima |
| 10,354,445 B2 | | 7/2019 | Greene et al. |
| 10,421,233 B2 | * | 9/2019 | Lin ................ B29C 64/35 |
| 10,464,259 B2 | * | 11/2019 | Lin ................ B29C 64/393 |

(56) References Cited

U.S. PATENT DOCUMENTS

| | | |
|---|---|---|
| 2001/0035597 A1 | 11/2001 | Grigg et al. |
| 2003/0043360 A1 | 3/2003 | Farnworth |
| 2003/0114936 A1* | 6/2003 | Sherwood ........... A61F 2/30942 623/23.58 |
| 2004/0138049 A1 | 7/2004 | Yasrebi et al. |
| 2004/0187714 A1 | 9/2004 | Napadensky et al. |
| 2006/0054039 A1 | 3/2006 | Kritchman et al. |
| 2006/0163774 A1 | 7/2006 | Abels et al. |
| 2006/0257785 A1 | 11/2006 | Johnson |
| 2007/0264481 A1 | 11/2007 | DeSimone et al. |
| 2008/0169586 A1 | 7/2008 | Hull et al. |
| 2008/0181977 A1 | 7/2008 | Sperry et al. |
| 2008/0252682 A1 | 10/2008 | Hernandez et al. |
| 2009/0196946 A1 | 8/2009 | Kihara et al. |
| 2009/0304952 A1 | 12/2009 | Kritchman |
| 2010/0028994 A1 | 2/2010 | Desimone et al. |
| 2010/0029801 A1 | 2/2010 | Moszner et al. |
| 2010/0125356 A1 | 5/2010 | Shkolnik et al. |
| 2010/0173096 A1 | 7/2010 | Kritchman et al. |
| 2011/0089610 A1 | 4/2011 | El-Siblani et al. |
| 2011/0181941 A1 | 7/2011 | Henningsen |
| 2011/0182805 A1 | 7/2011 | Desimone et al. |
| 2011/0287185 A1 | 11/2011 | Felstead et al. |
| 2011/0310370 A1 | 12/2011 | Rohner et al. |
| 2011/0318595 A1 | 12/2011 | Breiner et al. |
| 2012/0046376 A1 | 2/2012 | Loccufier et al. |
| 2012/0107625 A1 | 5/2012 | Smith et al. |
| 2012/0195994 A1* | 8/2012 | El-Siblani ............. B29C 64/124 425/174.4 |
| 2013/0000553 A1 | 1/2013 | Hoechsmann et al. |
| 2013/0001834 A1 | 1/2013 | El-Siblani et al. |
| 2013/0056910 A1 | 3/2013 | Houbertz-Krauss et al. |
| 2013/0123988 A1 | 5/2013 | Jariwala et al. |
| 2013/0252178 A1 | 9/2013 | Mcleod et al. |
| 2013/0336884 A1 | 12/2013 | Desimone et al. |
| 2014/0084517 A1* | 3/2014 | Sperry ................. B29C 64/245 264/406 |
| 2014/0265032 A1 | 9/2014 | Teicher et al. |
| 2014/0339741 A1 | 11/2014 | Aghababaie et al. |
| 2014/0361463 A1 | 12/2014 | Desimone et al. |
| 2015/0019000 A1 | 1/2015 | Nakamura |
| 2015/0064298 A1 | 3/2015 | Syao et al. |
| 2015/0072293 A1 | 3/2015 | Desimone et al. |
| 2015/0077215 A1 | 3/2015 | Ranky et al. |
| 2015/0097315 A1 | 4/2015 | Desimone et al. |
| 2015/0097316 A1 | 4/2015 | Desimone et al. |
| 2015/0102532 A1 | 4/2015 | Desimone et al. |
| 2015/0183168 A1 | 7/2015 | Liverman et al. |
| 2015/0202805 A1 | 7/2015 | Saruhashi et al. |
| 2015/0224710 A1 | 8/2015 | El-Siblani et al. |
| 2015/0231828 A1 | 8/2015 | El-Siblani et al. |
| 2015/0231831 A1 | 8/2015 | El-Siblani |
| 2015/0273632 A1 | 10/2015 | Chen |
| 2015/0287169 A1 | 10/2015 | Ueda et al. |
| 2015/0290881 A1 | 10/2015 | Ederer et al. |
| 2015/0328839 A1 | 11/2015 | Willis et al. |
| 2015/0331402 A1 | 11/2015 | Lin et al. |
| 2015/0343745 A1 | 12/2015 | Pesek et al. |
| 2015/0344682 A1 | 12/2015 | Ganapathiappan et al. |
| 2015/0360419 A1 | 12/2015 | Willis et al. |
| 2016/0023403 A1 | 1/2016 | Ramos et al. |
| 2016/0023467 A1 | 1/2016 | Din et al. |
| 2016/0046075 A1 | 2/2016 | Desimone et al. |
| 2016/0059484 A1 | 3/2016 | Desimone et al. |
| 2016/0059486 A1 | 3/2016 | Desimone et al. |
| 2016/0059487 A1 | 3/2016 | Desimone et al. |
| 2016/0067921 A1 | 3/2016 | Willis et al. |
| 2016/0121547 A1 | 5/2016 | Kobayashi |
| 2016/0122539 A1 | 5/2016 | Okamoto et al. |
| 2016/0131974 A1 | 5/2016 | Abe et al. |
| 2016/0136889 A1 | 5/2016 | Rolland et al. |
| 2016/0141535 A1 | 5/2016 | Snaith et al. |
| 2016/0158889 A1 | 6/2016 | Carter et al. |
| 2016/0160077 A1 | 6/2016 | Rolland et al. |
| 2016/0164031 A1 | 6/2016 | Pieper et al. |
| 2016/0167301 A1 | 6/2016 | Cole et al. |
| 2016/0170218 A1 | 6/2016 | Johnson et al. |
| 2016/0193786 A1 | 7/2016 | Moore et al. |
| 2016/0200052 A1 | 7/2016 | Moore et al. |
| 2016/0214321 A1 | 7/2016 | Tow et al. |
| 2016/0271870 A1 | 9/2016 | Brown, Jr. et al. |
| 2016/0271875 A1 | 9/2016 | Brown, Jr. et al. |
| 2016/0303793 A1 | 10/2016 | Ermoshkin et al. |
| 2016/0303795 A1 | 10/2016 | Liu et al. |
| 2016/0325493 A1 | 11/2016 | Desimone et al. |
| 2016/0332386 A1 | 11/2016 | Kuijpers |
| 2016/0368054 A1 | 12/2016 | Ng et al. |
| 2016/0368210 A1 | 12/2016 | Chen et al. |
| 2016/0368221 A1 | 12/2016 | Ueda et al. |
| 2017/0015058 A1 | 1/2017 | Ueda et al. |
| 2017/0021562 A1 | 1/2017 | El-Siblani et al. |
| 2017/0022312 A1 | 1/2017 | Liu et al. |
| 2017/0028644 A1* | 2/2017 | Evans .................. B29C 64/118 |
| 2017/0080641 A1 | 3/2017 | El-Siblani |
| 2017/0087765 A1 | 3/2017 | Rundlett et al. |
| 2017/0087769 A1 | 3/2017 | Lancaster-Larocque et al. |
| 2017/0106399 A1 | 4/2017 | Sreenivasan et al. |
| 2017/0106603 A1 | 4/2017 | Pobihun |
| 2017/0113406 A1 | 4/2017 | Chen et al. |
| 2017/0113416 A1 | 4/2017 | Desimone et al. |
| 2017/0120326 A1 | 5/2017 | Heikkila et al. |
| 2017/0120515 A1 | 5/2017 | Rolland et al. |
| 2017/0151718 A1 | 6/2017 | Rolland et al. |
| 2017/0173881 A1 | 6/2017 | Dachs, II et al. |
| 2017/0182708 A1 | 6/2017 | Lin et al. |
| 2017/0210077 A1 | 7/2017 | Ermoshkin et al. |
| 2017/0239887 A1 | 8/2017 | Rolland et al. |
| 2017/0246660 A1 | 8/2017 | Thompson et al. |
| 2017/0246804 A1 | 8/2017 | El-Siblani et al. |
| 2017/0291356 A1 | 10/2017 | Adachi et al. |
| 2017/0297099 A1 | 10/2017 | Gibson et al. |
| 2017/0334129 A1 | 11/2017 | Ebert et al. |
| 2017/0342182 A1 | 11/2017 | Pesek et al. |
| 2017/0369633 A1 | 12/2017 | Caruso Dailey et al. |
| 2018/0001552 A1 | 1/2018 | Dachs, II et al. |
| 2018/0015669 A1 | 1/2018 | Moore et al. |
| 2018/0044448 A1 | 2/2018 | Moser et al. |
| 2018/0071977 A1 | 3/2018 | Tumbleston et al. |
| 2018/0079865 A1 | 3/2018 | Pyun et al. |
| 2018/0100037 A1 | 4/2018 | Pyun |
| 2018/0105649 A1 | 4/2018 | Pyun et al. |
| 2018/0126630 A1 | 5/2018 | Panzer et al. |
| 2018/0126631 A1 | 5/2018 | Nauka et al. |
| 2018/0133959 A1 | 5/2018 | Moore et al. |
| 2018/0162047 A1 | 6/2018 | Gibson et al. |
| 2018/0162048 A1 | 6/2018 | Gibson et al. |
| 2018/0194066 A1 | 7/2018 | Ramos et al. |
| 2018/0200948 A1 | 7/2018 | Kuijpers et al. |
| 2018/0208686 A1 | 7/2018 | Pyun et al. |
| 2018/0333911 A1 | 11/2018 | Lin |
| 2018/0333912 A1 | 11/2018 | Lin |
| 2018/0333913 A1 | 11/2018 | Lin |
| 2018/0348646 A1 | 12/2018 | Lin et al. |
| 2018/0361666 A1 | 12/2018 | Adzima |
| 2019/0134886 A1 | 5/2019 | Willis et al. |
| 2019/0176398 A1 | 6/2019 | Adzima |
| 2019/0210285 A1 | 7/2019 | Tomioka et al. |
| 2019/0212572 A1 | 7/2019 | Tomioka |
| 2019/0224918 A1 | 7/2019 | Zheng |
| 2019/0322033 A1 | 10/2019 | Willis et al. |

FOREIGN PATENT DOCUMENTS

| | | |
|---|---|---|
| CN | 101956091 A | 1/2011 |
| CN | 102171305 B | 7/2013 |
| CN | 103317140 A | 9/2013 |
| CN | 104609859 A | 5/2015 |
| CN | 104890245 A | 9/2015 |
| CN | 105081325 A | 11/2015 |
| CN | 105729812 A | 7/2016 |
| CN | 105922587 A | 9/2016 |
| CN | 104725050 B | 1/2017 |
| CN | 205889910 U | 1/2017 |
| CN | 104923781 B | 3/2017 |

(56) References Cited

FOREIGN PATENT DOCUMENTS

| | | |
|---|---|---|
| CN | 107573058 A | 1/2018 |
| CN | 110914058 A | 3/2020 |
| DE | 3926869 A1 | 2/1991 |
| EP | 3194145 A2 | 7/2017 |
| JP | 2010030322 A | 2/2010 |
| JP | 2017210620 A | 11/2017 |
| JP | 6241944 B2 | 12/2017 |
| KR | 20170005209 A | 1/2017 |
| WO | WO-0140866 A2 | 6/2001 |
| WO | WO-0200569 A2 | 1/2002 |
| WO | WO-2007020634 A2 | 2/2007 |
| WO | WO-2014126830 A2 | 8/2014 |
| WO | WO-2015031227 A1 | 3/2015 |
| WO | WO-2015107066 A1 | 7/2015 |
| WO | WO-2016022336 A2 | 2/2016 |
| WO | WO-2016094827 A1 | 6/2016 |
| WO | WO-2016123499 A1 | 8/2016 |
| WO | WO-2017009368 A1 | 1/2017 |
| WO | WO-2017011533 A1 | 1/2017 |
| WO | WO-2017051084 A1 | 3/2017 |
| WO | WO-2017053783 A1 | 3/2017 |
| WO | WO-2017066546 A1 | 4/2017 |
| WO | WO-2017112483 A2 | 6/2017 |
| WO | WO-2017112682 A1 | 6/2017 |
| WO | WO-2017112751 A1 | 6/2017 |
| WO | WO-2017210298 A1 | 12/2017 |
| WO | WO-2017214007 A1 | 12/2017 |
| WO | WO-2018006018 A1 | 1/2018 |
| WO | WO-2018006029 A1 | 1/2018 |
| WO | WO-2018047479 A1 | 3/2018 |
| WO | WO-2018081053 A1 | 5/2018 |
| WO | WO-2018094131 A1 | 5/2018 |
| WO | WO-2018102341 A1 | 6/2018 |
| WO | WO-2018106472 A1 | 6/2018 |
| WO | WO-2018213356 A1 | 11/2018 |
| WO | WO-2018232175 A1 | 12/2018 |
| WO | WO-2020139858 | 7/2020 |

OTHER PUBLICATIONS

U.S. Appl. No. 14/967,055 Office Action dated Jan. 7, 2019.
U.S. Appl. No. 16/016,257 Notice of Allowance dated Jul. 17, 2019.
U.S. Appl. No. 16/016,257 Office Action dated Mar. 21, 2019.
U.S. Appl. No. 16/016,257 Office Action dated Sep. 27, 2018.
U.S. Appl. No. 16/016,262 Notice of Allowance dated Jul. 5, 2019.
U.S. Appl. No. 16/276,148 Office Action dated May 20, 2019.
U.S. Appl. No. 15/374,734 Office Action dated Sep. 6, 2019.
Co-pending U.S. Appl. No. 16/842,082, filed Apr. 7, 2020.
GB1809886.3 Office Action dated May 16, 2019.
U.S. Appl. No. 15/983,962 Notice of Allowance dated Dec. 20, 2018.
U.S. Appl. No. 15/374,734 Office Action dated Feb. 26, 2020.
U.S. Appl. No. 16/202,039 Office Action dated Apr. 15, 2020.
U.S. Appl. No. 16/276,148 Office Action dated Nov. 29, 2019.
"Anilox." Wikipedia, Wikimedia Foundation, May 16, 2018, en.wikipedia.org/wiki/Anilox.
"Capabilities." Technical Coatings International Capabilities, Mar. 14, 2017, http://www.tciinc.com/capabilities/.
"Flexography." Wikipedia, Wikimedia Foundation, May 23, 2018, en.wikipedia.org/wiki/Flexography.
"Reverse Roll Coating." Wikipedia, Wikimedia Foundation, Apr. 10, 2018, en.wikipedia.org/wiki/Reverse_roll_coating.
"Screen Printing." Wikipedia, Wikimedia Foundation, May 17, 2018, en.wikipedia.org/wiki/Screen_printing#1960s_to_present.
"Spin Coating." Wikipedia, Wikimedia Foundation, Apr. 10, 2018, en.wikipedia.org/wiki/Spin_coating.
Amine photochemical coinitiators, [online] [Retrieved on Aug. 4, 2014]; Retrieved from the Internet URL: httQ://www.sigmaaldrich.com/materials-science/material-scienceproducts. htrnl?TablePage=20204246; 2 pages.
Benoit, et al. Development of a universal alkoxyamine for 'living' free radical polymerizations. J. Am. Chem. Soc., 121 (1999): 3904-3920.
Berg, et al. A dual-cure, solid-state photoresist combining a thermoreversible Diels-Alder network and a chain growth acrylate network. Macromolecules, 47.10 (2014): 3473-3482.
Chen, et al. Novel multifunctional hyperbranched polymeric photoinitiators with built-in amine coinitiators for UV curing. J. Mater. Chem., 17 (2007): 3389-3392.
Coenen. Industry trends are boosting Jet Printing. 2015.
Corrales, et al. Free radical macrophotoinitiators: an overview on recent advances. Journal of Photochemistry and Photobiology A: Chemistry, 159 (2003): 103-114.
Deckers, et al. Additive Manufacturing of Ceramics: A Review, J. Ceram. Sci. Tech., 05 [04] 245-260 (2014).
Dendukuri, et al. Continuous-Flow Lithography For High-Throughput Microparticle Synthesis. Nature Materials, 5 (May 2006): 365-369.
Essemtec AG. Essemtec—Spider—Compact High Speed Jetterand Dispenser. YouTube Web Video. Published on Jul. 5, 2016. 2 pages. URL<https://www.youtube.com/watch?v=NpgBurid2wU.
Essemtec AG. Essemtec Scorpion—Versatile High Speed Jetting of Solder Paste and Glue. YouTube Web Video. Published on Nov. 13, 2014. 2 pages. URL<https://www.youtube.com/watch?v=SZ-Kq2Gkm5Y.
Fairbanks, et al. Photoinitiated polymerization ofPEG-diacrylate with lithium phenyl-2,4,6-trimethylbenzoylphosphinate: polymerization rate and cytocompatibility. Biomaterials, 30 (2009): 6702-6707.
German, et al. Injection Molding of Metals and Ceramics. Metal Powder Industries Federation, 1997.
Gonsalvi, et al. Novel synthetic pathways for bis(acyl)phosphine oxide photoinitiators. Angew. Chem. Int. Ed., 51 (2012): 7895-7897.
Green, Industrial photoinitiators—a technical guide, CRC Press, © 2010 Taylor and Francis Group, LLC, 191 pages.
Houben. Equipment for printing of high viscosity liquids and molten metals. Universiteit Twente. Sep. 27, 2012.
Ikemura, et al. Design of a new dental adhesive-effect of a water-soluble sodium acyl phosphine oxide with crown ether on adhesion to dental hard tissues. Dental Materials Journal, 28.3 (2009): 267-276.
Kloxin, et al. Photodegradable hydro gels for dynamic tuning of physical and chemical properties. Science, 324 (2009): 59-63.
Kyzen. Stencil Cleaning & Misprinted PCB Cleaners. 2018. http://www.kyzen.com/electronics-manufacturing-cleaning/stencils-and-misprints/.
Lambert, et al. Design considerations for mask projection microstereolithography systems. (Jun. 22, 2016) [online] (retrieved from https://sffsymposium.engr.utexas.edu/Manuscripts/2013/2013-09-Lambert.pdf), 20 pages.
Lee, et al. Solvent Compatibility of Poly(dimethylsiloxane)-Based Microfluidic Devices, Anal. Chem. 75 (2003): 6544-6554.
Massey, L. Permeability Properties of Plastics and Elastomers—A Guide to Packaging and Barrier Materials. Published Jan. 1, 2003. pp. 1-5, 19-29.
Matyjaszewski, et al. Atom transfer radical polymerization. Chem. Rev., 101 (2001): 2921-2990.
McDonald, et al. Fabrication ofmicrofluidic systems in poly(dimethylsiloxane). Electrophoresis, 21(2000): 27-40.
Miller. Slot Die Coating Technology. Aug. 3, 2009.
Moad, et al. Living radical polymerization by the RAFT process. Aust. J. Chern., 58 (2005): 379-410.
Murata, et al. Photopolymerization-induced phase separation in binary blends of photocurable/linear polymers. Polymer. vol. 43, Issue 9, Apr. 2002, pp. 2845-2859.
Myiconnect007. Taiyo's Inkjet Solder Mask Applied with Meyer Burger's PIXDRO IP410 Printer. YouTube Web Video. Published on Feb. 13, 2015. 2 pages. URL<https://www.youtube.com/watch?v=jm_JteEkQWE.
Organic photoinitiators, [online] [Retrieved on Aug. 4, 2014]; Retrieved from the Internet URL: httQ://www.sigmaaldrich.com/materials-science/material-scienceproducts.html?TablePage=16374997; 1 page.

(56) References Cited

OTHER PUBLICATIONS

Otsu, et al. Polymer design by iniferter technique in radical polymerization: synthesis of AB and ABA block copolymers containing random and alternating copolymer se_guences. Polymer Journal, 17.1 (1985): 97-104.

Pan, et al. Rapid manufacturing in minutes: the development of a mask projection stereolithography process for high-speed fabrication. Proceedings of the ASME 2012 International Manufacturing Science and Engineering Conferences, Jun. 4-8, 2012, Notre Dame, Indiana, US, 10 pages.

PCT/US2018/032837 International Search Report and Written Opinion dated Sep. 24, 2018.

PCT/US2018/037630 International Search Report and Written Opinion dated Oct. 3, 2018.

Pinnau, et al. Gas and vapor properties of amorphous perfluorinated copolymer membranes based on 2,2-bistrifluoromethyl-4,5-difluoro-1,3-dioxole/tetrafluoroethylene. Journal of Membrane Science, 109: 125-133 (1996).

RAFT agents, [online] [Retrieved on Aug. 4, 2014]; Retrieved from the Internet URL: h!!Q ://www. sigmaaldrich.com/materials-science/material-sc ienceproducts. htrnl?TablePage=I03936134; 4 pages.

Scott, et al. Two-color single-photon photoinitiation and photoinhibition for subdiffraction photolithography. Science, 324 (2009): 913-917.

Szczepanski, et al. A new approach to network heterogeneity: Polymerization Induced Phase Separation in photo-initiated, free-radical methacrylic systems. Polymer (Guildf). Sep. 28, 20128;53(21):4694-4701.

Temel, et al. Synthesis of main chain polymeric benzophenone photoinitiator via thiol-ene click chemistry and its use in free radical polymerization. J. Polym. Sci. A: Polym. Chern., 48 (2010): 5306-5312.

U.S. Appl. No. 14/711,703 Notice of Allowance dated Jun. 8, 2017.
U.S. Appl. No. 14/711,703 Office Action dated Apr. 22, 2016.
U.S. Appl. No. 14/711,703 Office Action dated Dec. 1, 2016.
U.S. Appl. No. 14/848,162 Notice of Allowance dated Octobers, 2018.
U.S. Appl. No. 14/848,162 Office Action dated Jun. 5, 2018.
U.S. Appl. No. 14/848,162 Office Action dated Sep. 18, 2017.
U.S. Appl. No. 14/967,055 Office Action dated May 19, 2017.
U.S. Appl. No. 14/967,055 Office Action dated Jul. 12, 2018.
U.S. Appl. No. 14/967,055 Office Action dated Nov. 1, 2017.
U.S. Appl. No. 15/983,962 Notice of Allowance dated Oct. 12, 2018.
U.S. Appl. No. 16/016,253 Office Action dated Feb. 21, 2019.
U.S. Appl. No. 16/016,253 Office Action dated Oct. 16, 2018.
U.S. Appl. No. 16/016,262 Office Action dated Mar. 21, 2019.
U.S. Appl. No. 16/016,262 Office Action dated Sep. 28, 2018.
U.S. Appl. No. 16/049,288 Notice of Allowance dated Jan. 3, 2019.
U.S. Appl. No. 16/049,288 Office Action dated Oct. 11, 2018.

Unknown author, "DuPont™ Teflon® AF amorphous fluoroplastic resin," (Jun. 22, 2016) [online] (retrieved from http://www2.dupont.com/Teflon_Industrial/en_US/assets/downloads/h44587.pdf), 4 pages.

Unknown author, "Teflon™ AF amorphous fluoroplastic resins," (Jun. 22, 2016) [online] (retrieved from https://www.chemours.com/Teflon_Industrial/en_us/assets/downloads/teflon-af-product-information.pdf), 3 pages.

Varma et al. Solution Combustion Synthesis of Nanoscale Materials. Chem Rev. Dec. 14, 2016;116(23):14493-14586.

Wei, et al. A highly efficient polyurethane-type polymeric photoinitiator containing in-chain benzophenone and coinitiator amine for photopolymerization of PU prepolymers. Macromol. Chern. Phys., 207 (2006): 2321-2328.

Yang, et al. Synthesis of 1,6-hexanediol diacrylate, 2010.

Yang, H. et al. "High Viscosity Jetting System for 3d Reactive Inkjet Printing." (2013).

Zhang, Teflon AF composite materials in membrane separation and molecular recognition in fluorous media. Ph.D. dissertation, University of Pittsburgh, 2013, 207 pages.

PCT/US2019/068413 Search Report & Written Opinion dated Apr. 23, 2020.
U.S. Appl. No. 15/919,124 Office Action dated Jun. 25, 2020.
U.S. Appl. No. 16/016,253 Office Action dated Oct. 21, 2019.
U.S. Appl. No. 16/016,253 Notice of Allowance dated Aug. 18, 2020.
U.S. Appl. No. 15/374,734 Office Action dated Sep. 4, 2020.
U.S. Appl. No. 16/202,039 Office Action dated Aug. 27, 2020.
EP18801929.3 Extended European Search Report dated Feb. 17, 2021.
U.S. Appl. No. 16/016,253 Notice of Allowance dated Oct. 2, 2020.
U.S. Appl. No. 15/919,124 Notice of Allowance dated Nov. 27, 2020.

* cited by examiner

VISCOUS FILM THREE-DIMENSIONAL PRINTING SYSTEMS AND METHODS

CROSS-REFERENCE

This application is a continuation of U.S. patent application Ser. No. 16/016,257, filed on Jun. 22, 2018, which is a continuation application of PCT/US18/032837, filed on May 15, 2018, which claims the benefit of U.S. Patent Application No. 62/506,523, filed May 15, 2017, which applications are incorporated herein by reference in their entirety.

BACKGROUND

Additive manufacturing techniques, such as three-dimensional (3D) printing, are rapidly being adopted as useful techniques for a number of different applications, including rapid prototyping and fabrication of specialty components. Examples of 3D printing include powder-based printing, fused deposition modeling (FDM), and stereolithography (SLA).

Photopolymer-based 3D printing technology (e.g., stereolithography) may produce a 3D structure in a layer-by-layer fashion by using light to selectively cure polymeric precursors into a polymeric material within a photoactive resin. Photopolymer-based 3D printers that use bottom up illumination may project light upwards through an optically transparent window of a vat containing photoactive resin to cure at least a portion of the resin. Such printers may build a 3D structure by forming one layer at a time, where a subsequent layer adheres to the previous layer.

SUMMARY

The present disclosure describes technologies relating to three-dimensional (3D) printing adhesion reduction using photoinhibition, and more specifically, the present disclosure describes using two lights with different wavelengths to respectively control a photopolymerization process within a film of a viscous liquid that is deposited on an open platform. The present disclosure describes hardware configurations for performing multi-material 3D printing, wherein a plurality of viscous liquids may be used to print a 3D structure.

In an aspect, the present disclosure provides a system for printing a three-dimensional (3D) object, the system comprising: (a) an open platform configured to hold a film of a viscous liquid comprising a photoactive resin, wherein the open platform comprises a print window; (b) a deposition head comprising a nozzle in fluid communication with a source of the viscous liquid, wherein the deposition head is configured to move across the open platform and deposit the film over the print window; (c) an optical source that provides light through the print window for curing at least a portion of the film of the viscous liquid; and (d) a controller operatively coupled to the deposition head, wherein the controller is programmed to (i) direct the deposition head to move across the open platform and dispense the viscous liquid through the nozzle to deposit the film over the print window, and (ii) direct the optical source to provide the light to cure the photoactive resin in at least the portion of the film of the viscous liquid, thereby printing at least a portion of the 3D object.

In some embodiments, the deposition head further comprises a wiper that is configured to (i) reduce or inhibit flow of the viscous liquid out of the deposition head, (ii) flatten the film of the viscous liquid, and/or (iii) remove any excess of the viscous liquid.

In some embodiments, the wiper is configured to be in contact with the print window and reduce or inhibit flow of the viscous liquid out of the deposition head.

In some embodiments, the wiper is movable along a direction away from the print window and configured to flatten the film of the viscous liquid.

In some embodiments, the wiper is movable along a direction away from the print window and configured to remove the excess of the viscous liquid. In some embodiments, the deposition head further comprises an additional wiper that is configured to direct at least a portion of the excess of the viscous liquid to the open platform.

In some embodiments, the wiper is a blade, a roller or a rod.

In some embodiments, the nozzle is a slot die. In some embodiments, the slot die is configured to (i) move along a direction away from the print window and (ii) deposit and flatten the film of the viscous liquid.

In some embodiments, the system further comprises a motion stage adjacent to the open platform. In some embodiments, the motion stage is coupled to the deposition head and configured to direct movement of the deposition head across the open platform.

In some embodiments, the system further comprises a build head arranged to move along a direction away from the print window during printing of the at least the portion of the 3D object. In some embodiments, the build head is configured to support the at least the portion of the 3D object.

In some embodiments, the system further comprises an additional deposition head comprising an additional nozzle. In some embodiments, the additional nozzle is in fluid communication with an additional source of an additional viscous liquid. In some embodiments, the additional deposition head is configured to move across the open platform and deposit a film of the additional viscous liquid over the print window.

In some embodiments, the system further comprises an additional source of an additional viscous liquid. In some embodiments, the additional source is in fluid communication with the nozzle of the deposition head.

In some embodiments, the system further comprises a cleaning zone adjacent to the open platform and configured to clean the deposition head. In some embodiments, the cleaning zone comprises a wiper, a nozzle configured to provide a cleaning solvent, or both.

In some embodiments, the system further comprises a container adjacent to the open platform and configured to collect the viscous liquid from the film of the viscous liquid.

In some embodiments, the system further comprises a sensor configured to (i) move across the open platform and/or (ii) measure a thickness of at least a portion of the film of the viscous liquid.

In some embodiments, the system further comprises a transparent film adjacent to the open platform and configured to hold the film of the viscous liquid.

In some embodiments, the light of the optical source comprises a first wavelength for curing a first portion of the film of the viscous liquid. In some embodiments, the optical source provides an additional light having a second wavelength for inhibiting curing of a second portion of the film of the viscous liquid. In some embodiments, the first wavelength and the second wavelength are different.

In some embodiments, the light of the optical source comprises a first wavelength for curing the photoactive resin in a first portion of the film of the viscous liquid. In some embodiments, the system further comprises an additional optical source comprising an additional light having a second wavelength for inhibiting curing of the photoactive resin in a second portion of the film of the viscous liquid. In some embodiments, the first wavelength and the second wavelength are different.

In some embodiments, the additional optical source is on a light platform. In some embodiments, the light platform is configured to (i) move relative to the print window and (ii) yield a uniform projection of the additional light of the additional optical source within the second portion of the film of the viscous liquid adjacent to the print window. In some embodiments, a position of the additional optical source is independently adjustable with respect to a position of the optical source.

In some embodiments, the open platform may comprise one or more walls adjacent to the open platform.

In another aspect, the present disclosure provides a method for printing a three-dimensional (3D) object, the method comprising: (a) providing a deposition head adjacent to an open platform comprising a print window, wherein the deposition head is movable across the open platform and comprises a nozzle in fluid communication with a source of a viscous liquid comprising a photoactive resin; (b) moving the deposition head across the open platform and dispensing the viscous liquid through the nozzle to deposit a film of the viscous liquid over the print window; and (c) directing light through the print window to the film to cure the photoactive resin in at least a portion of the film, thereby printing at least a portion of the 3D object.

In some embodiments, the deposition head further comprises a wiper.

In some embodiments, the method further comprises using the wiper to (i) flatten the film of the viscous liquid, (ii) reduce or inhibit flow of the viscous liquid out of the deposition head, and/or (iii) remove any excess of the viscous liquid.

In some embodiments, the wiper is at a distance away from the print window, and the method comprises using the wiper to flatten the film of the viscous liquid such that a thickness of the film of the viscous liquid is substantially the same as the distance between the wiper and the print window.

In some embodiments, the wiper in contact with the print window, and the method comprises using the wiper to reduce or inhibit flow of the viscous liquid out of the deposition head.

In some embodiments, subsequent to moving the deposition head across the open platform and dispensing the viscous liquid through the nozzle to deposit the film of the viscous liquid over the print window, the deposition head is moved across the open platform and the wiper is used to remove an excess of the viscous liquid from the print window. In some embodiments, the method further comprises directing at least a portion of the excess of the viscous liquid to the open platform.

In some embodiments, the deposition head further comprises an additional wiper, which additional wiper used to collect the excess of the viscous liquid between the additional wiper and the wiper. In some embodiments, at least the excess of the viscous liquid is collected and used to deposit an additional film of the viscous liquid over the print window.

In some embodiments, the excess of the viscous liquid is collected in a container adjacent to the open platform.

In some embodiments, the wiper is a blade, a roller or a rod.

In some embodiments, the deposition head is coupled to a motion stage adjacent to the open platform, and the method comprises moving the motion stage to move the deposition head across the open platform.

In some embodiments, the method further comprises providing a build head for holding at least a portion of the 3D object. In some embodiments, prior to directing light through the print window to the film to cure the photoactive resin in the at least the portion of the film, the build head is moved towards the print window and brought in contact with the film of the viscous liquid. In some embodiments, subsequent to directing light through the print window to the film to cure the photoactive resin in the at least the portion of the film, the build head is moved away from the print window.

In some embodiments, the method further comprises providing an additional deposition head comprising an additional nozzle that is in fluid communication with an additional source of an additional viscous liquid. In some embodiments, the additional deposition head is moved across the open platform and used to deposit a film of the additional viscous liquid over the print window.

In some embodiments, the method further comprises providing an additional source of an additional viscous liquid in fluid communication with the nozzle. In some embodiments, the method further comprises moving the deposition head across the open platform and dispensing the additional viscous liquid through the nozzle to the print window.

In some embodiments, subsequent to directing light through the print window to the film to cure the photoactive resin in the at least the portion of the film, the method further comprises moving the deposition head to a cleaning zone adjacent to the open platform to clean the deposition head.

In some embodiments, the method further comprises using a sensor to measure a thickness of at least a portion of the film of the viscous liquid.

In some embodiments, the open platform comprises a transparent film adjacent to the print window. In some embodiments, the method comprises directing the light through the print window, through the transparent film, and to the film of the viscous liquid to cure the photoactive resin in the at least the portion of the film of the viscous liquid, thereby printing the at least the portion of the 3D object.

In some embodiments, the method comprises (i) directing the light comprising a first wavelength to cure the photoactive resin in a first portion of the film of the viscous liquid, and (ii) directing an additional light having a second wavelength to inhibit curing of the photoactive resin in a second portion of the film of the viscous liquid. In some embodiments, the first wavelength and the second wavelength are different.

In some embodiments, the light is provided by a first optical source and the additional light is provided by an additional optical source. In some embodiments, a position of the additional optical source is independently adjustable with respect to a position of the optical source.

In some embodiments, the method further comprises providing a light platform to hold the additional optical source. In some embodiments, prior to directing the light comprising the first wavelength to cure the photoactive resin in the first portion of the film of the viscous liquid, the method further comprises moving the light platform relative to the print window and yielding a uniform projection of the additional light within the second portion of the film of the viscous liquid adjacent to the print window.

In some embodiments, the light and the additional light are provided by a same optical source.

In a different aspect, the present disclosure provides a resin for printing a three-dimensional (3D) object, comprising: a polymeric precursor; at least one photoinitiator that is configured to initiate formation of a polymeric material from the polymeric precursor; at least one photoinhibitor that is configured to inhibit formation of the polymeric material from the polymeric precursor; and a plurality of particles for forming at least a portion of the 3D object.

In some embodiments, the one or more particles comprise at least one metal particle, at least one ceramic particle, or both.

In some embodiments, the resin further comprises one or more additional particles. In some embodiments, the one or more additional particles are configured to prevent settling of the plurality of particles in the resin.

In some embodiments, the resin further comprises a thixotropic additive. In some embodiments, the thixotropic additive is configured to create a network within the resin to prevent settling of the plurality of particles in the resin.

In some embodiments, the resin further comprises at least one additional additive, wherein the at least one additional additive is configured to prevent foaming of the resin.

In some embodiments, the resin further comprises an extractable material that is soluble in a solvent. In some embodiments, a first solubility of the extractable material in the solvent is higher than a second solubility of the polymeric material in the solvent.

In some embodiments, the polymeric precursor comprises monomers configured to polymerize to form the polymeric material. In some embodiments, the polymeric precursor comprises oligomers configured to cross-link to form the polymeric material.

Another different aspect of the present disclosure provides a method for forming a three-dimensional (3D) object, comprising: (a) providing, adjacent to a build surface, a resin comprising (i) a polymeric precursor, (ii) at least one photoinitiator that is configured to initiate formation of a polymeric material from the polymeric precursor, (iii) at least one photoinhibitor that is configured to inhibit formation of the polymeric material from the polymeric precursor, and (iv) a plurality of particles for forming at least a portion of the 3D object; and (b) exposing the resin to (i) a first light under conditions sufficient to cause the photoinitiator to initiate formation of the polymeric material from the polymeric precursor, wherein the polymeric material encapsulates the plurality of particles, and (ii) a second light under conditions sufficient to cause the photoinhibitor to inhibit formation of the polymeric material adjacent to the build surface, wherein the plurality of particles encapsulated in the polymeric material are usable for forming at least a portion the 3D object. In some embodiments, the method further comprises repeating (a) and (b) one or more times.

In some embodiments, the polymeric precursor comprises monomers, and the method comprises exposing the resin to the first light and inducing polymerization of the monomers to generate the polymeric material.

In some embodiments, the polymeric precursor comprises oligomers, and the method comprises exposing the resin to the first light and inducing cross-linking between the oligomers to generate the polymeric material.

In some embodiments, the method further comprises providing a build platform adjacent to the build surface. In some embodiments, the at least the portion of the 3D object is formed adjacent to the build platform. In some embodiments, during formation of the 3D object, the build platform is moved along a direction away from the build surface.

In some embodiments, the method further comprises subjecting at least the polymeric material to heating, to thereby heat at least the plurality of particles. In some embodiments, the heating is under conditions sufficient to sinter the plurality of particles.

In some embodiments, the method comprises (a) providing, adjacent to the build surface, the resin comprising (i) the polymeric precursor, (ii) the at least one photoinitiator, (iii) the at least one photoinhibitor, and (iv) the plurality of particles, and (b) exposing the resin to (i) the first light under conditions sufficient to cause the photoinitiator to initiate formation of the polymeric material from the polymeric precursor, wherein the polymeric material encapsulates the plurality of particles, and (ii) the second light under conditions sufficient to cause the photoinhibitor to inhibit formation of the polymeric material adjacent to the build surface, wherein the plurality of particles encapsulated in the polymeric material are usable for forming at least a portion the 3D object. In some embodiments, the method further comprises repeating (a) and (b) one or more times prior to subjecting at least the polymeric material to heating, to thereby heat at least the plurality of particles.

In some embodiments, the first light comprises a first wavelength and the second light comprises a second wavelength. In some embodiments, the first wavelength is sufficient to activate the photoinitiator, and the second wavelength is sufficient to activate the photoinhibitor. In some embodiments, the first wavelength and the second wavelength are different.

In some embodiments, the resin further comprises at least one dye configured to absorb the second light, and exposing the resin to the second light initiates the at least one dye to reduce an amount of the second light exposed to at least a portion of the resin.

In some embodiments, the resin further comprises an extractable material that is soluble in a solvent, and formation of the polymeric material comprises forming (i) a first solid phase comprising the polymeric material, and (ii) a second solid phase comprising the extractable material.

In some embodiments, the method further comprises extracting the extractable material from the second solid phase and generating one or more pores in the at least the portion of the 3D object. In some embodiments, creation of the one or more pores in the at least the portion of the 3D object creates at least one continuous porous network in the at least the portion of the 3D object. In some embodiments, the one or more pores are a plurality of pores.

In some embodiments, the build surface comprises an optically transparent window. In some embodiments, the resin is exposed to the light through the optically transparent window.

Another aspect of the present disclosure provides a non-transitory computer readable medium comprising machine executable code that, upon execution by one or more computer processors, implements any of the methods above or elsewhere herein.

Another aspect of the present disclosure provides a system comprising one or more computer processors and computer memory coupled thereto. The computer memory comprises machine executable code that, upon execution by the one or more computer processors, implements any of the methods above or elsewhere herein.

Additional aspects and advantages of the present disclosure will become readily apparent to those skilled in this art from the following detailed description, wherein only illustrative embodiments of the present disclosure are shown and described. As will be realized, the present disclosure is capable of other and different embodiments, and its several details are capable of modifications in various obvious respects, all without departing from the disclosure. Accordingly, the drawings and description are to be regarded as illustrative in nature, and not as restrictive.

INCORPORATION BY REFERENCE

All publications, patents, and patent applications mentioned in this specification are herein incorporated by reference to the same extent as if each individual publication, patent, or patent application was specifically and individually indicated to be incorporated by reference. To the extent publications and patents or patent applications incorporated by reference contradict the disclosure contained in the specification, the specification is intended to supersede and/or take precedence over any such contradictory material.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings (also "Figure" and "FIG." herein), of which:

DETAILED DESCRIPTION

Figure 1:
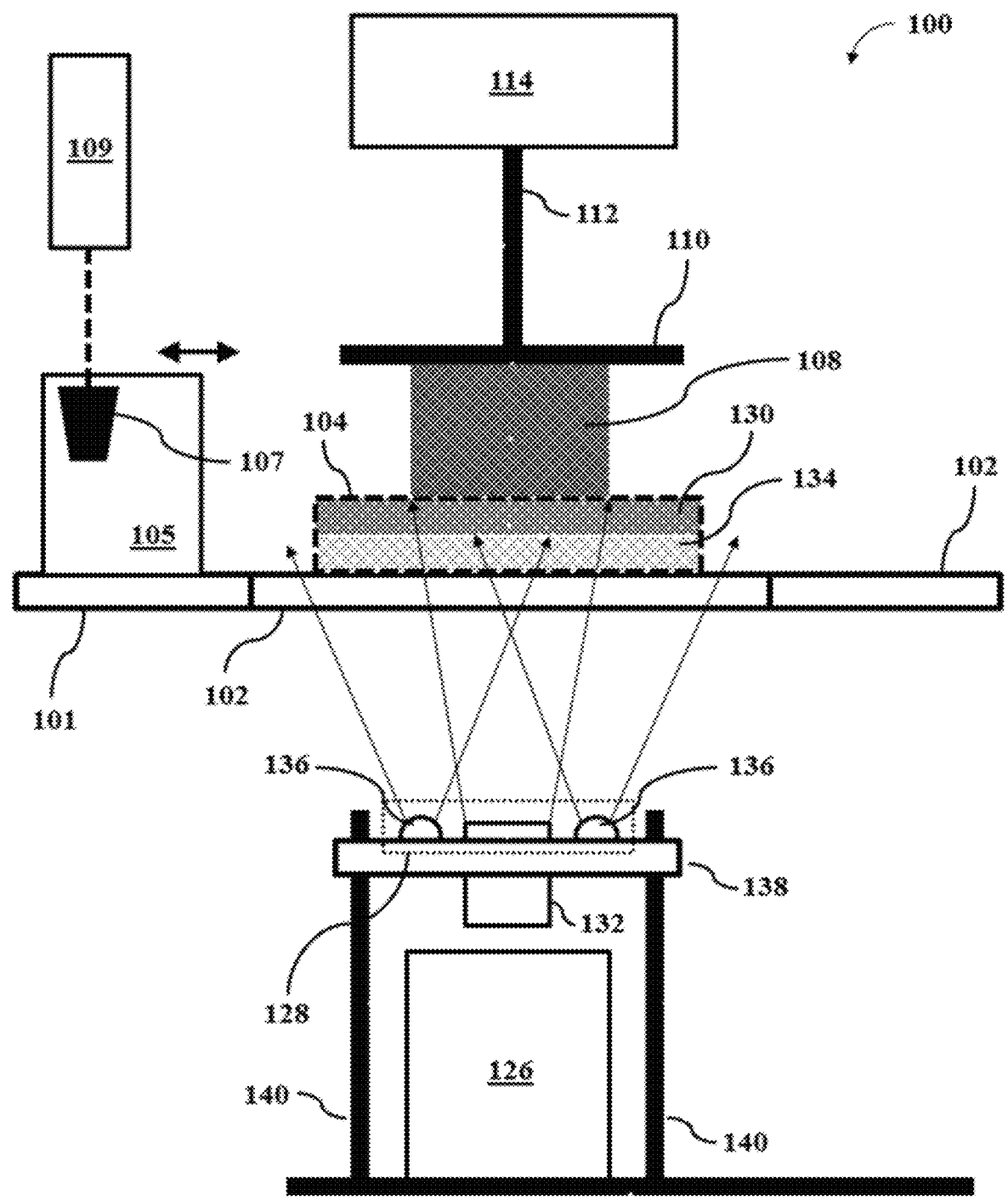
FIG. 1 shows an example of a three-dimensional (3D) printing system.

While various embodiments of the invention have been shown and described herein, it will be obvious to those skilled in the art that such embodiments are provided by way of example only. Numerous variations, changes, and substitutions may occur to those skilled in the art without departing from the invention. It should be understood that various alternatives to the embodiments of the invention described herein may be employed.

The term "three-dimensional object" (also "3D object"), as used herein, generally refers to an object or a part that is printed by 3D printing. The 3D object may be at least a portion of a larger 3D object or an entirety of the 3D object. The 3D object may be fabricated (e.g., printed) in accordance with a computer model of the 3D object.

The term "open platform," as used herein, generally refers to a structure that supports a liquid or a film of the liquid during 3D printing. The liquid may have a viscosity that is sufficient to permit the liquid to remain on or adjacent to the open platform during 3D printing. The open platform may be flat. The open platform may include an optically transparent or semi-transparent print window (e.g., glass or a polymer) to direct light through the window and to the liquid or the film of the liquid. The open platform may have various shapes. The open platform may be a rectangle or a ring, for example.

The open platform may comprise one or more walls adjacent to the open platform, such as at least 1, 2, 3, or 4 walls. The walls may enclose the open platform. During printing, a property (e.g., viscosity) of a liquid used for printing may be sufficient to keep the fluid adjacent to the open platform without sufficient flow of the fluid towards the one or more walls. In some examples, the walls prevent flow of the liquid out of the open platform.

The open platform may include one or more sides that are not bounded. For example, the open platform may not be vat or a container. The open platform may not be part of a vat or a container. The open platform may be a substrate or slab that does not have a depression (e.g., vat or container) for retaining a liquid. In such situations, the liquid may be sufficiently viscous such that the liquid remains on the open platform.

The term "viscous liquid," as used herein, generally refers to a material that is usable to print a 3D object. In some cases, the viscous liquid may be referred to as a resin. The viscous liquid may be dispensed from a nozzle and over a print window. The viscous liquid may have a viscosity sufficient to be self-supporting on the print window without flowing or sufficient flowing. The viscosity of the viscous liquid may range between about 4,000 centipoise (cP) to about 2,000,000 cP. The viscous liquid may be pressed (e.g., by a blade or a build head) into a film of the viscous liquid on or over the print window. A thickness of the film of the viscous liquid may be adjustable. The viscous liquid may include a photoactive resin. The photoactive resin may include a polymerizable and/or cross-linkable component (e.g., a precursor) and a photoinitiator that activates curing of the polymerizable and/or cross-linkable component, to thereby subject the polymerizable and/or cross-linkable component to polymerization and/or cross-linking. The photoactive resin may include a photoinhibitor that inhibits curing of the polymerizable and/or cross-linkable component. In some examples, the viscous liquid may include a plurality of particles (e.g., metal, non-metal, or both)—in such a case, the viscous liquid may be a slurry or a photopolymer slurry. The viscous liquid may be a paste. The plurality of particles may be added to the viscous liquid. The plurality of particles may be solids or semi-solids (e.g., gels). Examples of non-metal material include ceramic, polymeric, or composite material. The plurality of particles may be suspended throughout the viscous liquid. The plurality of particles in the viscous liquid may have a distribution that is monodisperse or polydisperse. In some examples, the viscous liquid may contain additional optical absorbers and/or non-photoreactive components (e.g., fillers, binders, plasticizers, etc.). The 3D printing may be performed with at least 1, 2, 3, 4, 5, 6, 7, 8, 9, 10 or more viscous liquids. A plurality of viscous liquids comprising different materials (e.g., different photoactive resin and/or different plurality of particles) may be used for printing a multi-material 3D object.

The term "particles," as used here, generally refers to any particulate material that may be melted or sintered (e.g., not completely melted). The particulate material may be in powder form. The particles may be inorganic materials. The inorganic materials may be metallic (e.g., aluminum or titanium), intermetallic (e.g., steel alloys), ceramic (e.g., metal oxides) materials, or any combination thereof. In some cases, the term "metal" or "metallic" may refer to both metallic and intermetallic materials. The metallic materials may include ferromagnetic metals (e.g., iron and/or nickel). The particles may have various shapes and sizes. For example, a particle may be in the shape of a sphere, cuboid, or disc, or any partial shape or combination of shapes thereof. The particle may have a cross-section that is circular, triangular, square, rectangular, pentagonal, hexagonal, or any partial shape or combination of shapes thereof. Upon heating, the particles may sinter (or coalesce) into a solid or porous object that may be at least a portion of a larger 3D object or an entirety of the 3D object. The 3D printing may be performed with at least 1, 2, 3, 4, 5, 6, 7, 8, 9, 10 or more types of particles.

The term "deposition head," as used herein, generally refers to a part that may move across an open platform. The deposition head may move across the open platform and deposit a film of a viscous liquid over a print window of the open platform. The film of the viscous liquid may have a uniform thickness across the print window. The thickness of the film may be adjustable. The deposition head may be coupled to a motion stage adjacent to the open platform. The deposition head may have at least one nozzle to dispense at least one liquid (e.g., viscous liquid) over the print window. The deposition head may have at least one wiper to form the layer of the viscous liquid or remove any excess viscous liquid from the print window. The deposition head may have at least one actuator to adjust a distance between the at least one wiper the print window. In some examples, the deposition head may have a slot die. The deposition head may retrieve any excess viscous liquid from the print window, contain the excess resin within the deposition head, and/or recycle the retrieved viscous liquid when printing subsequent portions of the 3D object. The deposition head may clean the print window.

The 3D printing may be performed with at least 1, 2, 3, 4, 5, 6, 7, 8, 9, 10 or more deposition heads. Each of a plurality of deposition heads may be in fluid communication with a separate source of viscous liquid. The plurality of deposition heads may be used to deposit and cure alternating films of different viscous liquids (e.g., different photoactive resins and/or different inorganic particles). Compartmentalizing different viscous liquids in separate sources and separate deposition heads may improve printing speed and prevent cross-contamination of the different viscous liquids.

The term "nozzle," as used herein, generally refers to a component of the deposition head that directs the viscous liquid towards the open platform comprising the window. The nozzle may include an opening for the viscous liquid to enter and an additional opening for the viscous liquid to exit. In some cases, the nozzle may not comprise any contraction or control mechanism to adjust flow of the viscous liquid towards the open platform. In some cases, the nozzle may comprise a contraction or control mechanism to adjust the flow of the viscous liquid towards the open platform.

The term "wiper," as used herein, generally refers to a part that may be in contact with a print window of an open platform, a viscous liquid, or another wiper. In some examples, the wiper may be a component of a deposition head. The wiper may be in contact with a viscous liquid to press the viscous liquid into a film. The wiper may be in contact with the print window to remove any excess viscous liquid. A distance between the wiper and the print window may be adjustable. In some examples, the wiper may be a component in a cleaning zone. The wiper may be in contact with another wiper to remove any excess viscous liquid. The wiper may have various shapes, sizes, and surface textures. The wiper may be a blade (e.g., a squeegee blade, a doctor blade), roller, or rod (e.g., wire wound rod), for example. The 3D printing may be performed with at least 1, 2, 3, 4, 5, 6, 7, 8, 9, 10 or more wipers. In some cases, the blade is part of the nozzle or attached to the nozzle.

The term "photoinitiation," as used herein, generally refers to a process of subjecting a portion of a film of a liquid (e.g., viscous liquid) to a light to cure a photoactive resin in the portion of the film of the liquid. The light (photoinitiation light) may have a wavelength that activates a photoinitiator that initiates curing of a polymerizable and/or cross-linkable component in the photoactive resin.

The term "photoinhibition," as used herein, generally refers to a process of subjecting a portion of a film of a liquid (e.g., a viscous liquid) to a light to inhibit curing of a photoactive resin in the portion of the film of the liquid. The light (photoinhibition light) may have a wavelength that activates a photoinhibitor that inhibit curing of a polymerizable and/or cross-linkable component in the photoactive resin. The wavelength of the photoinhibition light and another wavelength of a photoinitiation light may be different. In some examples, the photoinhibition light and the photoinitiation light may be projected from the same optical source. In some examples, the photoinhibition light and the photoinitiation light may be projected from different optical sources.

The term "green body," as used herein, generally refers to a 3D object that has a polymeric material and a plurality of particles (e.g., metal, ceramic, or both) that are encapsulated by the polymeric material. The plurality of particles may be in a polymer (or polymeric) matrix. The plurality of particles may be capable of sintering or melting. The green body may be self-supporting. The green body may be heated in a heater (e.g., in a furnace) to burn off at least a portion of the polymeric material and coalesce the plurality of particles into at least a portion of a larger 3D object or an entirety of the 3D object.

The present disclosure provides methods and systems for forming a 3D object. Such methods may employ application of a film of a liquid adjacent to an open platform and exposing the film to light to subject at least a portion of the film to polymerization and/or cross-linking. The 3D object may be based on a computer model of the 3D object, such as a computer-aided design (CAD) stored in a non-transitory computer storage medium (e.g., medium).

Methods and Systems for 3D Printing

In an aspect, the present disclosure provides a system for printing a three-dimensional (3D) object. The system may comprise an open platform configured to hold a film of a viscous liquid comprising a photoactive resin. The open platform may comprise a print window (also "window"). The system may comprise a deposition head comprising a nozzle in fluid communication with a source of the viscous liquid. The deposition head may be configured to move across the open platform and deposit the film of the viscous liquid over the print window. The system may comprise an optical source that provides light through the print window for curing at least a portion of the film of the viscous liquid. The system may comprise a controller operatively coupled to the deposition head. The controller may be programmed to (i) direct the deposition head to move across the open platform and dispense the viscous liquid through the nozzle to deposit the film over the print window, and (ii) direct the optical source to provide the light to cure the photoactive resin in at least the portion of the film of the viscous liquid, thereby printing at least a portion of the 3D object.

In some situations, the print window may be precluded. In such a scenario, light may be provided to the film of the viscous liquid from above the open platform, such as directly above or from a side of the open platform.

At least a portion of the open platform may comprise the window. The window may be the open platform or part of the open platform. For example, at least about 10 percent (%), 15%, 20%, 25%, 30%, 35%, 40%, 45%, 50%, 55%, 60%, 65%, 70%, 75%, 80%, 85%, 90%, 95%, or more of open platform may comprise the window. As another example, at most about 95%, 90%, 85%, 80%, 75%, 70%, 65%, 60%, 55%, 50%, 45%, 40%, 35%, 30%, 25%, 20%, 15%, 10%, or less of the open platform may comprise the window. In some cases, the open platform may be the window. A surface of the open platform comprising the window may be flat.

The window may be transparent or semitransparent (translucent). The window may be comprised of an optical window material, such as, for example, glass or a polymeric material (e.g., polymethylmethacrylate (PMMA)). In some cases, the window may be comprised of polydimethylsiloxane (PDMS) that is permeable to oxygen. During printing, the oxygen dissolved in the window may (i) diffuse into a contact surface between the window and the viscous liquid comprising the photoactive resin (the window-viscous liquid interface) and (ii) inhibit curing of the photoactive resin at the contact surface. The window may be positioned above the optical source for photopolymer-based 3D printing using bottom-up illumination. As an alternative, the window may be positioned below the optical source. As another alternative, the window may be positioned between a first optical source and a second optical source.

The optical source may provide the light through the print window (or above the print window) for curing the at least a portion of the film of the viscous liquid adjacent to the window. The optical source or another optical source may provide another light through the print window (or above the print window) for inhibiting curing of at least a portion of the film of the viscous liquid.

The viscous liquid (resin) may be used for printing the at least the portion of the 3D object. The viscous liquid may comprise a photoactive resin to form a polymeric material. The photoactive resin may comprise a polymeric precursor of the polymeric material. The photoactive resin may comprise at least one photoinitiator that is configured to initiate formation of the polymeric material from the polymeric precursor. The photoactive resin may comprise at least one photoinhibitor that is configured to inhibit formation of the polymeric material from the polymeric precursor. The viscous liquid may comprise a plurality of particles for forming the at least the portion of the 3D object.

In some cases, the viscous liquid may be the photoactive resin. The viscosity of the photoactive resin may range between about 4,000 cP to about 2,000,000 cP. The viscosity of the photoactive resin may be at least about 4,000 cP, 10,000 cP, 20,000 cP, 30,000 cP, 40,000 cP, 50,000 cP, 60,000 cP, 70,000 cP, 80,000 cP, 90,000 cP, 100,000 cP, 200,000 cP, 300,000 cP, 400,000 cP, 500,000 cP, 600,000 cP, 700,000 cP, 800,000 cP, 900,000 cP, 1,000,000 cP, 2,000,000 cP, or more. The viscosity of the photoactive resin may be at most about 2,000,000 cP, 1,000,000 cP, 900,000 cP, 800,000 cP, 700,000 cP, 600,000 cP, 500,000 cP, 400,000 cP, 300,000 cP, 200,000 cP, 100,000 cP, 90,000 cP, 80,000 cP, 70,000 cP, 60,000 cP, 50,000 cP, 40,000 cP, 30,000 cP, 20,000 cP, 10,000 cP, 4,000 cP, or less.

The viscous liquid may be a non-Newtonian fluid. The viscosity of the viscous liquid may vary based on a shear rate or shear history of the viscous liquid. As an alternative, the viscous liquid may be a Newtonian fluid.

In some cases, the viscous liquid may comprise the photoactive resin and the plurality of particles. The viscosity of the viscous liquid may range between about 4,000 cP to about 2,000,000 cP. The viscosity of the viscous liquid may be at least about 4,000 cP, 10,000 cP, 20,000 cP, 30,000 cP, 40,000 cP, 50,000 cP, 60,000 cP, 70,000 cP, 80,000 cP, 90,000 cP, 100,000 cP, 200,000 cP, 300,000 cP, 400,000 cP, 500,000 cP, 600,000 cP, 700,000 cP, 800,000 cP, 900,000 cP, 1,000,000 cP, 2,000,000 cP, or more. The viscosity of the viscous liquid may be at most about 2,000,000 cP, 1,000,000 cP, 900,000 cP, 800,000 cP, 700,000 cP, 600,000 cP, 500,000 cP, 400,000 cP, 300,000 cP, 200,000 cP, 100,000 cP, 90,000 cP, 80,000 cP, 70,000 cP, 60,000 cP, 50,000 cP, 40,000 cP, 30,000 cP, 20,000 cP, 10,000 cP, 4,000 cP, or less.

In the viscous liquid comprising the photoactive resin and the plurality of particles, the photoactive resin may be present in an amount ranging between about 5 volume % (vol %) to about 80 vol % in the viscous liquid. The photoactive resin may be present in an amount of at least about 5 vol %, 6 vol %, 7 vol %, 8 vol %, 9 vol %, 10 vol %, 11 vol %, 12 vol %, 13 vol %, 14 vol %, 15 vol %, 16 vol %, 17 vol %, 18 vol %, 19 vol %, 20 vol %, 21 vol %, 22 vol %, 23 vol %, 24 vol %, 25 vol %, 30 vol %, 35 vol %, 40 vol %, 45 vol %, 50 vol %, 55 vol %, 60 vol %, 65 vol %, 70 vol %, 75 vol %, 80 vol %, or more in the viscous liquid. The photoactive resin may be present in an amount of at most about 80 vol %, 75 vol %, 70 vol %, 65 vol %, 60 vol %, 55 vol %, 50 vol %, 45 vol %, 40 vol %, 35 vol %, 30 vol %, 25 vol %, 24 vol %, 23 vol %, 22 vol %, 21 vol %, 20 vol %, 19 vol %, 18 vol %, 17 vol %, 16 vol %, 15 vol %, 14 vol %, 13 vol %, 12 vol %, 11 vol %, 10 vol %, 9 vol %, 8 vol %, 7 vol %, 6 vol %, 5 vol %, or less in the viscous liquid.

The polymeric precursor in the photoactive resin may comprise monomers to be polymerized into the polymeric material, oligomers to be cross-linked into the polymeric material, or both. The monomers may be of the same or different types. An oligomer may comprise two or more monomers that are covalently linked to each other. The oligomer may be of any length, such as at least 2 (dimer), 3 (trimer), 4 (tetramer), 5 (pentamer), 6 (hexamer), 7, 8, 9, 10, 20, 30, 40, 50, 100, 200, 300, 400, 500, or more monomers. Alternatively or in addition to, the polymeric precursor may include a dendritic precursor (monodisperse or polydisperse). The dendritic precursor may be a first generation (G1), second generation (G2), third generation (G3), fourth generation (G4), or higher with functional groups remaining on the surface of the dendritic precursor. The resulting polymeric material may comprise a monopolymer and/or a copolymer. The copolymer may be a linear copolymer or a branched copolymer. The copolymer may be an alternating copolymer, periodic copolymer, statistical copolymer, random copolymer, and/or block copolymer.

Examples of monomers include one or more of hydroxyethyl methacrylate; n-Lauryl acrylate; tetrahydrofurfuryl methacrylate; 2, 2, 2-trifluoroethyl methacrylate; isobornyl methacrylate; polypropylene glycol monomethacrylates, aliphatic urethane acrylate (i.e., Rahn Genomer 1122); hydroxyethyl acrylate; n-Lauryl methacrylate; tetrahydrofurfuryl acrylate; 2, 2, 2-trifluoroethyl acrylate; isobornyl acrylate; polypropylene glycol monoacrylates; trimethylpropane triacrylate; trimethylpropane trimethacrylate; pentaerythritol tetraacrylate; pentaerythritol tetraacrylate; triethyleneglycol diacrylate; triethylene glycol dimethacrylate; tetrathyleneglycol diacrylate; tetrathylene glycol dimethacrylate; neopentyldimethacrylate; neopentylacrylate; hexane dioldimethacylate; hexane diol diacrylate; polyethylene glycol 400 dimethacrylate; polyethylene glycol 400 diacrylate; diethylglycol diacrylate; diethylene glycol dimethacrylate; ethyleneglycol diacrylate; ethylene glycol dimethacrylate; ethoxylated bis phenol A dimethacrylate; ethoxylated bis phenol A diacrylate; bisphenol A glycidyl methacrylate; bisphenol A glycidyl acrylate; ditrimethylolpropane tetraacrylate; and ditrimethylolpropane tetraacrylate.

Polymeric precursors may be present in an amount ranging between about 3 weight % (wt %) to about 90 wt % in the photoactive resin of the viscous liquid. The polymeric precursors may be present in an amount of at least about 3 wt %, 4 wt %, 5 wt %, 10 wt %, 15 wt %, 20 wt %, 25 wt %, 30 wt %, 35 wt %, 40 wt %, 45 wt %, 50 wt %, 55 wt %, 60 wt %, 65 wt %, 70 wt %, 75 wt %, 80 wt %, 85 wt %, 90 wt %, or more in the photoactive resin of the viscous liquid. The polymeric precursors may be present in an amount of at most about 90 wt %, 85 wt %, 80 wt %, 75 wt %, 70 wt %, 65 wt %, 60 wt %, 55 wt %, 50 wt %, 45 wt %, 40 wt %, 35 wt %, 30 wt %, 25 wt %, 20 wt %, 15 wt %, 10 wt %, 5 wt %, 4 wt %, 3 wt %, or less in the photoactive resin of the viscous liquid.

Photopolymerization of the polymeric precursors into the polymeric material may be controlled by one or more photoactive species, such as the at least one photoinitiator and the at least one photoinhibitor. The at least one photoinitiator may be a photon-absorbing compound that (i) is activated by a first light comprising a first wavelength and (ii) initiates photopolymerization of the polymeric precursors. The at least one photoinhibitor may be another photon-absorbing compound that (i) is activated by a second light comprising a second wavelength and (ii) inhibits the photopolymerization of the polymeric precursors. The first wavelength and the second wavelength may be different. The first light and the second light may be directed by the same light source. As an alternative, the first light may be directed by a first light source and the second light may be directed by a second light source. In some cases, the first light may comprise wavelengths ranging between about 420 nanometers (nm) to about 510 nm. In some cases, the second light may comprise wavelengths ranging between about 350 nm to about 410 nm. In an example, the first wavelength to induce photoinitiation is about 460 nm. In an example, the second wavelength to induce photoinhibition is about 365 nm.

Relative rates of the photoinitiation by the at least one photoinitiator and the photoinhibition by the at least one photoinhibitor may be controlled by adjusting the intensity and/or duration of the first light, the second light, or both. By controlling the relative rates of the photoinitiation and the photoinhibition, an overall rate and/or amount (degree) of polymerization of the polymeric precursors into the polymeric material may be controlled. Such process may be used to (i) prevent polymerization of the polymeric precursors at the window-viscous liquid interface, (ii) control the rate at which polymerization takes place in the direction away from the window, and/or (iii) control a thickness of the polymeric material within the film of the viscous liquid.

Examples of types of the at least one photoinitiator include one or more of benzophenones, thioxanthones, anthraquinones, benzoylformate esters, hydroxyacetophenones, alkylaminoacetophenones, benzil ketals, dialkoxyacetophenones, benzoin ethers, phosphine oxides acyloximino esters, alphahaloacetophenones, trichloromethyl-S-triazines, titanocenes, dibenzylidene ketones, ketocoumarins, dye sensitized photoinitiation systems, maleimides, and mixtures thereof.

Examples of the at least one photoinitiator in the photoactive resin include one or more of 1-hydroxy-cyclohexyl-phenyl-ketone (Irgacure™ 184; BASF, Hawthorne, N.J.); a 1:1 mixture of 1-hydroxy-cyclohexyl-phenyl-ketone and benzophenone (Irgacure™ 500; BASF); 2-hydroxy-2-methyl-1-phenyl-1-propanone (Darocur™ 1173; BASF); 2-hydroxy-1-[4-(2-hydroxyethoxy)phenyl]-2-methyl-1-propanone (Irgacure™ 2959; BASF); methyl benzoylformate (Darocur™ MBF; BASF); oxy-phenyl-acetic acid 2-[2-oxo-2-phenyl-acetoxy-ethoxy]-ethyl ester; oxy-phenyl-acetic 2-[2-hydroxy-ethoxy]-ethyl ester; a mixture of oxy-phenyl-acetic acid 2-[2-oxo-2-phenyl-acetoxy-ethoxy]-ethyl ester and oxy-phenyl-acetic 2-[2-hydroxy-ethoxy]-ethyl ester (Irgacure™ 754; BASF); alpha,alpha-dimethoxy-alpha-phenylacetophenone (Irgacure™ 651; BASF); 2-benzyl-2-(dimethylamino)-1-[4-(4-morpholinyl)-phenyl]-1-butanone (Irgacure™ 369; BASF); 2-methyl-1-[4-(methylthio)phenyl]-2-(4-morpholinyl)-1-propanone (Irgacure™ 907; BASF); a 3:7 mixture of 2-benzyl-2-(dimethylamino)-1-[4-(4-morpholinyl) phenyl]-1-butanone and alpha,alpha-dimethoxy-alpha-phenylacetophenone per weight (Irgacure™ 1300; BASF); diphenyl-(2,4,6-trimethylbenzoyl) phosphine oxide (Darocur™ TPO; BASF); a 1:1 mixture of diphenyl-(2,4,6-trimethylbenzoyl)-phosphine oxide and 2-hydroxy-2-methyl-1-phenyl-1-propanone (Darocur™ 4265; BASF); phenyl bis(2,4,6-trimethyl benzoyl) phosphine oxide, which can be used in pure form (Irgacure™ 819; BASF, Hawthorne, N.J.) or dispersed in water (45% active, Irgacure™ 819DW; BASF); 2:8 mixture of phosphine oxide, phenyl bis(2,4,6-trimethyl benzoyl) and 2-hydroxy-2-methyl-1-phenyl-1-propanone (Irgacure™ 2022; BASF); Irgacure™ 2100, which comprises phenyl-bis(2,4,6-trimethylbenzoyl)-phosphine oxide); bis-(eta 5-2,4-cyclopentadien-1-yl)-bis-[2,6-difluoro-3-(1H-pyrrol-1-yl) phenyl]-titanium (Irgacure™ 784; BASF); (4-methylphenyl) [4-(2-methylpropyl) phenyl]-iodonium hexafluorophosphate (Irgacure™ 250; BASF); 2-(4-methylbenzyl)-2-(dimethylamino)-1-(4-morpholinophenyl)-butan-1-one (Irgacure™ 379; BASF); 4-(2-hydroxyethoxy)phenyl-(2-hydroxy-2-propyl)ketone (Irgacure™ 2959; BASF); bis-(2,6-dimethoxybenzoyl)-2,4,4-trimethylpentylphosphine oxide; a mixture of bis-(2,6-dimethoxybenzoyl)-2,4,4-trimethylpentylphosphine oxide and 2 hydroxy-2-methyl-1-phenyl-propanone (Irgacure™ 1700; BASF); 4-Isopropyl-9-thioxanthenone; and mixtures thereof.

The at least one photoinitiator may be present in an amount ranging between about 0.1 wt % to about 10 wt % in the photoactive resin. The at least one photoinitiator may be present in an amount of at least about 0.1 wt %, 0.2 wt %, 0.3 wt %, 0.4 wt %, 0.5 wt %, 0.6 wt %, 0.7 wt %, 0.8 wt %, 0.9 wt %, 1 wt %, 2 wt %, 3 wt %, 4 wt %, 5 wt %, 6 wt %, 7 wt %, 8 wt %, 9 wt %, 10 wt %, or more in the photoactive resin. The at least one photoinitiator may be present in an amount of at most about 10 wt %, 9 wt %, 8 wt %, 7 wt %, 6 wt %, 5 wt %, 4 wt %, 3 wt %, 2 wt %, 1 wt %, 0.9 wt %, 0.8 wt %, 0.7 wt %, 0.6 wt %, 0.5 wt %, 0.4 wt %, 0.3 wt %, 0.2 wt %, 0.1 wt %, or less in the photoactive resin.

The at least one photoinhibitor in the photoactive resin may comprise one or more radicals that may preferentially terminate growing polymer radicals, rather than initiating polymerization of the polymeric precursors. Examples of types of the at least one photoinitiator include: one or more of sulfanylthiocarbonyl and other radicals generated in photoiniferter polymerizations; sulfanylthiocarbonyl radicals used in reversible addition-fragmentation chain transfer polymerization; and nitrosyl radicals used in nitroxide mediate polymerization. Other non-radical species that can be generated to terminate growing radical chains may include the numerous metal/ligand complexes used as deactivators in atom-transfer radical polymerization (ATRP). Thus, additional examples of the types of the at least one photoinhibitor include: one or more of thiocarbamates, xanthates, dithiobenzoates, hexaarylbiimidazoles, photoinitiators that generate ketyl and other radicals that tend to terminate growing polymer chains radicals (i.e., camphorquinone (CQ) and benzophenones), ATRP deactivators, and polymeric versions thereof.

Examples of the at least one photoinhibitors in the photoactive resin include one or more of zinc dimethyl dithiocarbamate; zinc diethyl dithiocarbamate; zinc dibutyl dithiocarbamate; nickel dibutyl dithiocarbamate; zinc dibenzyl dithiocarbamate; tetramethylthiuram disulfide; tetraethylthiuram disulfide (TEDS); tetramethylthiuram monosulfide; tetrabenzylthiuram disulfide; tetraisobutylthiuram disulfide; dipentamethylene thiuram hexasulfide; N,N'-dimethyl N,N'-di(4-pyridinyl)thiuram disulfide; 3-Butenyl 2-(dodecylthiocarbonothioylthio)-2-methylpropionate; 4-Cyano-4-[(dodecylsulfanylthiocarbonyl)sulfanyl]pentanoic acid; 4-Cyano-4-[(dodecylsulfanylthiocarbonyl)sulfanyl]pentanol; Cyanomethyl dodecyl trithiocarbonate; Cyanomethyl [3-(trimethoxysilyl)propyl] trithiocarbonate; 2-Cyano-2-propyl dodecyl trithiocarbonate; S,S-Dibenzyl trithiocarbonate; 2-(Dodecylthiocarbonothioylthio)-2-methylpropionic acid; 2-(Dodecylthiocarbonothioylthio)-2-methylpropionic acid N-hydroxysuccinimide; Benzyl 1H-pyrrole-1-carbodithioate; Cyanomethyl diphenylcarbamodithioate; Cyanomethyl methyl(phenyl)carbamodithioate; Cyanomethyl methyl(4-pyridyl)carbamodithioate; 2-Cyanopropan-2-yl N-methyl-N-(pyridin-4-yl)carbamodithioate; Methyl 2-[methyl(4-pyridinyl)carbamothioylthio] propionate; 1-Succinimidyl-4-cyano-4-[N-methyl-N-(4-pyridyl)carbamothioylthio]pentanoate; Benzyl benzodithioate; Cyanomethyl benzodithioate; 4-Cyano-4-(phenylcarbonothioylthio)pentanoic acid; 4-Cyano-4-(phenylcarbonothioylthio)pentanoic acid N-succinimidyl ester; 2-Cyano-2-propyl benzodithioate; 2-Cyano-2-propyl 4-cyanobenzodithioate; Ethyl 2-(4-methoxyphenylcarbonothioylthio)acetate; 2-Phenyl-2-propyl benzodithioate; Cyanomethyl methyl(4-pyridyl)carbamodithioate; 2-Cyanopropan-2-yl N-methyl-N-(pyridin-4-yl)carbamodithioate; 2,2'-Bis (2-chlorophenyl)-4,4',5,5'-tetraphenyl-1,2'-biimidazole; 2-(2-ethoxyphenyl)-1-[2-(2-ethoxyphenyl)-4,5-diphenyl-2H-imidazol-2-yl]-4,5-diphenyl-1H-imidazole; 2,2',4-tris-(2-Chlorophenyl)-5-(3,4-dimethoxyphenyl)-4',5'-diphenyl-1,1'-biimidazole; and Methyl 2-[methyl(4-pyridinyl) carbamothioylthio]propionate.

The at least one photoinhibitor may be present in an amount ranging between about 0.1 wt % to about 10 wt % in the photoactive resin. The at least one photoinhibitor may be present in an amount of at least about 0.1 wt %, 0.2 wt %, 0.3 wt %, 0.4 wt %, 0.5 wt %, 0.6 wt %, 0.7 wt %, 0.8 wt %, 0.9 wt %, 1 wt %, 2 wt %, 3 wt %, 4 wt %, 5 wt %, 6 wt %, 7 wt %, 7 wt %, 8 wt %, 9 wt %, 10 wt %, or more in the photoactive resin. The at least one photoinhibitor may be present in an amount of at most about 10 wt %, 9 wt %, 8 wt %, 7 wt %, 6 wt %, 5 wt %, 4 wt %, 3 wt %, 2 wt %, 1 wt %, 0.9 wt %, 0.8 wt %, 0.7 wt %, 0.6 wt %, 0.5 wt %, 0.4 wt %, 0.3 wt %, 0.2 wt %, 0.1 wt %, or less in the photoactive resin.

Alternatively or in addition to, the photoactive resin may include a co-initiator. The co-initiator may be used to enhance the polymerization rate of the polymeric precursors. Suitable classes of the co-initiators may include: primary, secondary, and tertiary amines; alcohols; and thiols. Examples of the co-initiators may include: one or more of isoamyl 4-(dimethylamino)benzoate, 2-ethylhexyl 4-(dimethylamino)benzoate; ethyl 4-(dimethylamino)benzoate (EDMAB); 3-(dimethylamino)propyl acrylate; 2-(dimethylamino)ethyl methacrylate; 4-(dimethylamino)benzophenones, 4-(diethylamino)benzophenones; 4,4'-Bis(diethylamino)benzophenones; methyl diethanolamine; triethylamine; hexane thiol; heptane thiol; octane thiol; nonane thiol; decane thiol; undecane thiol; dodecane thiol; isooctyl 3-mercaptopropionate; pentaerythritol tetrakis(3-mercaptopropionate); 4,4'-thiobisbenzenethiol; trimethylolpropane tris(3-mercaptopropionate); CN374 (Sartomer); CN371 (Sartomer), CN373 (Sartomer), Genomer 5142 (Rahn); Genomer 5161 (Rahn); Genomer (5271 (Rahn); Genomer 5275 (Rahn), and TEMPIC (Bruno Boc, Germany).

In some cases, the at least one photoinitiator and the co-initiator may be activated by the same light. The at least one photoinitiator and the co-initiator may be activated by the same wavelength and/or two different wavelengths of the same light. Alternatively or in addition to, the at last one photoinitiator and the co-initiator may be activated by different lights comprising different wavelengths. The system may comprise a co-initiator light source configured to direct a co-initiation light comprising a wavelength sufficient to activate the co-initiator to the film of the viscous liquid.

The co-initiator may be a small molecule (e.g., a monomer). Alternatively or in addition to, the co-initiator may be an oligomer or polymer comprising a plurality of small molecules. The co-initiator may be present in an amount ranging between about 0.1 wt % to about 10 wt % in the photoactive resin. The co-initiator may be present in an amount of at least about 0.1 wt %, 0.2 wt %, 0.3 wt %, 0.4 wt %, 0.5 wt %, 0.6 wt %, 0.7 wt %, 0.8 wt %, 0.9 wt %, 1 wt %, 2 wt %, 3 wt %, 4 wt %, 5 wt %, 6 wt %, 7 wt %, 8 wt %, 9 wt %, 10 wt %, or more in the photoactive resin. The co-initiator may be present in an amount of at most about 10 wt %, 9 wt %, 8 wt %, 7 wt %, 6 wt %, 5 wt %, 4 wt %, 3 wt %, 2 wt %, 1 wt %, 0.9 wt %, 0.8 wt %, 0.7 wt %, 0.6 wt %, 0.5 wt %, 0.4 wt %, 0.3 wt %, 0.2 wt %, 0.1 wt %, or less in the photoactive resin.

The photoactive resin may comprise one or more dyes. The one or more dyes may be used to attenuate light, to transfer energy to the photoactive species, or both. The one or more dyes may transfer energy to the photoactive species to increase sensitivity of the photoactive resin to the first light for the photoinitiation process, the second light for the photoinhibition process, or both. In an example, the photoactive resin comprises at least one dye configured to absorb the second light having the second wavelength, which second wavelength is for activating the at least one photoinhibitor. Exposing the photoactive resin to the second light may initiate the at least one dye to absorb the second light and (i) reduce an amount of the second light exposed to the at least one photoinhibitor, thereby controlling the depth of penetration of the second light into the film of the viscous liquid, and/or (ii) transfer (e.g., via Förster resonance energy transfer (FRET)) some of the absorbed energy from the second light to the at least one photoinhibitor, thereby improving the efficiency of photoinhibition. Examples of the one or more dyes may include compounds commonly used as ultraviolet (UV) light absorbers, including 2-hydroxyphenyl-benzophenones, 2-(2-hydroxyphenyl)-benzotriazoles, and 2-hydroxyphenyl-s-triazines. Alternatively or in addition to, the one or more dyes may include those used for histological staining or dying of fabrics, including Martius yellow, Quinoline yellow, Sudan red, Sudan I, Sudan IV, eosin, eosin Y, neutral red, and acid red.

A concentration of the one or more dyes in the photoactive resin may be dependent on the light absorption properties of the one or more dyes. The one or more dyes may be present in an amount ranging between about 0.1 wt % to about 10 wt % in the photoactive resin. The one or more dyes may be present in an amount of at least about 0.1 wt %, 0.2 wt %, 0.3 wt %, 0.4 wt %, 0.5 wt %, 0.6 wt %, 0.7 wt %, 0.8 wt %, 0.9 wt %, 1 wt %, 2 wt %, 3 wt %, 4 wt %, 5 wt %, 6 wt %, 7 wt %, 8 wt %, 9 wt %, 10 wt %, or more in the photoactive resin. The one or more dyes may be present in an amount of at most about 10 wt %, 9 wt %, 8 wt %, 7 wt %, 6 wt %, 5 wt %, 4 wt %, 3 wt %, 2 wt %, 1 wt %, 0.9 wt %, 0.8 wt %, 0.7 wt %, 0.6 wt %, 0.5 wt %, 0.4 wt %, 0.3 wt %, 0.2 wt %, 0.1 wt %, or less in the photoactive resin.

The viscous liquid may comprise the plurality of particles for forming the at least the portion of the 3D object. In some cases, the amount of the plurality of particles in the viscous liquid may be sufficient to minimize shrinking of the green body during sintering. The plurality of particles may comprise any particulate material (a particle) that can be melted or sintered (e.g., not completely melted). The particulate material may be in powder form. The particular material may be inorganic materials. The inorganic materials may be metallic, intermetallic, ceramic materials, or any combination thereof. The one or more particles may comprise at least one metallic material, at least one intermetallic material, at least one ceramic material, or any combination thereof.

Whereas powdered metals alone may be a severe safety hazard and may explode and/or require extensive safety infrastructures, using powdered metals that are dispersed in the viscous liquid may avoid or substantially reduce the risks relevant to using the powdered metals that are not dispersed in a liquid medium. Additionally, photopolymer-based 3D printing using the viscous liquid comprising the photoactive resin and the powdered metals may be performed without using heat, thereby avoiding or substantially reducing thermal distortion to the at least the portion of the 3D object during printing.

The metallic materials for the particles may include one or more of aluminum, calcium, magnesium, barium, scandium, titanium, vanadium, chromium, manganese, iron, cobalt, nickel, copper, zinc, yttrium, niobium, molybdenum, ruthenium, rhodium, silver, cadmium, actinium, and gold. In some cases, the particles may comprise a rare earth element. The rare earth element may include one or more of scandium, yttrium, and elements of the lanthanide series having atomic numbers from 57-71.

An intermetallic material may be a solid-state compound exhibiting metallic bonding, defined stoichiometry and ordered crystal structure (i.e., alloys). The intermetallic materials may be in prealloyed powder form. Examples of such prealloyed powders may include, but are not limited to, brass (copper and zinc), bronze (copper and tin), duralumin (aluminum, copper, manganese, and/or magnesium), gold alloys (gold and copper), rose-gold alloys (gold, copper, and zinc), nichrome (nickel and chromium), and stainless steel (iron, carbon, and additional elements including manganese, nickel, chromium, molybdenum, boron, titanium, silicon, vanadium, tungsten, cobalt, and/or niobium). In some cases, the prealloyed powders may include superalloys. The superalloys may be based on elements including iron, nickel, cobalt, chromium, tungsten, molybdenum, tantalum, niobium, titanium, and/or aluminum.

The ceramic materials may comprise metal (e.g., aluminum, titanium, etc.), non-metal (e.g., oxygen, nitrogen, etc.), and/or metalloid (e.g., germanium, silicon, etc.) atoms primarily held in ionic and covalent bonds. Examples of the ceramic materials include, but are not limited to, an aluminide, boride, beryllia, carbide, chromium oxide, hydroxide, sulfide, nitride, mullite, kyanite, ferrite, titania zirconia, yttria, and magnesia.

In some cases, the viscous liquid may comprise a pre-ceramic material. The pre-ceramic material may be a polymer that can be heated (or pyrolyzed) to form a ceramic material. The pre-ceramic material may include polyorganozirconates, polyorganoaluminates, polysiloxanes, polysilanes, polysilazanes, polycarbosilanes, polyborosilanes, etc. Additional examples of the pre-ceramic material include zirconium tetramethacrylate, zirconyl dimethacrylate, or zirconium 2-ethylhexanoate; aluminum III s-butoxide, aluminum III diisopropoxide-ethylacetoacetate; 1,3-bis(chloromethyl) 1,1,3,3-Tetrakis(trimethylsiloxy)disiloxane; 1,3-bis(3-carboxypropyl)tetramethyldisiloxane; 1,3,5,7-tetraethyl-2,4,6,8-tetramethylcyclotetrasilazane; tris(trimethylsilyl) phosphate; tris(trimethylsiloxy)boron; and mixtures thereof.

A cross-sectional dimension of the plurality of particles may range between about 1 nanometers (nm) to about 500 micrometers (μm). The cross-sectional dimension of the plurality of particles may be at least about 1 nm, 2 nm, 3 nm, 4 nm, 5 nm, 6 nm, 7 nm, 8 nm, 9 nm, 10 nm, 20 nm, 30 nm, 40 nm, 50 nm, 60 nm, 70 nm, 80 nm, 90 nm, 100 nm, 200 nm, 300 nm, 400 nm, 500 nm, 600 nm, 700 nm, 800 nm, 900 nm, 1 μm, 2 μm, 3 μm, 4 μm, 5 μm, 6 μm, 7 μm, 8 μm, 9 μm, 10 μm, 20 μm, 30 μm, 40 μm, 50 μm, 60 μm, 70 μm, 80 μm, 90 μm, 100 μm, 200 μm, 300 μm, 400 μm, 500 μm, or greater. The cross-sectional dimension of the plurality of particles may be at most about 500 μm, 400 μm, 300 μm, 200 μm, 100 μm, 90 μm, 80 μm, 70 μm, 60 μm, 50 μm, 40 μm, 30 μm, 20 μm, 10 μm, 9 μm, 8 μm, 7 μm, 6 μm, 5 μm, 4 μm, 3 μm, 2 μm, 1 μm, 900 nm, 800 nm, 700 nm, 600 nm, 500 nm, 400 nm, 300 nm, 200 nm, 100 nm, 90 nm, 80 nm, 70 nm, 60 nm, 50 nm, 40 nm, 30 nm, 20 nm, 10 nm, 9 nm, 8 nm, 7 nm, 6 nm, 5 nm, 4 nm, 3 nm, 2 nm, 1 nm, or smaller.

The plurality of particles (e.g., metallic, intermetallic, and/or ceramic particles) may be present in an amount ranging between about 5 vol % to about 90 vol % in the viscous liquid. The plurality of particles may be present in an amount of at least about 5 vol %, 10 vol %, 15 vol %, 20 vol %, 25 vol %, 30 vol %, 35 vol %, 40 vol %, 45 vol %, 50 vol %, 55 vol %, 60 vol %, 65 vol %, 70 vol %, 75 vol %, 80 vol %, 85 vol %, 90 vol %, or more in the viscous liquid. The plurality of particles may be present in an amount of at most about 90 vol %, 85 vol %, 80 vol %, 75 vol %, 70 vol %, 65 vol %, 60 vol %, 55 vol %, 50 vol %, 45 vol %, 40 vol %, 35 vol %, 30 vol %, 25 vol %, 20 vol %, 15 vol %, 10 vol %, 5 vol %, or less in the viscous liquid.

The viscosity ($\eta_{mix}$) of the viscous liquid comprising the plurality of particles may be dependent on a critical volume fraction ($V_C$) of the plurality of particles in the viscous liquid and the viscosity of the polymeric precursor ($\eta_0$), as shown in Equation 1:

$$\eta_{mix} = \frac{\eta_0}{(1 - V_C)^\alpha} \quad \text{(Equation 1)}$$

where α is a scaling exponent that may range between about 1 to about 2. The critical volume fraction ($V_C$) may be defined as the largest amount of one or more solid materials (e.g., the plurality of particles) that can be added to a mixture (e.g., the viscous liquid) and still allow the mixture to flow freely. The critical volume fraction ($V_C$) may be substantially the same or lower than the maximum packing density (or maximum packing fraction) of non-ordered particles in a given space (e.g., the viscous liquid). The maximum packing density of non-ordered, monodisperse spherical particles may range between about 60% to about 70%. In an example, the maximum packing density of non-ordered, monodisperse spherical particles may be about 64%. In some cases, the maximum packing density of non-ordered, non-spherical particles may be lower than that of the non-ordered, monodisperse spherical particles. Thus, the maximum packing density of the non-ordered, non-spherical particles (e.g., cuboids, fibers) may range between about 2% to about 60% in the viscous liquid. The maximum packing density of non-ordered, non-spherical particles may be at least about 2%, 5%, 10%, 15%, 20%, 25%, 30%, 35%, 40%, 45%, 50%, 55%, 60%, or more in the viscous liquid. The maximum packing density of non-ordered, non-spherical particles may be at most about 60%, 55%, 50%, 45%, 40%, 35%, 30%, 25%, 20%, 15%, 10%, 5%, 2%, or less in the viscous liquid.

In some cases, the maximum packing density of gas or water atomized metal powders that are polydisperse in sizes and non-spherical in shape may range between about 40% to about 60% in the viscous liquid. The maximum packing density of the polydisperse, non-spherical gas atomized metal powders may be at least about 40%, 41%, 42%, 43%, 44%, 45%, 46%, 47%, 48%, 49%, 50%, 51%, 52%, 53%, 54%, 55%, 56%, 57%, 58%, 59%, 60%, or more in the viscous liquid. The maximum packing density of the polydisperse, non-spherical gas atomized metal powders may be at most about 60%, 59%, 58%, 57%, 56%, 55%, 54%, 53%, 52%, 51%, 50%, 49%, 48%, 47%, 46%, 45%, 44%, 43%, 42%, 41%, 40%, or less in the viscous liquid. In some cases, the maximum packing density of milled metal (e.g., titanium, tungsten, aluminum, etc.) particles may be about 5% to about 55% in the viscous liquid. The maximum packing density of milled metal particles may be at least about 5%, 10%, 15%, 20%, 25%, 30%, 35%, 40%, 45%, 50%, 55%, or more in the viscous liquid. The maximum packing density of milled metal particles may be at most about 55%, 50%, 45%, 40%, 35%, 30%, 25%, 20%, 15%, 10%, 5%, or less in the viscous liquid. In an example, the maximum packing density of milled titanium particles is about 45% in a viscous liquid. In another example, the maximum packing density of milled tungsten particles is about 15% in a viscous liquid. In a different example, the maximum packing density of milled aluminum particles is about 41% in a viscous liquid.

During printing the at least the portion of the 3D object, the first light having the first wavelength may be directed from the light source through the window and into the viscous liquid to cure the polymeric precursor into the polymeric material. A thickness (l) of a printed layer comprising the polymeric material may be described as a function of the transmitted energy (E) from the first light, the energy required for curing ($E_C$), and the penetration depth ($d_p$) of the first light into the viscous liquid, as shown in Equation 2:

$$l = d_p \cdot \ln\left[\frac{E}{E_C}\right] \quad \text{(Equation 2)}$$

For the viscous liquid that comprises the plurality of particles loaded near the critical volume fraction ($V_C$), the penetration depth ($d_p$) of the first light may be less than the cross-sectional dimension of the plurality of the particles. Since the thickness (l) of the printed layer may not be thinner than the largest cross-sectional dimension of the plurality of particles, the amount of the transmitted energy (E) from the first light may need to be at least about 3 times greater than the energy required for curing ($E_C$). The amount of the transmitted energy (E) from the first light may be at least about 3, 4, 5, 6, 7, 8, 9, 10, 11, 12, 13, 14, 15, 16, 17, 18, 19, 20 times or more than the energy required for curing ($E_C$). A use of such high transmitted energy from the first light can induce curing and adhesion of a portion of the viscous liquid directly adjacent to the window. However, in the present disclosure, a curing inhibition layer (an inhibition layer) may be formed at the viscous liquid-window interface by shining the second light comprising the second wavelength into the viscous liquid adjacent to the window. The second light may activate the at least one photoinhibitor that can inhibit curing of the polymeric precursor at the viscous liquid-window interface, thereby preventing adhesion of the cured polymeric material to the window.

The viscous liquid may comprise an anti-settling component to prevent settling of the plurality of particles and keep them suspend in the viscous liquid. The anti-settling component may sterically limit the plurality of particles from moving closer to each other. The anti-settling component may not scatter light (e.g., the first light and/or the second light) to avoid negatively affecting the penetration depth of the light into the viscous liquid. The anti-settling component may be present in an amount ranging between about 5 vol % to about 90 vol % in the viscous liquid. The anti-settling component may be present in an amount of at least about 5 vol %, 10 vol %, 15 vol %, 20 vol %, 25 vol %, 30 vol %, 35 vol %, 40 vol %, 45 vol %, 50 vol %, 55 vol %, 60 vol %, 65 vol %, 70 vol %, 75 vol %, 80 vol %, 85 vol %, 90 vol %, or more in the viscous liquid. The anti-settling component may be present in an amount of at most about 90 vol %, 85 vol %, 80 vol %, 75 vol %, 70 vol %, 65 vol %, 60 vol %, 55 vol %, 50 vol %, 45 vol %, 40 vol %, 35 vol %, 30 vol %, 25 vol %, 20 vol %, or less in the viscous liquid. In some cases, the plurality of particles are present in an amount below the critical volume fraction ($V_C$) in the viscous liquid, and the anti-settling component may be added to approximately reach the critical volume fraction ($V_C$) in the viscous liquid.

Examples of the anti-settling component include, but are not limited to, one or more additional particles and a thixotropic additive. The one or more additional particles may be configured to prevent settling of the plurality of particles in the viscous liquid. The one or more additional particles may decrease free space and increase the overall packing density within the viscous liquid, thereby preventing the plurality of particles from settling towards the window during printing. Examples of the one or more additional particles include micronized and/or dispersed waxes such as paraffin, carnuba, montan, Fischer tropsch wax, ethylene bis stearamide, and lignin; micronized polymers such as cellulose, high density polyethylene, polyethylene, polypropylene, oxidized polyethylene (PE), paraformaldehyde, polyethylene glycol, phenolics, and melamine-formaldehyde based materials; and microspheres made from crosslinked polystyrene, polymethyl methacrylate, and/or other copolymers. An example of the one or more additional particles is Byk Ceraflour 929 (micronized, modified polyethylene wax).

The thixotropic additive may be a gel-like or static material that becomes fluid-like when physically disturbed. Such property may be reversible. In the viscous liquid, the thixotropic additive may be configured to create a network to prevent settling of the plurality of particles. The network of the thixotropic additive may be easily disturbed by shearing (e.g., dispensing through the nozzle) the viscous liquid to allow flow. Upon being dispensed through the nozzle, the thixotropic additive may form another network within the viscous liquid to prevent settling of the plurality of particles during printing. Examples of the thixotropic additive include castor wax, oxidized polyethylene wax, amide wax, modified ureas, castor oil derivatives, fumed silica and alumina, Bentonite clays, and mixtures thereof.

In some cases, the anti-settling component of the viscous liquid may be the one or more additional particles, the thixotropic additive, or both.

The viscous liquid may comprise at least one additional additive that is configured to prevent foaming (or induce deaeration) of the viscous liquid. Preventing foaming of the viscous liquid may improve quality of the resulting 3D object. The at least one additional additive may be an amphiphilic material. The at least one additional additive may be a low surface energy material to allow association with each other within the viscous liquid. Such association of the at least one additional additive may trap air bubbles present inside the viscous liquid, migrate towards the viscous liquid-air interface, and release the air bubbles. In some cases, during curing of the photoactive resin, the at least one additional additive may polymerize and/or cross-link with the polymeric precursor. Examples of the one additional additive include silcones, modified silicones, lauryl acrylates, hydrophobic silicas, and modified ureas. An example of the one additional additive may be Evonik Tegorad 2500 (silicon acrylate).

The viscous liquid may comprise an extractable material. The extractable material may be soluble in the polymeric precursor and/or dispersed throughout the viscous liquid. During printing, curing of the polymeric precursor of the photoactive resin of the at least the portion of the viscous liquid may create a first solid phase comprising the polymeric material and a second solid phase comprising the extractable material within the at least the portion of the 3D object. Such process may be a polymerization-induced phase separation (PIPS) step. At least a portion of the plurality of particles may be encapsulated by the first solid phase comprising the polymeric material. In some cases, the at least the portion of the 3D object may be a green body that can be heated to sinter at least a portion of the plurality of particles and burn off at least a portion of other components (i.e., organic components).

Prior to sintering the plurality of particles, the green body may be treated (e.g., immersed, jetted, etc.) with a solvent (liquid or vapor). The solvent may be an extraction solvent. The extractable material may be soluble in the solvent. A first solubility of the extractable material in the solvent may be higher than a second solubility of the polymeric material in the solvent. The solvent may be a poor solvent for the polymeric material. Thus, treating the green body with the solvent may solubilize and extract at least a portion of the extractable material out of the green body into the solvent, and create one or more pores in the at least the portion of the 3D object. In some cases, the one or more pores may be a plurality of pores. In some cases, the green body may be treated with the solvent and heat at the same time. The one or more pores may create at least one continuous porous network in the at least the portion of the 3D object. Such process may be a solvent de-binding step.

The deposition head may be configured to move across the open platform and deposit the film of the viscus liquid over the print window. The film of the viscous liquid may have a thickness ranging between about 1 µm to about 1000 µm. The film of the viscous liquid may have a thickness of at least about 1 µm, 2 µm, 3 µm, 4 µm, 5 µm, 6 µm, 7 µm, 8 µm, 9 µm, 10 µm, 20 µm, 30 µm, 40 µm, 50 µm, 60 µm, 70 µm, 80 µm, 100 µm, 200 µm, 300 µm, 400 µm, 500 µm, 600 µm, 700 µm, 800 µm, 900 µm, 1000 µm, or more. The film of the viscous liquid may have a thickness of at most about 1000 µm, 900 µm, 800 µm, 700 µm, 600 µm, 500 µm, 400 µm, 300 µm, 200 µm, 100 µm, 90 µm, 80 µm, 70 µm, 60 µm, 50 µm, 40 µm, 30 µm, 20 µm, 10 µm, 9 µm, 8 µm, 7 µm, 6 µm, 5 µm, 4 µm, 3 µm, 2 µm, 1 µm, or less. The thickness of the film of the viscous liquid may have a tolerance ranging between about 1 µm to about 10 µm. The thickness of the film of the viscous liquid may have a tolerance of at least about 1 µm, 2 µm, 3 µm, 4 µm, 5 µm, 6 µm, 7 µm, 8 µm, 9 µm, 10 µm, or more. The thickness of the film of the viscous liquid may have a tolerance of at most about 10 µm, 9 µm, 8 µm, 7 µm, 6 µm, 5 µm, 4 µm, 3 µm, 2 µm, 1 µm, or less.

The viscous liquid may be stored in the source of the viscous liquid. The source of the viscous liquid may be a cup, container, syringe, or any other repository that can hold the viscous liquid. The source of the viscous liquid may in fluid communication (e.g., via a passageway) with the nozzle in the deposition head. The source of the viscous liquid may be connected to a flow unit. The flow unit may provide and control flow of the viscous liquid from the source of the viscous liquid towards the nozzle, thereby dispensing the viscous liquid. Alternatively or in addition to, the flow unit may provide and control flow of the viscous liquid in a direction away from the nozzle and towards the source of the viscous liquid, thereby retrieving the viscous liquid. In some cases, the flow unit may use pressure mechanisms to control the speed and direction of the flow of the viscous liquid. The flow unit may be a syringe pump, vacuum pump, an actuator (e.g., linear, pneumatic, hydraulic, etc.), a compressor, or any other suitable device to exert pressure (positive or negative) to the viscous liquid in the source of the viscous liquid. The controller may be operatively coupled to the flow unit the control the speed, duration, and/or direction of the flow of the viscous liquid.

The source of the viscous liquid may comprise a sensor (e.g., an optical sensor) to detect the volume of the viscous liquid. The controller may be operatively coupled to the sensor to determine when the source of the viscous liquid may be replenished with new viscous liquid. Alternatively or in addition to, the source of the viscous liquid may be removable. The controller may determine when the source of the viscous liquid may be replaced with a new source of the viscous liquid comprising with the viscous liquid.

The deposition head may comprise the nozzle. The nozzle may be in fluid communication with the source of the viscous liquid. The deposition head may dispense the viscous liquid over the print window through the nozzle as a process of depositing the film of the viscous liquid over the print window. In some cases, the deposition head may retrieve any excess viscous liquid from the print window back into the source of the viscous liquid through the nozzle.

In some cases, the source of the viscous liquid may be connected to the flow unit to provide and control flow of the viscous liquid towards or away from the nozzle of the deposition head. Alternatively or in addition to, the nozzle may comprise a nozzle flow unit that provides and controls flow of the viscous liquid towards or away from the print window. Examples of the nozzle flow unit include a piezoelectric actuator and an auger screw that is connected to an actuator.

The deposition head may comprise a wiper. The wiper may be movable along a direction towards and/or away from the print window. The wiper may have a variable height relative to the print window. The deposition head may comprise an actuator connected to the wiper to control movement of the wiper in a direction towards and away from the print window. The actuator may be a mechanical, hydraulic, pneumatic, or electro-mechanical actuator. The controller may be operatively coupled to the actuator to control the movement of the wiper in a direction towards and away from the print window. Alternatively or in addition to, a vertical distance between the wiper and the print window (e.g., a distance perpendicular to the print window) may be static. In some cases, the deposition head may comprise a plurality of wipers with different configurations. In some cases, the deposition head may comprise the nozzle and three wipers.

The wiper of the deposition head may be configured to (i) reduce or inhibit flow of the viscous liquid out of the deposition head, (ii) flatten the film of the viscous liquid, and/or (iii) remove any excess of the viscous liquid. In an example, the wiper may be configured to be in contact with the print window and reduce or inhibit flow of the viscous liquid out of the deposition head. In another example, the wiper may be movable along a direction away from the print window and configured to flatten the film of the viscous liquid. The wiper may flatten the film of the viscous liquid to a defined height (or thickness). In a different example, the wiper may be movable along a direction away from the print window and configured to remove the excess of the viscous liquid.

The wiper may comprise polymer (e.g., rubber, silicone), metal, or ceramic. In some cases, the wiper may comprise (e.g., entirely or as a coating) one or more fluoropolymers that prevent adhesion of the viscous liquid on the wiper. Examples of the one or more fluoropolymers include polyvinylidene fluoride (PVDF), ethylenchlorotrifluoroethylene (ECTFE), ethylenetetrafluoroethylene (ETFE), polytetrafluoroethylene (PTFE), perfluoroalkoxy (PFA), and modified fluoroalkoxy (a copolymer of tetrafluoroethylene and perfluoromethylvinylether, also known as MFA).

In some cases, the wiper of the deposition head may be a blade (e.g., a squeegee blade, a doctor blade). The blade may have various shapes. In some cases, the blade may be straight and/or curved. In some cases, the wiper may be a straight blade with a flat surface. In some cases, the wiper may be a straight blade with a curved surface. In some cases, the wiper may be a curved blade (curved along the long axis of the wiper) with a flat surface. In some cases, the wiper may be a curved blade (curved along the long axis of the wiper) with a curved surface. In some cases, the wiper may comprise at least one straight portion and at least one curved portion along its length. In an example, the wiper may be a blade comprising a straight central portion between two curved portions.

In an example, the wiper may be a straight blade and configured perpendicular to the print window. In another example, the wiper may be a straight blade with a flat surface, and tilted at an angle. When the deposition head moves to remove any excess viscous liquid from the print window, the tilted straight blade may concentrate the excess resin at the bottom of the blade. The straight blade may be tilted at an angle ranging between about 1 degree to about 50 degrees. The straight blade may be tilted at an angle of at least about 1 degree, 2 degrees, 3 degrees, 4 degrees, 5 degrees, 6 degrees, 7 degrees, 8 degrees, 9 degrees, 10 degrees, 20 degrees, 30 degrees, 40 degrees, 50 degrees, or more. The straight blade may be tiled at an angle of at most about 50 degrees, 40 degrees, 30 degrees, 20 degrees, 10 degrees, 9 degrees, 8 degrees, 7 degrees, 6 degrees, 5 degrees, 4 degrees, 3 degrees, 2 degrees, 1 degree, or less.

In a different example, the wiper may be a straight blade with a curved surface (a curved blade). When the deposition head moves to remove any excess viscous liquid from the print window, the curved blade may concentrate the excess resin in the center of the concave surface of the wiper. The curved blade may reduce or prevent the excess resin from spilling out from the sides of the blade. A radius of curvature of the surface of the blade may range between about 10 millimeter (mm) to about 1000 mm. The radius of curvature of the surface of the blade may be at least about 10 mm, 20 mm, 30 mm, 40 mm, 50 mm, 60 mm, 70 mm, 80 mm, 90 mm, 100 mm, 200 mm, 300 mm, 400 mm, 500 mm, 1000 mm, or more. The radius of curvature of the surface of the blade may be at most about 1000 mm, 500 mm, 400 mm, 300 mm, 200 mm, 100 mm, 90 mm, 80 mm, 70 mm, 60 mm, 50 mm, 40 mm, 30 mm, 20 mm, 10 mm, or less.

In some cases, the wiper of the deposition head may be a roller. The roller may have a surface that is flat or textured. The roller may be configured to rotate clockwise and/or counterclockwise while the deposition head moves across the print window. Alternatively or in addition to, the roller may be configured to be static while the deposition head moves across the print window. In some cases, the wiper of the deposition head may be a rod. The rod may have a surface that is flat or textured. The rod may be configured to rotate clockwise and/or counterclockwise while the deposition head moves across the print window. Alternatively or in addition to, the rod may be configured to be static while the deposition head moves across the print window. In an example, the rod may be a wire wound rod, also known as a Meyer rod.

The deposition head may comprise a slot die. The slot die may be configured to move along a direction away from the print window. The slot die may be height adjustable with respect to the print window. The slot die may comprise a channel in fluid communication with the source of the viscous liquid. The channel may comprise a first opening to receive the viscous liquid from the source of the viscous liquid. The channel may comprise a second opening opposite of the first opening to dispense the viscous liquid to the print window. The second opening may be an injection point. In some cases, the channel may have a reservoir between the first and second openings to hold a volume of the viscous liquid. The injection point of the slot die may comprise a flat surface to flatten the film of the viscous liquid to a defined height (or thickness).

The deposition head comprising the slot die may include a separate nozzle to suction and retrieve any excess viscous liquid from the film of the viscous liquid during printing. The separate nozzle of the deposition head comprising the slot die may be in fluid communication with a repository to collect the excess viscous liquid. The repository may be a recycling bin. The repository may also be in fluid communication with the slot die to send the excess viscous liquid collected in the repository back into the reservoir of the slot die. Alternatively or in addition to, the collected excess viscous liquid may be removed for reprocessing. The reprocessing of the collected excess viscous liquid may comprise (i) filtering out any polymerized solid particulates, (ii) filtering out any of the plurality of particles that may be greater than a target particle size, (iii) remixing the viscous liquid to ensure homogeneity, and/or (iv) removing at least a portion of air entrapped in the viscous liquid. In some cases, the at least the portion of air entrapped in the viscous liquid may be removed by centrifuging the viscous liquid.

In some cases, the system may further comprise an additional deposition head comprising an additional nozzle. The additional nozzle of the additional deposition head may be in fluid communication with an additional source of an additional viscous liquid. In some cases, the nozzle of the deposition head of the system may be in fluid communication with the source of the viscous liquid and the additional source of the additional viscous liquid. Alternatively or in addition to, the deposition head may comprise a first nozzle in fluid communication with the source of the viscous liquid, and (b) a second nozzle in fluid communication with the additional source of the additional viscous liquid. The presence of the additional source of the additional viscous liquid may allow printing at least a portion of a 3D object comprising multiple materials (multi-materials) in different layers and/or in different portions within the same layer.

The viscous liquid and the additional viscous liquid may be the same. As an alternative, the viscous liquid and the additional viscous liquid may be different. The viscous liquid and the additional viscous liquid may comprise different types of the photoactive resin, the plurality of particles, or both. Alternatively or in addition to, the viscous liquid and the additional viscous liquid may comprise different amounts (concentrations by weight or volume) of the photoactive resin, the plurality of particles, or both. In an example, the viscous liquid may comprise metallic particles, and the additional viscous liquid may comprise ceramic particles. A first concentration of the metallic particles in the viscous liquid and a second concentration of the ceramic particles in the additional viscous liquid may be the same or different. A first photoactive resin in the viscous liquid and a second photoactive resin in the additional viscous liquid may be the same or different. In another example, the viscous liquid may comprise a first type of metallic particles, and the additional viscous liquid may comprise a second type of metallic particles. In a different example, the viscous liquid may comprise ceramic particles at a first concentration, and the additional viscous liquid may comprise the same ceramic particles at a second concentration that is different from the first concentration.

The system may comprise a build head. The build head may be configured to hold and/or support at least a portion (e.g., a layer) of the 3D object. During printing, the at least the portion of the 3D object may be printed on the build head. The build head may be configured to move relative to the print window during printing. The build head may be configured to move along a direction away from the print window during printing. Such movement may be relative movement, and thus the moving piece may be the build head, the print window, or both. In some cases, the build head may be connected to a build head actuator for moving the build head relative to the print window. The build head actuator may be a mechanical, hydraulic, pneumatic, or electro-mechanical actuator. Alternatively or in addition to, the open platform comprising the print window may be connected to an open platform actuator for moving the open platform relative to the build head. The open platform actuator may be a mechanical, hydraulic, pneumatic, or electro-mechanical actuator. The controller may be operatively coupled to the build head actuator and/or the open platform actuator to control the relative distance between the build head and the print window. The relative distance between the build head and the print window may be adjusted to adjust a thickness of a layer within the at least the portion of the 3D object.

The system may comprise a cleaning zone. The cleaning zone may be configured adjacent to the open platform. The cleaning zone may be configured in a path of movement of the deposition head across the open platform. The cleaning zone may be configured to clean the deposition head. Cleaning the deposition head may (i) improve reliability and reproducibility of printing at least the portion of the 3D object, and (ii) reduce wear and tear of the deposition head. The deposition head may be static or move relative to the cleaning zone while the cleaning zone cleans the deposition head. The cleaning zone may comprise a wiper, a nozzle configured to provide at least one cleaning solvent, or both. The wiper of the cleaning zone may be a blade (e.g., a doctor blade), a roller, or a rod. In some cases, one or more wipers of the cleaning zone may come in contact with one or more wipers of the deposition head and remove any excess resin remaining on the one or more wipers of the deposition head. In some cases, one or more nozzles of the cleaning zone may dispense or jet the at least one cleaning solvent to the one or more wipers of the deposition head for cleaning. The one or more nozzles of the cleaning zone may be in fluid communication with at least one source of the at least one cleaning solvent. At least a portion of the viscous liquid may be soluble in the at least one cleaning solvent. The cleaning zone may comprise a repository that can hold the excess viscous liquid that is removed from the deposition head and/or the at least one cleaning solvent.

The system may comprise a repository (e.g., vat or container) adjacent to the open platform. The repository may be configured to collect the viscous liquid from the film of the deposition head. The repository may be configured to hold any excess viscous liquid that is removed from the print window by the deposition head. After removing any excess viscous liquid from the print window, the deposition head may move and use at least one wiper to collect the excess viscous liquid into the repository. The repository may be a recycling bin. The repository may be in fluid communication with the source of the viscous liquid to recycle the collected excess viscous liquid for printing. Alternatively or in addition to, the collected excess viscous liquid may be removed for reprocessing. The reprocessing of the collected excess viscous liquid may comprise (i) filtering out any polymerized solid particulates, (ii) filtering out any of the plurality of particles that may be greater than a target particle size, (iii) remixing the viscous liquid to ensure homogeneity, and/or (iv) removing at least a portion of air entrapped in the viscous liquid. In some cases, the at least the portion of air entrapped in the viscous liquid may be removed by centrifuging the viscous liquid. In some cases, the repository may comprise a sensor (e.g., an optical sensor or a weight scale) to detect when the repository is full and/or when an amount of the collected excess viscous liquid is above a predefined threshold.

The system may comprise a sensor. The sensor may be configured to move across the open platform and/or measure a thickness of at least a portion of the film of the viscous liquid. In some cases, the sensor may assess integrity of the film of the viscous liquid before inducing polymerization of the polymeric precursors in the photoactive resin in the film of the viscos liquid. The sensor may detect any variation in thickness across the film. The sensor may detect any irregularities (e.g., defects, empty spots, solid particles, etc.) in the film. In some cases, the sensor may be configured to perform quality control after printing at least a portion (e.g., a layer) of the 3D object. The sensor may scan a remaining portion of the film of the viscous liquid after printing, and the controller that is operatively coupled to the sensor may determine if the previous printing process was successful or not. In some cases, the sensor may be an optical profilometer (e.g., an in-line profilometer).

The system may comprise a transparent film adjacent to the open platform and configured to hold the film of the viscous liquid. The transparent film may cover the print window. The transparent film may comprise one or more fluoropolymers that reduce adhesion of a cured portion of the viscous liquid on the transparent film. Examples of the one or more fluoropolymers include polyvinylidene fluoride (PVDF), ethylenchlorotrifluoroethylene (ECTFE), ethylenetetrafluoroethylene (ETFE), polytetrafluoroethylene (PTFE), perfluoroalkoxy (PFA), and modified fluoroalkoxy (a copolymer of tetrafluoroethylene and perfluoromethylvinylether, also known as MFA). The transparent film may reduce or eliminate any undesirable force (e.g., a sliding or rotational mechanism) that may otherwise be needed to separate the cured portion of the viscous liquid and the print window. This may yield a reduced failure rate and increased printing speed.

The system may comprise a motion stage adjacent to the open platform. The motion stage may be coupled to the deposition head and configured to direct movement of the deposition head across the open platform. In addition, the motion stage may be coupled to one or more other components of the system that move across the platform (e.g., an additional deposition head, a sensor, etc.). The motion stage may be connected to an actuator that is configured to direct movement of the motion stage. The actuator may be a mechanical, hydraulic, pneumatic, electro-mechanical, or magnetic actuator. The controller may be operatively coupled to the actuator to control movement of the motion stage. Alternatively or in addition to, the system may comprise an additional motion stage coupled to the open platform to direct movement of the open platform relative to other components of the system.

The system may comprise the optical source that provides the light through the print window for curing the at least the portion of the film of the viscous liquid. In some cases, the light of the optical source may comprise a first wavelength for curing the photoactive resin in a first portion of the film of the viscous liquid. The first wavelength may activate the at least one photoinitiator of the photoactive resin, thereby initiating curing of the polymeric precursors into the polymeric material. The light may be a photoinitiation light, and the first portion of the film may be a photoinitiation layer. The optical source may provide an additional light having a second wavelength for inhibiting curing of the photoactive resin in a second portion of the film of the viscous liquid. The first wavelength and the second wavelength may be different. The second wavelength may activate the at least one photoinhibitor of the photoactive resin, thereby inhibiting curing of the polymeric precursors into the polymeric material. The additional light may be a photoinhibition light, and the second portion of the film of the viscous liquid may be a photoinhibition layer. In some cases, a dual-wavelength projector (e.g., a dual-wavelength laser) may be used as the optical source that provides both the photoinitiation light and the photoinhibition light.

In some cases, the light of the optical source may comprise a first wavelength for curing the photoactive resin in a first portion of the film of the viscous liquid. The first wavelength may activate the at least one photoinitiator of the photoactive resin, thereby initiating curing of the polymeric precursors into the polymeric material. The light may be a photoinitiation light, and the first portion of the film may be a photoinitiation layer. The light may be a patterned light. The system may further comprise an additional optical source comprising an additional light having a second wavelength for inhibiting curing of the photoactive resin in a second portion of the film of the viscous liquid. The first wavelength and the second wavelength may be different. The second wavelength may activate the at least one photoinhibitor of the photoactive resin, thereby inhibiting curing of the polymeric precursors into the polymeric material. The additional light may be a photoinhibition light, and the second portion of the film of the viscous liquid may be a photoinhibition layer. The additional light may be a flood light.

The optical source that directs the photoinitiation light may be a mask-based display, such as a liquid crystal display (LCD) device, or light emitting, such as a discrete light emitting diode (LED) array device. Alternatively, the optical source that directs the photoinitiation light may be a digital light processing (DLP) device, including a digital micromirror device (DMD) for producing patterned light that can selectively illuminate and cure 3D printed structures. The initiation light directed from the DLP device may pass through one or more projection optics (e.g., a light projection lens) prior to illuminating through the print window and to the film of the viscous liquid. The one or more projection optics may be integrated in the DLP device. Alternatively or in addition to, the one or more projection optics or may be configured between the DLP device and the print window. A relative position of the one or more projection optics relative to the DLP device and the print window may be adjustable to adjust an area of the photoinitiation layer in the film of the viscous liquid. The area of the photoinitiation layer may be defined as a build area. In some cases, the one or more projection optics may be on a projection optics platform. The projection optics platform may be coupled to an actuator that directs movement of the projection optics platform. The controller may be operatively coupled to the actuator to control movement of the projection optics platform. The controller may direct the actuator (e.g., a screw-based mechanism) to adjust a relative position of the one or more projection optics to the DLP device and the print window during printing the 3D object.

The additional optical source that directs the photoinhibition light may comprise a plurality of light devices (e.g., a plurality of light emitting diodes (LEDs)). The light devices may be on a light platform. The light platform may be configured (i) move relative to the print window and (ii) yield a uniform projection of the photoinhibition light within the photoinhibition layer in the film of the viscous liquid adjacent to the print window. In some cases, the position of the light platform may be independently adjustable with respect to a position of the optical source that directs the photoinitiation light. The light platform comprising the plurality of light devices may be arranged with respect to the print window such that a peak intensity of each of the plurality of light devices is directed at a different respective position (e.g., corner or other position) of the build area. In an example, the build area may have four corners and a separate beam of light (e.g., a separate LED) may be directed to each corner of the build area. The beams of photoinhibition light from the plurality of light devices may overlap to provide the uniform projection of the photoinhibition light within the photoinhibition layer. The light platform may be coupled to an actuator that directs movement of the light platform. The controller may be operatively coupled to the actuator to control movement of the light platform. The controller may direct the actuator (e.g., a screw-based mechanism) to adjust a relative position of the plurality of light devices to the print window during printing the 3D object. In some cases, the one or more projection optics to the DLP device (for the photoinitiation light) may be on the light platform.

Whether using one optical source or two optical sources, the photoinhibition light may be configured to create the photoinhibition layer in the film of the viscous liquid adjacent to the print window. In some cases, the photoinhibition light may be configured to form the photoinhibition layer in the film of the viscous liquid adjacent to the transparent film that is covering the print window. Furthermore, the photoinitiation light may be configured to cure the photoactive resin in the photoinitiation layer that resides between the photoinhibition layer and the build head. The photoactive resin in the photoinitiation layer may be cured into at least a portion of the 3D structure. In some cases, the photoinitiation light may be configured to cure the photoactive resin in the photoinitiation layer that resides between the photoinhibition layer and the at least the portion of the 3D structure adjacent to the build head.

A thickness of the photoinitiation layer, the photoinhibition layer, or both may be adjusted by adjusting an intensity and duration of the photoinitiation light, the photoinhibition light, or both. The thickness of the photoinitiation layer, the photoinhibition layer, or both may be adjusted to adjust the thickness of the printed layer of the at least the portion of the 3D object. Alternatively or in addition to, the thickness of the photoinitiation layer, the photoinhibition layer, or both may be adjusted by adjusting the speed at which the build head moves away in a direction away from the print window.

The system may comprise the controller to control various parts (e.g., actuators, sensors, etc.) of different components of the 3D printing system, as described in detail above.

In another aspect, the present disclosure provides a method for printing a 3D object. The method may comprise providing a deposition head adjacent to an open platform comprising a print window. The deposition head may be movable across the open platform. The deposition head may comprise a nozzle in fluid communication with a source of a viscous liquid comprising a photoactive resin. The deposition head may comprise a wiper. The method may comprise moving the deposition head across the open platform and dispensing the viscous liquid through the nozzle to deposit a film of the viscous liquid over the print window. The method may comprise directing light through the print window to the film to cure the photoactive resin in at least a portion of the film, thereby printing at least a portion of the 3D object.

In some cases, the method may further comprise configuring the wiper to be in contact with the print window, and using the wiper to reduce or inhibit flow of the viscous liquid out of the deposition head while moving the deposition head to deposit the film.

In some cases, the method may further comprise configuring the wiper at a distance away from the print window, and using the wiper to flatten the film of the viscous liquid into a desired thickness while moving the deposition head. The desired thickness of the film of the viscous liquid may be substantially the same as the distance between the wiper and the print window. The distance between the wiper and the print window may be adjustable. Thus, the thickness of the film of the viscous liquid may be adjustable. The thickness of the film may be adjusted to control a thickness of the at least the portion of the 3D object. In some cases, after printing the at least the portion of the 3D object, the method may further comprise moving the deposition head cross the open platform in a first direction, and using the wiper of the deposition head that is in contact with the print window to remove any excess of the viscous liquid from the print window. Furthermore, in some cases, the deposition head may further comprise an additional wiper. After moving the deposition head in the first direction and using the wiper to remove the excess of the viscous liquid from the print window, the method may further comprise moving the deposition head in the second direction opposite of the first direction and using the additional wiper to collect the excess of the viscous liquid between the additional wiper and the wiper within the deposition head.

The excess of the viscous liquid may be collected and used (recycled) to deposit an additional film of the viscous liquid over the print window. In some cases, if a volume of the excess of viscous liquid collected by the deposition head is not sufficient to deposit the additional film, the nozzle of the deposition head may dispense more viscous liquid into the collected excess of viscous liquid. In an example, the controller may use a computer model of the 3D object, such as a computer-aided design (CAD) stored in a non-transitory computer storage medium, to determine theoretical amounts of (i) the viscous liquid used in a first printing step and (ii) the excess of the viscous liquid remaining on the print window. The controller may also use the computer model of the 3D object to determine a theoretical amount of the viscous liquid needed to deposit a film of the viscous liquid for the second printing step. If the volume of the collected excess of viscous liquid is not sufficient for the second printing step, the controller may direct the nozzle to dispense more viscous liquid. In some cases, the system may comprise a repository (e.g., vat or container) adjacent to the open platform. After each printing step, the deposition head may move to the repository and collect the excess viscous liquid into the repository. The collected excess viscous liquid may be reprocessed and used for printing.

The deposition head may be coupled to a motion stage adjacent to the open platform. Thus, the method may comprise moving the motion stage to move the deposition head across the open platform to at least deposit the film of the viscous liquid on the print window. The open platform may have different shapes (e.g., rectangle or ring), and movement of the motion stage may have different shapes. In some cases, the motion stage may move linearly, thereby directing the deposition head in a first direction and/or in a second direction that is opposite to the first direction. In some cases, the motion stage may move circularly, thereby direction the deposition clockwise and/or counterclockwise.

The method may comprise providing a build head for holding at least a portion of the 3D object. Prior to directing the light through the print window and to the film of the viscous liquid, the method may further comprise moving the build head towards the print window and bringing in contact with the film of the viscous liquid. Subsequent to directing the light to cure at least a portion of the photoactive resin in the film of viscous liquid between the print window and the build head, the method may further comprise moving the build head in a direction away from the print window. In some cases, the method may further comprise moving the build head in the direction away from the window while forming the 3D object. The rate of movement of the build head may be controlled to adjust a thickness of one or more layers in the 3D object. A surface of the build head in contact with a first layer of the 3D object may be smooth, knurled, or serrated to adjust contact surface area and/or frictional force between the surface and the first layer of the 3D object. Alternatively or in addition to, the first layer of the 3D object may be a support layer for the 3D object that may be removed post-processing.

The method may comprise using a plurality of viscous liquids for printing the 3D objet. In some cases, the method may comprise providing an additional deposition head comprising an additional nozzle. The additional nozzle may be in fluid communication with an additional source of an additional viscous liquid. The method may further comprise moving the additional deposition head across the open platform and depositing a film of the additional viscous liquid over the print window. In some cases, the method may comprise providing the additional source of the additional viscous liquid that is in fluid communication with the nozzle of the deposition head. The method may further comprise dispensing the additional viscous liquid through the nozzle to the print window during printing. Alternatively or in addition to, the method may comprise providing the additional source of the additional viscous liquid that is in fluid communication with an additional nozzle in the deposition head. The method may further comprise dispensing the additional viscous liquid through the additional nozzle to the print window during printing.

The method may comprise providing a cleaning zone adjacent to the open platform. The method may further comprise moving the deposition head to the cleaning zone and activating the cleaning zone to clean the deposition head. The deposition head may be cleaned prior to depositing a new film of the viscous liquid. The deposition head may be cleaned subsequent to printing at least a portion of the 3D object.

The method may comprise providing a sensor (e.g., an optical profilometer) adjacent to the open platform. The method may further comprise moving the sensor across the open platform and using the sensor to measure a thickness of at least a portion of the film of the viscous liquid prior and/or subsequent to printing at least a portion of the 3D object. In some cases, the sensor may detect an irregularity in the thickness and/or a defect (e.g., a hole) in the film of the viscous liquid, and the sensor may alert the controller to direct the deposition head to clean the print window and re-deposit the film of the viscous liquid.

The method may comprise providing a transparent film adjacent to the print window. The transparent film may cover the print window. The transparent film may comprise one or more fluoropolymers that reduce adhesion of a cured portion of the viscous liquid on the transparent film. The method may further comprise directing the light through the print window, through the transparent film, and to the film of the viscous liquid to cure the photoactive resin in the at least the portion of the film of the viscous liquid, thereby printing at least a portion of the 3D object.

The method may comprise using a plurality of wavelengths of light for printing at least a portion of the 3D object. The method may comprise directing the light comprising a first wavelength to cure the photoactive resin in a first portion of the film of the viscous liquid. The light comprising the first wavelength may activate at least one photoinitiator to initiate curing of polymeric precursors into a polymeric material to form the least the portion of the 3D object. The method may further comprise directing an additional light having a second wavelength to inhibit curing of the photoactive resin in a second portion of the film of the viscous liquid. The first wavelength and the second wavelength may be different. The additional light have a second wavelength may activate at least one photoinhibitor to inhibit curing of the polymeric precursors into the polymeric material in the second portion of the film adjacent to the print window.

In some cases, the method may comprise providing the light comprising the first wavelength using an optical source. The method may comprise providing the additional light comprising the second wavelength using an additional optical source. The method may further comprise adjusting a position of the additional optical source independently and relative to a position of the optical source. In some cases, the method may further comprise providing a light platform to hold the additional optical source. The method may further comprise, prior to curing the photoactive resin in the first portion of the film of the viscous liquid, moving the light platform relative to the print window and yielding a uniform projection of the additional light within the second portion of the film of the viscous liquid adjacent to the print window.

In some cases, the method may comprise providing the light comprising the first wavelength and the additional light comprising the second wavelength by the same optical source.

In a different aspect, the present disclosure provides a method for printing a 3D object. The method may comprise providing a resin (e.g., a viscous liquid) adjacent to a build surface (e.g., the open platform comprising the print window). The resin may comprise a polymeric precursor. The resin may comprise at least one photoinitiator that is configured to initiate formation of a polymeric material from the polymeric precursor. The resin may comprise at least one photoinhibitor that is configured to inhibit formation of the polymeric material from the polymeric precursor. The resin may comprise a plurality of particles (e.g., metallic, intermetallic, and/or ceramic particles) for forming at least a portion of the 3D object. The method may comprise exposing the resin (e.g., the viscous liquid) to a first light under conditions sufficient to cause the at least one photoinitiator to initiate formation of the polymeric material from the polymeric precursor. The polymeric material may encapsulate the plurality of particles. The method may comprise exposing the resin to a second light under conditions sufficient to cause the at least one photoinhibitor to inhibit formation of the polymeric material adjacent to the build surface. The plurality of particles encapsulated in the polymeric material may be usable for forming at least a portion the 3D object.

The method may further comprise repeating, one or more times, (a) providing the resin to the build surface and (b) exposing the resin to (i) the first light to initiate the formation of the polymeric material in and (ii) the second light to inhibit the formation of the polymeric material adjacent to the build surface.

In some cases, the first light may comprise a first wavelength and the second light may comprise a second wavelength. The first and second wavelengths may be different. The first wavelength may be sufficient to activate the at least one photoinitiator, and the second wavelength may be sufficient to activate the at least one photoinhibitor. The first light may be a photoinitiation light, and the second light may be a photoinhibition light.

The method may further comprise providing a build head adjacent to the build surface. The at least the portion of the 3D object may be formed adjacent to the build head. Additional portions of the 3D object may be formed adjacent to the at least the portion of the 3D object on the build head. During formation of the 3D object, the build head may be moved along a direction away from the build surface. The controller operatively coupled to the build head may be used to adjust a relative distance between the build head and the build surface, thereby adjusting a thickness of a photoinhibition layer within the resin adjacent to the build surface, a photoinitiation layer between the photoinhibition layer and the build head, or both.

The build surface may comprise an optically transparent window. Accordingly, the method may comprise exposing the resin to the photoinitiation light and/or the photoinhibition light through the optically transparent window.

The polymeric precursor of the resin may comprise monomers. Accordingly, the method may comprise exposing the resin to the first light to induce polymerization of the monomers to generate the polymeric material. Alternatively or in addition to, the polymeric precursor of the resin may comprise oligomers. Accordingly, the method may comprise exposing the resin to the first light to induce cross-linking between the oligomers to generate the polymeric material.

The resin may further comprise at least one dye (e.g., an ultraviolet (UV) absorber) configured to absorb the second light (the photoinhibition light). Accordingly, the method may comprise exposing the resin to the second light to initiate the at least one dye to reduce an amount of the second light exposed to the at least one photoinhibitor in at least a portion of the resin.

Once the at least the portion of the 3D object is printed (herein referred to as a green body), the method may further comprise removing the green body from the build head. The green body may be separated from the build head by inserting a thin material (e.g. a steel blade) between the green body and the build head. In some cases, a first layer of the green body that is in contact with the build head may not comprise the plurality of particles for easy removal from the build head by the thin material. The method may further comprise washing the green body. In some cases, the green body may be washed by jetting a solvent (e.g., isopropanol) to remove any excess polymeric precursor.

The method may further comprise subjecting the green body comprising at least the polymeric material to heating (e.g., in a furnace), to thereby heat at least the plurality of particles encapsulated in the at least the polymeric material. The heating may be under conditions sufficient to sinter the plurality of particles to form a final product that is at least a portion of a 3D object or an entire 3D object. During heating (e.g., sintering), the organic components (e.g., the polymeric material, additives, etc.) may decompose and leave the green body. At least a portion of the decomposed organic components may leave the green body in gas phase.

The green body may be heated in a processing chamber. The temperature of the processing temperature may be regulated with at least one heater. The processing chamber may be an oven or a furnace. The oven or furnace may be heated with various heating approaches, such as resistive heating, convective heating and/or radiative heating. Examples of the furnace include an induction furnace, electric arc furnace, gas-fired furnace, plasma arc furnace, microwave furnace, and electric resistance furnace. Such heating may be employed at a fixed or variating heating rate from an initial temperature to a target temperature or temperature range.

A green body comprising metallic and/or intermetallic particles may be heated from room temperature to a processing temperature. The processing temperature may be kept constant or substantially constant for a given period of time, or may be adjusted to one or more other temperatures. The processing temperature may be selected based on the material of the particles in the green body (e.g., the processing temperature may be higher for material having a higher melting point than other materials). The processing temperature may be sufficient to sinter but not completely melt the particles in the green body. As an alternative, the processing temperature may be sufficient to melt the particles in the green body.

The processing temperature for heating (e.g., sintering) the green body (including the metal and/or intermetallic particles) may range between about 300 degrees Celsius to about 2200 degrees Celsius. The processing temperature for sintering the green body may be at least about 300 degrees Celsius, 350 degrees Celsius, 400 degrees Celsius, 450 degrees Celsius, 500 degrees Celsius, 550 degrees Celsius, 600 degrees Celsius, 650 degrees Celsius, 700 degrees Celsius, 750 degrees Celsius, 800 degrees Celsius, 850 degrees Celsius, 900 degrees Celsius, 950 degrees Celsius, 1000 degrees Celsius, 1050 degrees Celsius, 1100 degrees Celsius, 1150 degrees Celsius, 1200 degrees Celsius, 1250 degrees Celsius, 1300 degrees Celsius, 1350 degrees Celsius, 1400 degrees Celsius, 1450 degrees Celsius, 1500 degrees Celsius, 1550 degrees Celsius, 1600 degrees Celsius, 1700 degrees Celsius, 1800 degrees Celsius, 1900 degrees Celsius, 2000 degrees Celsius, 2100 degrees Celsius, 2200 degrees Celsius, or more. The processing temperature for sintering the green body (including the particles) may be at most about 2200 degrees Celsius, 2100 degrees Celsius, 2000 degrees Celsius, 1900 degrees Celsius, 1800 degrees Celsius, 1700 degrees Celsius, 1600 degrees Celsius, 1550 degrees Celsius, 1500 degrees Celsius, 1450 degrees Celsius, 1400 degrees Celsius, 1350 degrees Celsius, 1300 degrees Celsius, 1250 degrees Celsius, 1200 degrees Celsius, 1150 degrees Celsius, 1100 degrees Celsius, 1050 degrees Celsius, 1000 degrees Celsius, 950 degrees Celsius, 900 degrees Celsius, 850 degrees Celsius, 800 degrees Celsius, 750 degrees Celsius, 700 degrees Celsius, 650 degrees Celsius, 600 degrees Celsius, 550 degrees Celsius, 500 degrees Celsius, 450 degrees Celsius, 400 degrees Celsius, 350 degrees Celsius, 300 degrees Celsius, or less.

In an example, a green body comprising aluminum particles may be heated from room temperature to a processing temperature ranging between about 350 degrees Celsius to about 700 degrees Celsius. In another example, a green body comprising copper particles may be heated from room temperature to a processing temperature of about 1000 degrees Celsius. In another example, a green body comprising stainless steel particles may be heated from room temperature to a processing temperature ranging between about 1200 degrees Celsius to about 1500 degrees Celsius. In another example, a green body comprising other tool steel particles may be heated from room temperature to a processing temperature of about 1250 degrees Celsius. In another example, a green body comprising tungsten heavy alloy particles may be heated from room temperature to a processing temperature of about 1500 degrees Celsius.

During sintering the green body comprising the metallic and/or intermetallic particles, the temperature of the processing chamber may change at a rate ranging between about 0.1 degrees Celsius per minute (degrees Celsius/min) to about 200 degrees Celsius/min. The temperature of the processing chamber may change at a rate of at least about 0.1 degrees Celsius/min, 0.2 degrees Celsius/min, 0.3 degrees Celsius/min, 0.4 degrees Celsius/min, 0.5 degrees Celsius/min, 1 degrees Celsius/min, 2 degrees Celsius/min, 3 degrees Celsius/min, 4 degrees Celsius/min, 5 degrees Celsius/min, 6 degrees Celsius/min, 7 degrees Celsius/min, 8 degrees Celsius/min, 9 degrees Celsius/min, 10 degrees Celsius/min, 20 degrees Celsius/min, 50 degrees Celsius/min, 100 degrees Celsius/min, 150 degrees Celsius/min, 200 degrees Celsius/min, or more. The temperature of the processing chamber may change at a rate of at most about 200 degrees Celsius/min, 150 degrees Celsius/min, 100 degrees Celsius/min, 50 degrees Celsius/min, 20 degrees Celsius/min, 10 degrees Celsius/min, 9 degrees Celsius/min, 8 degrees Celsius/min, 7 degrees Celsius/min, 6 degrees Celsius/min, 5 degrees Celsius/min, 4 degrees Celsius/min, 3 degrees Celsius/min, 2 degrees Celsius/min, 1 degrees Celsius/min, 0.5 degrees Celsius/min, 0.4 degrees Celsius/min, 0.3 degrees Celsius/min, 0.2 degrees Celsius/min, 0.1 degrees Celsius/min, or less.

In some cases, during sintering the green body comprising the metallic and/or intermetallic particles, the process may comprise holding at a fixed temperature between room temperature and the processing temperature for a time ranging between about 1 min to about 240 min. The sintering process may comprise holding at a fixed temperature for at least about 10 min, 20 min, 30 min, 40 min, 50 min, 60 min, 90 min, 120 min, 150 min, 180 min, 210 min, 240 min, or more. The sintering process may comprise holding at a fixed temperature for at most about 240 min, 210 min, 180 min, 150 min, 120 min, 90 min, 60 min, 50 min, 40 min, 30 min, 20 min, 10 min, 1 min, or less. In some cases, during the sintering process, the temperature may not be held at a processing temperature for an extended period of time (e.g., once a target temperature is reached, the temperature may be reduced). In an example, the sintering process may increase the temperature to a first temperature and immediately (e.g., without holding at the first temperature for a period of time) lower the temperature to a second temperature that is lower than the first temperature.

A green body comprising ceramic particles may be heated from room temperature to a processing temperature ranging between about 900 degrees Celsius to about 2000 degrees Celsius. The processing temperature may be kept constant or substantially constant for a given period of time, or may be adjusted to one or more other temperatures. The processing temperature for sintering the green body (including the particles) may be at least about 900 degrees Celsius, 950 degrees Celsius, 1000 degrees Celsius, 1050 degrees Celsius, 1100 degrees Celsius, 1150 degrees Celsius, 1200 degrees Celsius, 1300 degrees Celsius, 1400 degrees Celsius, 1500 degrees Celsius, 1600 degrees Celsius, 1700 degrees Celsius, 1800 degrees Celsius, 1900 degrees Celsius, 2000 degrees Celsius, or more. The processing temperature for sintering the green body may be at most about 2000 degrees Celsius, 1900 degrees Celsius, 1800 degrees Celsius, 1700 degrees Celsius, 1600 degrees Celsius, 1500 degrees Celsius, 1400 degrees Celsius, 1300 degrees Celsius, 1200 degrees Celsius, 1150 degrees Celsius, 1100 degrees Celsius, 1050 degrees Celsius, 1000 degrees Celsius, 950 degrees Celsius, 900 degrees Celsius, or less.

In an example, a green body comprising alumina particles may be heated from room temperature to a processing temperature ranging between about 1500 degrees Celsius to about 1950 degrees Celsius. In an example, a green body comprising cemented carbide particles may be heated from room temperature to a processing temperature ranging between about 1700 degrees Celsius. In an example, a green body comprising zirconia particles may be heated from room temperature to a processing temperature ranging between about 1100 degrees Celsius.

During sintering the green body comprising the ceramic particles, the temperature of the processing chamber may change at a rate ranging between about 0.1 degrees Celsius per minute (degrees Celsius/min) to about 200 degrees Celsius/min. The temperature of the processing chamber may change at a rate of at least about 0.1 degrees Celsius/min, 0.2 degrees Celsius/min, 0.3 degrees Celsius/min, 0.4 degrees Celsius/min, 0.5 degrees Celsius/min, 1 degrees Celsius/min, 2 degrees Celsius/min, 3 degrees Celsius/min, 4 degrees Celsius/min, 5 degrees Celsius/min, 6 degrees Celsius/min, 7 degrees Celsius/min, 8 degrees Celsius/min, 9 degrees Celsius/min, 10 degrees Celsius/min, 20 degrees Celsius/min, 50 degrees Celsius/min, 100 degrees Celsius/min, 150 degrees Celsius/min, 200 degrees Celsius/min, or more. The temperature of the processing chamber may change at a rate of at most about 200 degrees Celsius/min, 150 degrees Celsius/min, 100 degrees Celsius/min, 50 degrees Celsius/min, 20 degrees Celsius/min, 10 degrees Celsius/min, 9 degrees Celsius/min, 8 degrees Celsius/min, 7 degrees Celsius/min, 6 degrees Celsius/min, 5 degrees Celsius/min, 4 degrees Celsius/min, 3 degrees Celsius/min, 2 degrees Celsius/min, 1 degrees Celsius/min, 0.5 degrees Celsius/min, 0.4 degrees Celsius/min, 0.3 degrees Celsius/min, 0.2 degrees Celsius/min, 0.1 degrees Celsius/min, or less.

In some cases, during sintering the green body comprising the ceramic particles, the process may comprise holding at a fixed temperature between room temperature and the processing temperature for a time ranging between about 1 min to about 240 min. The sintering process may comprise holding at a fixed temperature for at least about 1 min, 10 min, 20 min, 30 min, 40 min, 50 min, 60 min, 90 min, 120 min, 150 min, 180 min, 210 min, 240 min, or more. The sintering process may comprise holding at a fixed temperature for at most about 240 min, 210 min, 180 min, 150 min, 120 min, 90 min, 60 min, 50 min, 40 min, 30 min, 20 min, 10 min, 1 min, or less. In some cases, during the sintering process, the temperature may not be held at a processing temperature for an extended period of time (e.g., once a target temperature is reached, the temperature may be reduced). In an example, the sintering process may increase the temperature to a first temperature and immediately (e.g., without holding at the first temperature for a period of time) lower the temperature to a second temperature that is lower than the first temperature.

During sintering the green body comprising the plurality of particles (e.g. metal, intermetallic, and/or ceramic), the green body may be subjected to cooling by a fluid (e.g., liquid or gas). The fluid may be applied to the green body and/or the processing chamber to decrease the temperature of the green body. The fluid may be subjected to flow upon application of positive or negative pressure. Examples of the fluid for cooling the green body include water, oil, hydrogen, nitrogen, argon, etc. Cooling the green body during the sintering process may control grain size within the sintered body.

In some cases, the resin (e.g., the viscous liquid) may further comprise an extractable material. Accordingly, the method may comprise additional steps of treating the green body prior to subjecting the green body to heating (e.g., sintering).

The extractable material may be soluble in the polymeric precursor and/or dispersed throughout the rein. Accordingly, the method may comprise curing the polymeric precursor of the resin in at least a portion of the resin, thereby creating a first solid phase comprising the polymeric material and a second solid phase comprising the extractable material within the at least the portion of the 3D object. Such method may be a polymerization-induced phase separation (PIPS) process. The plurality of particles (e.g., metallic, intermetallic, and/or ceramic particles) may be encapsulated by the first solid phase comprising the polymeric material. In some cases, the at least the portion of the 3D object may be a green body that can undergo heating to sinter at least a portion of the plurality of particles and burn off at least a portion of other components (i.e., organic components).

In some cases, the extractable material may be soluble in a solvent (e.g., isopropanol). The solvent may be an extraction solvent. A first solubility of the extractable material in the solvent may be higher than a second solubility of the polymeric material in the solvent. The solvent may be a poor solvent for the polymeric material. Accordingly, the method may further comprise (i) treating (e.g., immersed, jetted, etc.) the green body with the solvent (liquid or vapor), (ii) solubilizing and extracting at least a portion of the extractable material from the second solid phase of the green body into the solvent, and (iii) generating one or more pores in the green body. The one or more pores in the green body may be a plurality of pores. In some cases, the method may further comprise treating the green body with the solvent and heat at the same time. The one or more pores may create at least one continuous porous network in the green body. Such process may be a solvent de-binding process.

The solvent for the solvent de-binding process may not significantly swell the polymeric material in the green body. In some cases, the viscous liquid may comprise acrylate-based polymeric precursors. Since acrylate-based polymers are of intermediate polarity, both protic polar solvents (e.g., water and many alcohols such as isopropanol) and non-polar solvents (e.g., heptane) may be used. Examples of the solvent for the solvent de-binding process include water, isopropanol, heptane, limolene, toluene, and palm oil. On the other hand, intermediate polarity solvents (e.g., acetone) may be avoided.

In some cases, the solvent de-binding process may involve immersing the green body in a container comprising the liquid solvent. A volume of the solvent may be at least about 2 times the volume of the green body. The volume of the solvent may be at least about 2, 3, 4, 5, 6, 7, 8, 9, 10 times or more than the volume of the green body. The container comprising the liquid solvent and the green body may be heated to a temperature ranging between about 25 degrees Celsius to about 50 degrees Celsius. The container comprising the liquid solvent and the green body may be heated (e.g., a water bath, oven, or a heating unit from one or more sides of the green body) to a temperature of at least about 25 degrees Celsius, 26 degrees Celsius, 27 degrees Celsius, 28 degrees Celsius, 29 degrees Celsius, 30 degrees Celsius, 35 degrees Celsius, 40 degrees Celsius, 45 degrees Celsius, 50 degrees Celsius, or more. The container comprising the liquid solvent and the green body may be heated to a temperature of at most about 50 degrees Celsius, 45 degrees Celsius, 40 degrees Celsius, 35 degrees Celsius, 30 degrees Celsius, 29 degrees Celsius, 28 degrees Celsius, 27 degrees Celsius, 26 degrees Celsius, 25 degrees Celsius, or less. The solvent de-binding process may last between about 0.1 hours (h) to about 48 h. The solvent de-binding process may last between at least about 0.1 h, 0.2 h, 0.3 h, 0.4 h, 0.5 h, 1 h, 2 h, 3 h, 4 h, 5 h, 6 h, 12 h, 18 h, 24 h, 30 h, 36 h, 42 h, 48 h, or more. The solvent de-binding may last between at most about 48 h, 42 h, 36 h, 30 h, 24 h, 18 h, 12 h, 6 h, 5 h, 4 h, 3 h, 2 h, 1 h, 0.5 h, 0.4 h, 0.3 h, 0.2 h, 0.1 h, or less. After the solvent de-binding process, the solvent may be removed and the green body may be allowed to dry. A weight of the green body may be measured before and after the solvent de-binding to determine the amount of material extracted from the green body.

After the solvent de-binding process, the green body may be heated (e.g., sintered) and/or cooled as abovementioned. During heating (e.g., sintering), at least a portion of the organic components (e.g., the polymeric material, additives, etc.) may decompose and leave the green body in part through the at least one continuous porous network. The presence of the at least one continuous porous network from the solvent de-binding step may improve the speed of the sintering process.

Subsequent to heating the green body, the heated (e.g., sintered) particles as part of a nascent 3D object may be further processed to yield the 3D object. This may include, for example, performing surface treatment, such as polishing, on the nascent 3D object.

FIG. 1 shows an example of a 3D printing system 100. The system 100 includes an open platform 101 comprising a print window 102 to hold a film of a viscous liquid 104, which includes a photoactive resin. The viscous liquid 104 may also include a plurality of particles (e.g., metal, intermetallic, and/or ceramic particles). The system 100 includes a deposition head 105 that comprises a nozzle 107 that is in fluid communication with a source of the viscous liquid 109. The source of the viscous liquid 109 may be a syringe. The syringe may be operatively coupled to a syringe pump. The syringe pump can direct the syringe in a positive direction (from the source of the viscous liquid 109 towards the nozzle 107) to dispense the viscous liquid. The syringe pump can direct the syringe in a negative direction (away from the nozzle 107 towards the source of the viscous liquid 109) to retract any excess viscous liquid in the nozzle and/or on the print window back into the syringe. The deposition head 105 is configured to move across the open platform 101 comprising the print window 102 to deposit the film of the viscous liquid 104. In some cases, the system 100 may comprise an additional source of an additional viscous liquid that is in fluid communication with the nozzle 107 or an additional nozzle of the deposition head 105. In some cases, the system 100 may comprise an additional deposition head comprising an additional nozzle that is in fluid communication with an additional source of an additional viscous liquid. In some cases, the system 100 may comprise three or more deposition heads and three or more sources of the same or different viscous liquids.

Illumination is transmitted through the print window 102 to cure at least a portion of the film of the viscous liquid 104 to print at least a portion of a 3D structure 108. The at least the portion of the 3D structure 108 is shown as a block, however, in practice a wide variety of complicated shapes may be printed. In some cases, the at least the portion of the 3D structure 108 includes entirely solid structures, hollow core prints, lattice core prints, and generative design geometries.

The at least the portion of the 3D structure 108 is printed on a build head 110, which is connected by a rod 112 to one or more 3D printing mechanisms 114. The 3D printing mechanisms 114 may include various mechanical structures for moving the build head 110 in a direction towards and/or away from the open platform 101. This movement is a relative movement, and thus moving pieces can be the build head 110, the open platform 101, or both, in various embodiments. In some cases, the 3D printing mechanisms 114 include Cartesian (xyz) type 3D printer motion systems or delta type 3D printer motion systems. In some cases, the 3D printing mechanisms 114 include one or more controllers to direct movement of the build head 110, the open platform 101, or both.

Multiple devices emitting various wavelengths and/or intensities of light, including a light projection device 126 and light sources 128, may be positioned below the print window 102 and in communication with the one or more controllers. In some cases, the light sources 128 can include at least 2, 3, 4, 5, 6, or more light sources. As an alternative to the light sources 128, a single light source may be used. The light projection device 126 directs a first light having a first wavelength through the print window 102 and into the film of the viscous liquid 104 adjacent to the print window 102. The first wavelength emitted by the light projection device 126 is selected to produce photoinitiation and is used to create at least a portion of the 3D structure on the at least the portion of the 3D structure 108 that is adjacent to the build head 110 by curing the photoactive resin in the film of the viscous liquid 104 within a photoinitiation layer 130. In some cases, the light projection device 126 is utilized in combination with one or more projection optics 132 (e.g. a projection lens for a digital light processing (DLP) device), such that the light output from the light projection device 126 passes through the one or more projection optics 132 prior to illuminating the film of the viscous liquid 104 adjacent to the print window 102.

In some cases, the light projection device 126 is a DLP device including a digital micro-mirror device (DMD) for producing patterned light that can selectively illuminate and cure the photoactive resin in the photoinitiation layer 130. The light projection device 126, in communication with the one or more controllers, may receive instructions defining a pattern of illumination to be projected from the light projection device 126 into the photoinitiation layer 130 to cure a layer of the photoactive resin onto the at least the portion of the 3D structure 108.

The light sources 128 direct a second light having a second wavelength into the film of the viscous liquid 104 adjacent to the open platform 101 comprising the print window 102. The second light may be provided as multiple beams from the light sources 128 through the print window 102 simultaneously. As an alternative, the second light may be generated from the light sources 128 and provided as a single beam through the print window 102. The second wavelength emitted by the light sources 128 is selected to produce photoinhibition in the photoactive resin in the film of the viscous liquid 104 and is used to create a photoinhibition layer 134 within the film of the viscous liquid 104 directly adjacent to the print window 102. The light sources 128 can produce a flood light to create the photoinhibition layer 134, the flood light being a non-patterned, high-intensity light. In some cases, the light sources 128 are light emitting diodes (LEDs) 136. The light sources 128 can be arranged on a light platform 138. The light platform 138 is mounted on adjustable axis rails 140. The adjustable axis rails 140 allow for movement of the light platform 138 along an axis towards or away from the print window 102. The light platform 138 and the one or more projection optics 132 may be moved independently. A relative position of the light platform comprising the light sources may be adjusted to project the second light into the photoinhibition layer 134 at the respective peak intensity and/or in a uniform projection manner. In some cases, the light platform 138 functions as a heat-sink for at least the light sources 128 arranged on the light platform 138.

The respective thicknesses of the photoinitiation layer 130 and the photoinhibition layer 134 may be adjusted by the one or more controllers. In some cases, this change in layer thickness(es) is performed for each new 3D printed layer, depending on the desired thickness of the 3D printed layer, and/or the type of viscous liquid in the film of the viscous liquid 104. The thickness(es) of the photoinitiation layer 130 and the photoinhibition layer 134 may be changed, for example, by changing the intensity of the respective light emitting devices (126 and/or 128), exposure times for the respective light emitting devices, or both. In some cases, by controlling relative rates of reactions between the photoactive species (e.g., at least one photoinitiator and at least one photoinhibitor), the overall rate of curing of the photoactive resin in the photoinitiation layer 130 and/or the photoinhibition layer 134 may be controlled. This process can thus be used to prevent curing from occurring at the film of the viscous liquid-print window interface and control the rate at which curing of the photoactive resin takes place in the direction normal to the film of the photoactive resin-print window interface.

Figure 2:
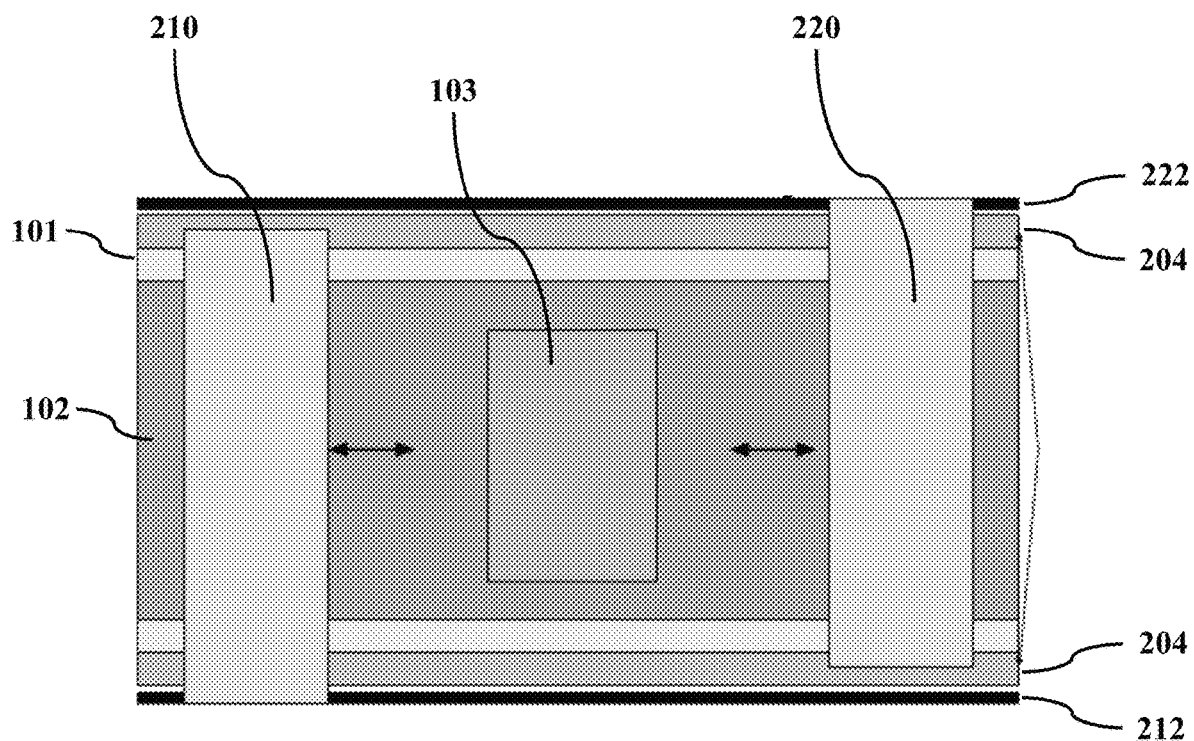
FIG. 2 shows a top-down view of the 3D printing system.

FIG. 2 shows a top-down view of an example of the 3D printing system. The 3D printing system includes the open platform 101 comprising the print window 102. The print window 102 comprises an area 103 that is to be covered by the film of the viscous liquid (not shown in FIG. 2). The 3D printing system includes a first deposition head 210 that is configured to move across the open platform 101 comprising the print window 102. The deposition head 210 is mechanically coupled to a first belt drive motion stage 212 that directs movement of the first deposition head 210. The 3D printing system also includes a second deposition head 220 that is mechanically coupled to a second belt drive motion stage 222 that directs movement of the second deposition head 220 across the open platform 101 comprising the print window 102. The open platform also includes linear bearing rails 204 to help movement of the first deposition head 210 and the second deposition head 220. If the first deposition head 210 is configured to move to a first direction to deposit a film of a first viscous liquid, the second deposition head 220 may be configured to move to a second direction opposite of the first direction to deposit a film of a second viscous liquid. Alternatively or in addition to, the first deposition head 210 may be configured to move to a first direction to deposit a film of a first viscous liquid, and the second deposition head 220 may be configured to also to the first direction to deposit the film of the second viscous liquid. In another example, both the first deposition head 210 and the second deposition head 220 may be configured to deposit a film of the first viscous liquid or the second viscous liquid, respectively, while traveling in either direction over the open platform 101 comprising the print window 102.

Figure 3A:
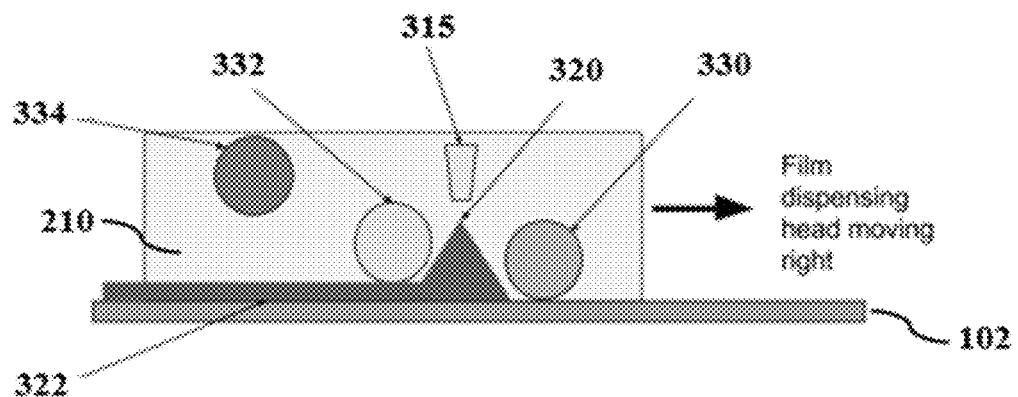
FIG. 3A-3C show different configurations of a deposition head.
Figure 3B:
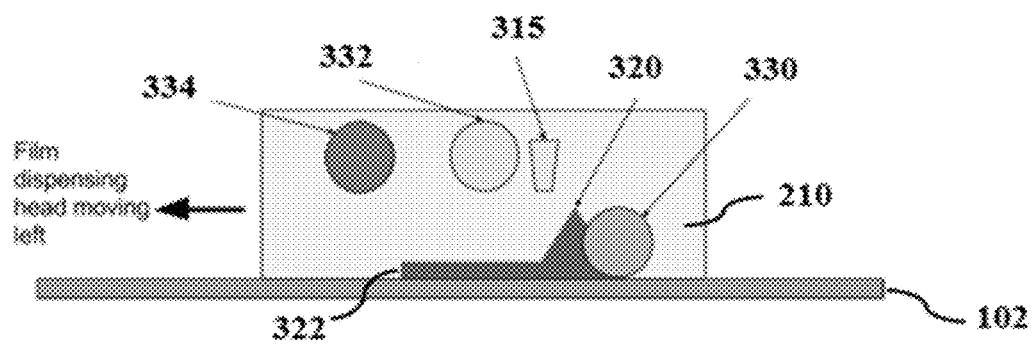
Figure 3C:
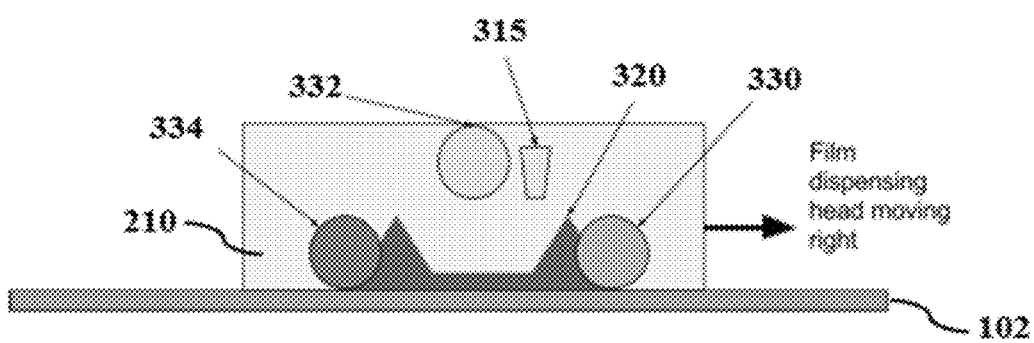

FIG. 3A-3C show an example of a deposition head that is implemented in different configurations. The deposition head 210 is operatively coupled to a controller. The deposition head 210 includes a wiper roller 330 that has a fixed vertical position to remain in contact with the print window 102. The deposition head 210 includes a smoother roller 332 that has an adjustable position (vertical) relative to the print window 102. In some cases, the smoother roller 332 may have an engaged position at a specified distance away from the print window 102, directed by the controller by using a linear actuator. In the engaged position, the smoother roller 332 flattens the viscous liquid into a film of the viscous liquid as it traverses the print window 102. In some cases, the smoother roller 332 may have a disengaged position at a distance sufficiently far from the print window 102 to not interact with any viscous liquid on the print window 102. The deposition head 210 also includes an additional wiper roller 334 that has two positions. In some cases, the additional wiper roller 334 may have an engaged position at a specified distance away from the print window 102, directed by the controller by using an additional linear actuator. In the engaged position, the additional wiper roller 334 is in contact with the print window 102. The additional wiper roller 334 may capture at least a portion of the excess viscous liquid as it traverses the print window 102. In some cases, the additional wiper roller 334 may have a disengaged position at a distance sufficiently far from the print window 102 to not interact with any viscous liquid on the print window 102. Also, the deposition head 210 includes a nozzle 315 that dispenses fresh viscous liquid towards the print window 102 inside the deposition head 210. The nozzle 315 may be configured between the wiper roller 330 and the smoother roller 332.

FIG. 3A shows a configuration of the deposition head 210. The controller is configured to direct the deposition head 210 to move across the open platform 102 towards a first direction to deposit the film of the viscous liquid 322 The controller is programmed to (i) engage the smoother roller 332 towards the print window 102 to a specified distance from the print window 102, (ii) disengage the additional wiper roller 334 away from the print window 102, (iii) direct the nozzle 315 to dispense the viscous liquid 320 to the print window 102, and (iv) direct the deposition head 210 to spread the viscous liquid 320 into the film of the viscous liquid 322 on the print window 102. An average height of the film of the viscous liquid may be substantially the same as the distance between the smoother roller 332 and the print window 102.

FIG. 3B shows another configuration of the deposition head 210. The controller is configured to direct the deposition head 210 to move across the open platform comprising the print window 102 towards a second direction opposite of the first direction. The controller is programmed to (i) disengage the smoother device 332 away from the print window 102, (ii) maintain the additional wiper roller 334 in the disengaged position, (iii) disengage the nozzle 315 from dispensing the viscous liquid 320, and (iv) direct the wiper roller 330 to clean the print window 102 by removing any uncured, excess viscous liquid from the print window 102.

FIG. 3C shows a different configuration of the deposition head 210. The controller is configured to direct the deposition head 210 to move across the open platform comprising the print window 102 towards the first direction. The controller is programmed to (i) engage the additional wiper roller 334 to be in contact with the print window 102, and (ii) direct the additional wiper roller to contain substantially all of the uncured, excess viscous liquid within an area between the additional wipe roller 334 and the wiper roller 330 within the deposition head 210. The deposition head 210 may use at least the collected excess viscous liquid to print a subsequent film of the viscous liquid.

Figure 4A:
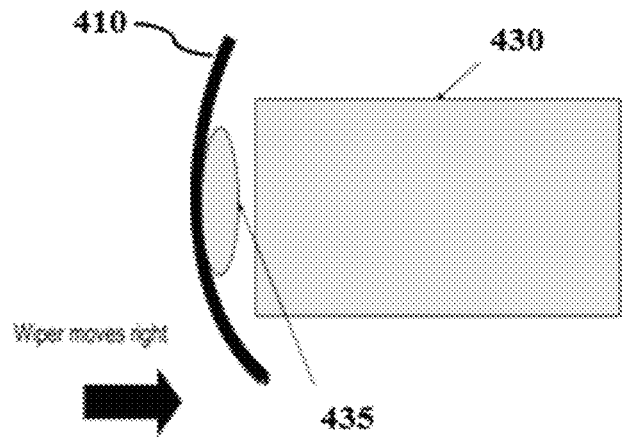
FIGS. 4A and 4B show different shapes of a wiper blade.
Figure 4B:
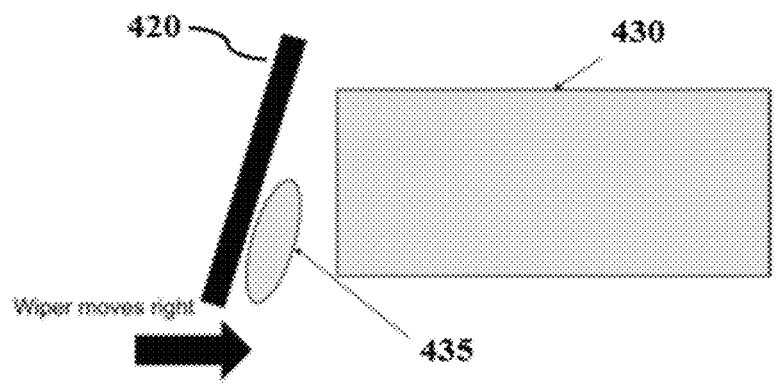

The wiper of the deposition head may be a blade. FIG. 4A-4B show examples of wiper blades 410 and 420 that may be used in the deposition head. When the deposition head is moved across the open platform to collect the uncured, excess viscous liquid 430, the wiper blades that are curved 410 or straight and angled 420 may be advantageous in collecting the excess liquid in a specific location in the deposition head. FIG. 4A shows an example of a curved wiper blade 410 with a radius of curvature of about 100 millimeter (mm) to about 120 mm. As the deposition head comprising the curved wiper blade 410 moves towards the right, the curved wiper blade 410 may concentrate a portion 435 of the excess viscous liquid 430 in the center of the curved wiper blade 410. The curved wiper blade 410 may prevent excess viscous liquid from spilling out around its sides. FIG. 4B shows an example of a straight wiper blade 420 that is angled towards the direction of movement of the deposition head. As the deposition head comprising the straight wiper blade 420 moves towards the right, the straight wiper blade 420 may concentrate the portion 435 of the excess viscous liquid 430 at one end (e.g., the bottom) of the straight wiper blade 420. The straight wiper blade 420 that is angled may concentrate the excess viscous liquid at the bottom so it can be easily removed.

Figure 5A:
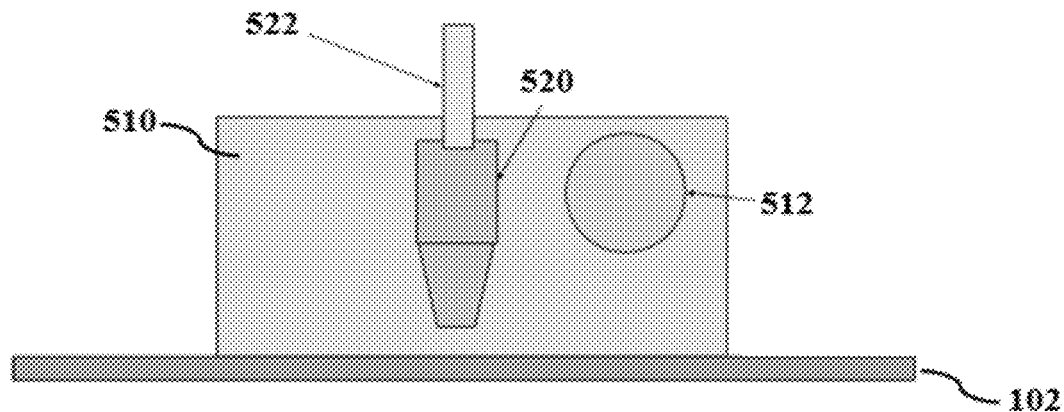
FIG. 5A-5C show different configurations of a deposition head with a slot die.

In some cases, a slot die coater may be used in place of the smoother roller and the nozzle in a deposition head. As shown in FIG. 5A, the deposition head 510 comprises a wiper roller 512 and a slot die 520. The wiper roller 512 is in its disengaged position. A feed line 522 of the slot die 520 may be in fluid communication with a source of the viscous liquid (not shown). The viscous liquid may be fed from the source of the viscous liquid to the slot die 520 by a positive displacement pump or any other pressure devices.

Figure 5B:
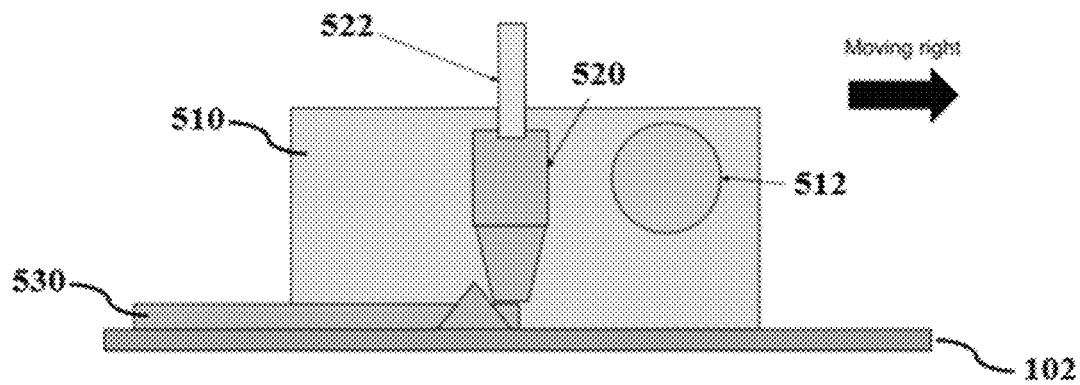

A vertical position of the slot die 520 relative to the print window 102 may be adjusted by an actuator. In some cases, the height of the slot die 520 above the print window 102 may be adjusted in an increment of about 1 micrometer. As shown in FIG. 5B, the deposition head 510 moves to the right and the viscous liquid is fed through the feed line 522, and the slot die 520 may deposit a film of the viscous liquid 530 to its left. The film of the viscous liquid 530 may have a substantially uniform thickness.

Figure 5C:
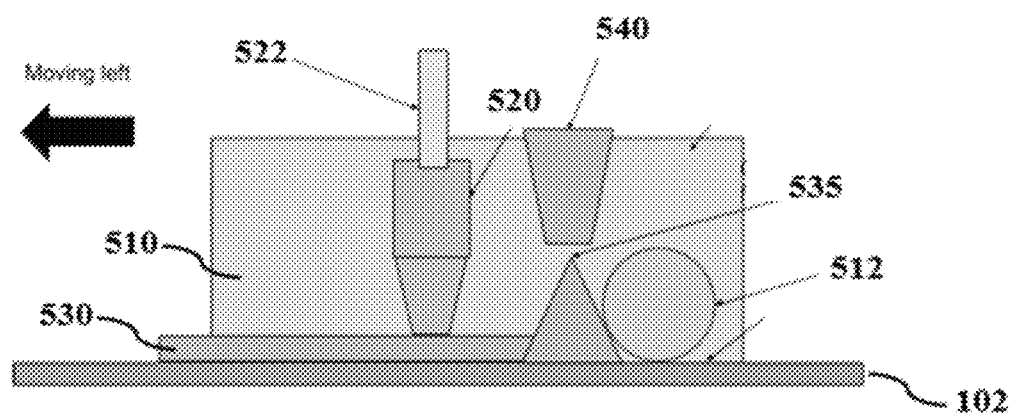

As shown in FIG. 5C, the deposition head comprising the wiper roller 512 and the slot die 520 may also include a suction nozzle 540 configured between the slot die 520 and the wiper roller 512. To recover any excess viscous liquid, a controller operatively coupled to the deposition head 510 may be programmed to (i) engage the wiper roller 512 to be in contact with the print window 102, (ii) direct the deposition head 510 to move to the left, in a direction opposite of the film deposition direction, (iii) use the wiper roller 512 to remove the excess viscous liquid 535 from the print window 102, and (iv) exert a negative pressure to the suction nozzle 540 to vacuum up the excess viscous liquid 535 collected by the wiper roller 512. The excess viscous liquid may be stored, reprocessed, and sent back to the slot die for 3D printing.

Figure 6:
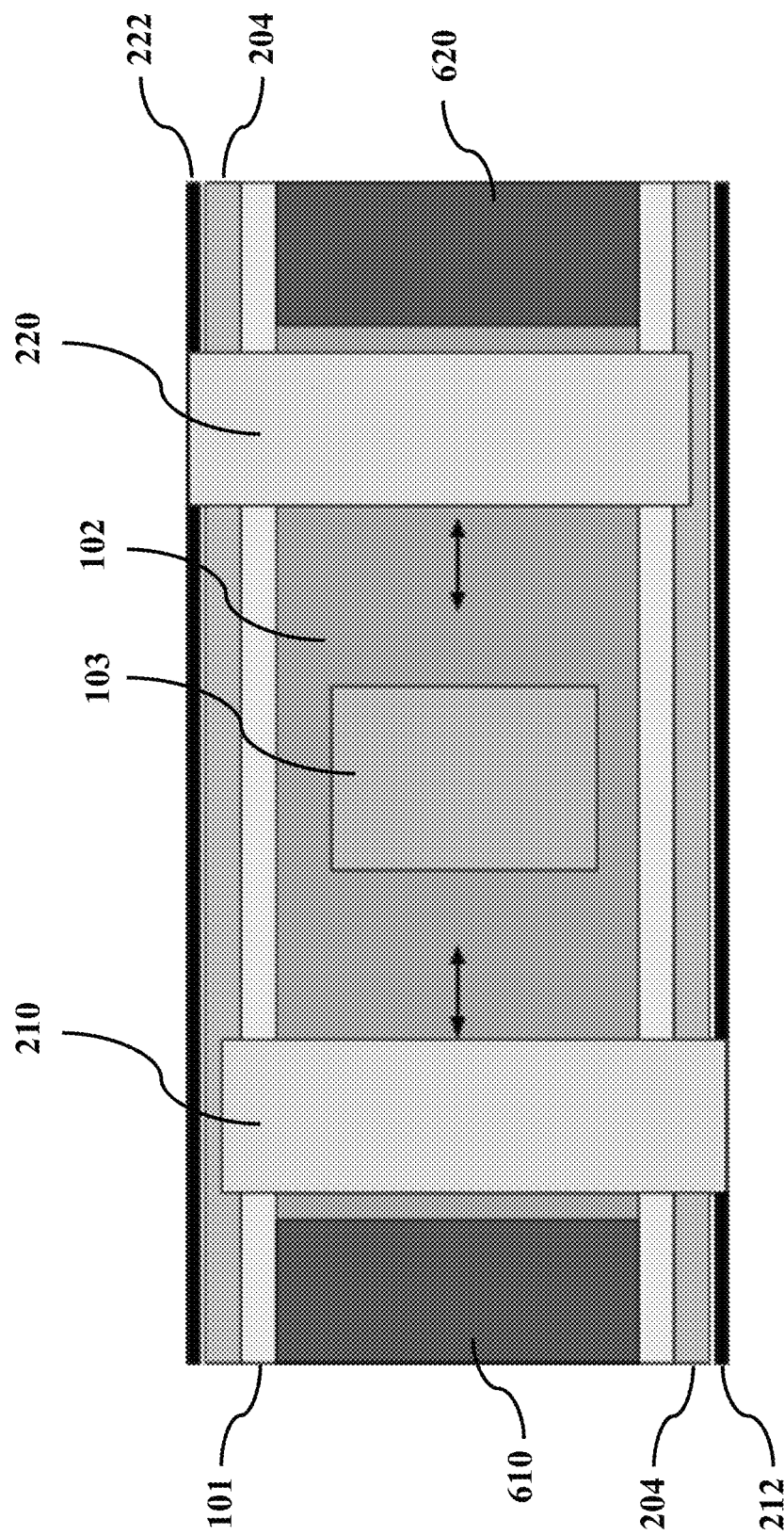
FIG. 6 shows a top-down view of another 3D printing system with two cleaning zones.

Keeping the deposition head clean may provide for reliable printing and reduced wear. Thus, the 3D printing system may include a cleaning zone to clean a deposition head. FIG. 6 shows a top-down view of another example of the 3D printing system with the cleaning zone. The 3D printing system includes the open platform 101 comprising the print window 102. The print window 102 comprises the area 103 that is to be covered by the film of the viscous liquid (not shown in FIG. 6). The 3D printing system includes a first deposition head 210 that is configured to move across the open platform 101 comprising the print window 102. The deposition head 210 is mechanically coupled to the first belt drive motion stage 212 that directs movement of the first deposition head 210. The 3D printing system also includes the second deposition head 220 that is mechanically coupled to the second belt drive motion stage 222 that directs movement of the second deposition head 220 across the open platform 101 comprising the print window 102. The open platform also includes linear bearing rails 204 to help movement of the first deposition head 210 and the second deposition head 220. Furthermore, the 3D printing system includes a first cleaning zone 610 adjacent to the open platform 101 to clean the deposition head 210, and a second cleaning zone 620 adjacent to the open platform 101 to clean the deposition head 220.

Figure 7A:
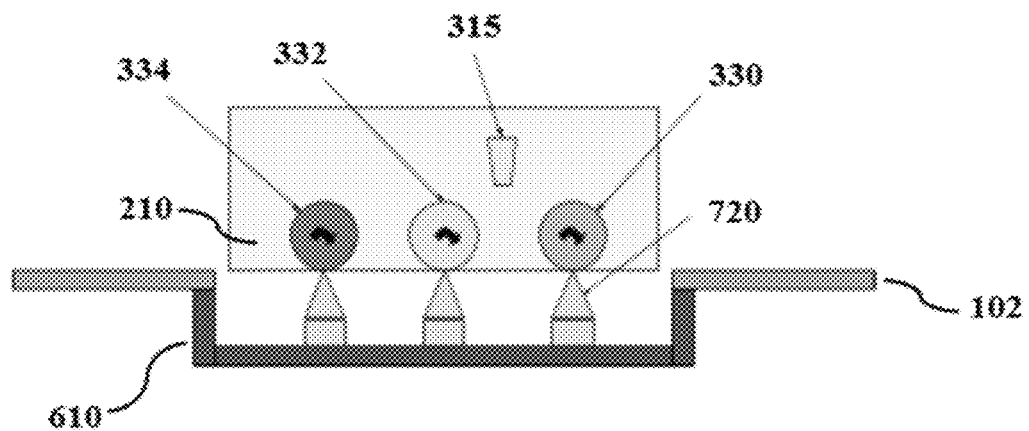
FIG. 7A-7C show different configurations of the cleaning zone.
Figure 7B:
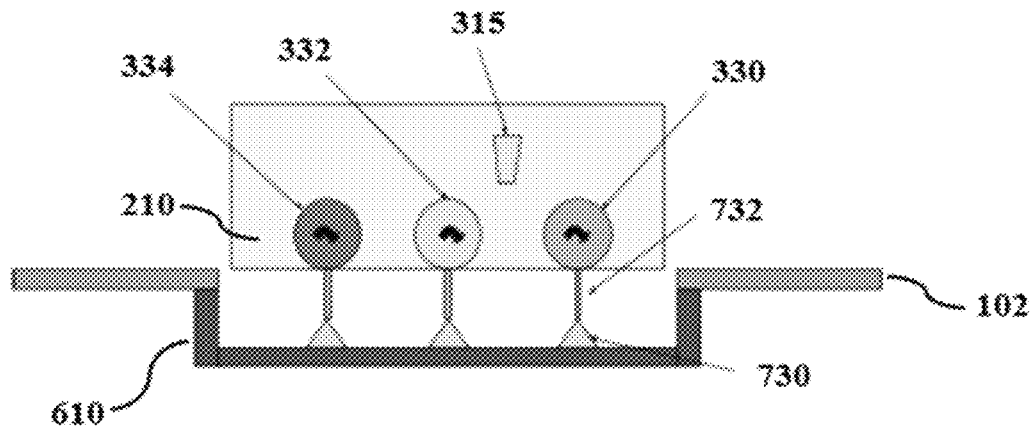
Figure 7C:
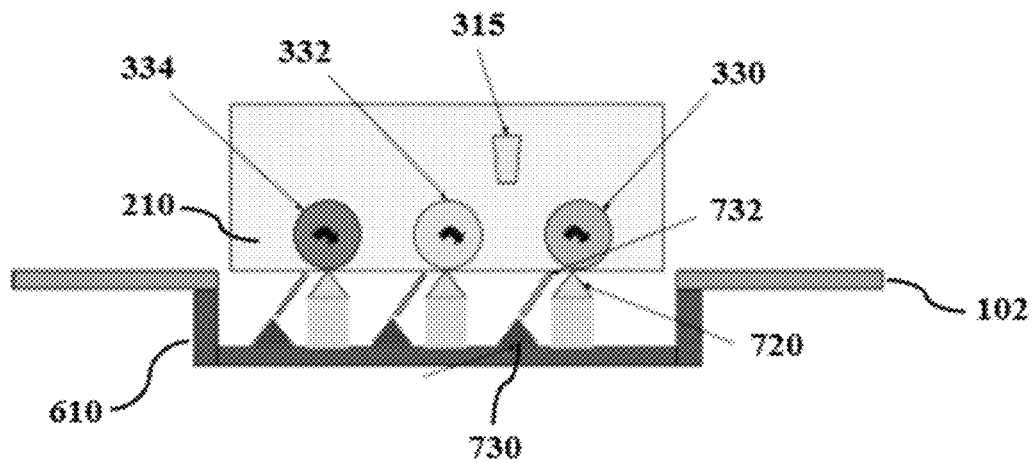

As shown in FIG. 7A, the cleaning zone 610 may comprise doctor blades 720. The deposition head 210 may travel to the cleaning zone 610, and direct the wiper roller 330, the smoother roller 332, and the additional wiper roller 334 (herein referred to as the three rollers 330, 332, and 334) to their engaged positions. When the three rollers 330, 332, and 334 come in contact with the doctor blades 720 of the cleaning zone 610, the three rollers 330, 332, and 334 may rotate to remove any excess resin on the surface. In some cases, as shown in FIG. 7B, the cleaning zone 610 may instead comprise nozzles 730 that jet a cleaning solvent 732 to the three rollers 330, 332, and 334 to remove any excess resin. The nozzles 730 of the cleaning zone 610 may also jet the cleaning solvent to the nozzle 315 of the deposition head 210 to clean the nozzle 315. Alternatively or in addition to, the nozzle 315 may also be in fluid communication with a reservoir of a cleaning solvent. When the deposition head 210 is stationed in the cleaning zone 610, the nozzle 315 may be purged with the cleaning solvent, resulting in dispensing the cleaning solvent into the cleaning zone 610. In some cases, as shown in FIG. 7C, the cleaning zone 610 may include both the doctor blades 720 and the nozzles 730 that jet the cleaning solvent 732 to the three rollers 330, 332, and 334.

Alternatively or in addition to, other options for cleaning the deposition head may include: (1) an ultrasonic device to dislodge excess viscous liquid from the rollers; (2) an ultrasonic bath with the cleaning solvent; (3) purging viscous liquid lines with paraffin wax; and (4) compressed air to dislodge excess viscous liquid from the rollers and dry the rollers.

Figure 8:
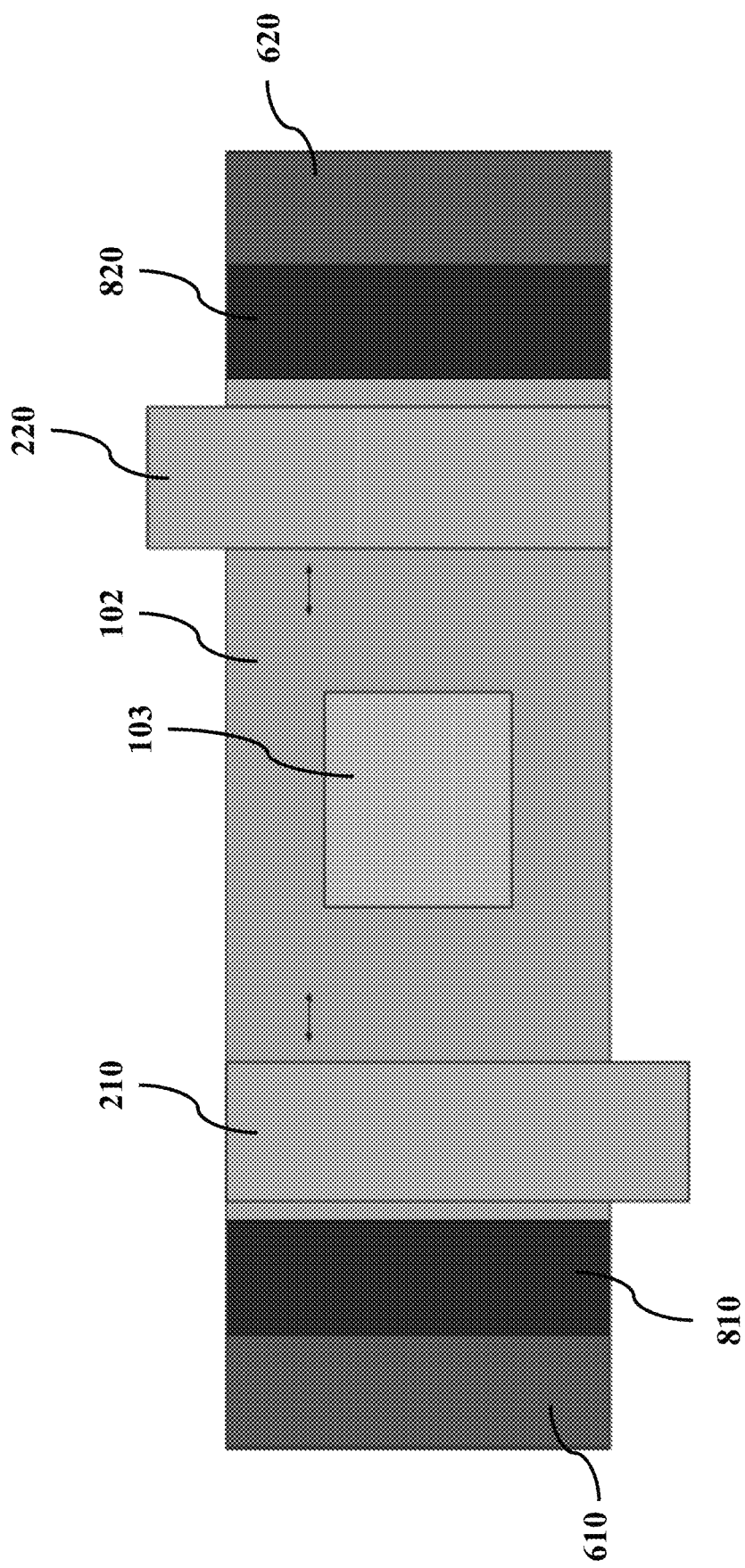
FIG. 8 shows a top-down view of a different 3D printing system with two containers.

In some cases, the system may include a container (a resin recycling bin) adjacent to the open platform to store any viscous liquid that is collected by the deposition head. FIG. 8 shows a top-down view of an example of the 3D printing system with the container. The 3D printing system includes the open platform comprising the print window 102. The print window 102 comprises the area 103 that is to be covered by the film of the viscous liquid (not shown in FIG. 8). The 3D printing system includes a first deposition head 210 that is configured to move across the print window 102. The 3D printing system also includes the second deposition head 220 that is configured to move across the print window 102. The 3D printing system also includes the first cleaning zone 610 and the second cleaning zone 620 adjacent to the open platform 101 to clean the deposition heads 210 and 220, respectively. Furthermore, the 3D printing system includes a first container 810 configured between the cleaning zone 610 and the print window 102 to store any viscous liquid that is collected by the deposition head 210. The 3D printing system also includes a second container 820 configured between the cleaning zone 620 and the print window 102 to store any viscous liquid that is collected by the deposition head 220.

In some cases, the 3D printing system includes a sensor to detect print failure. The sensor may be an optical profilometer (e.g., an in-line profilometer). After printing a layer of the 3D object, the sensor may scan the remaining portion of the film of the viscous liquid. By comparing an image of the remaining portion of the film of the viscous liquid and the computer model of the 3D object based on a computer aided design (CAD), a controller operatively coupled to the sensor is able to detect if any cured material remains on the print window. If any cured material on the print window is detected, the controller may halt the printing process. Alternatively or in addition to, the sensor may provide uniformity of the thickness of the deposited film of the viscous liquid. If the sensor detects a film that is out of tolerance (e.g., too thick, too thin, voids, lumps, etc), the controller operatively coupled to the sensor may direct the deposition head to clean the print window and re-deposit the film of the viscous liquid.

Figure 9:
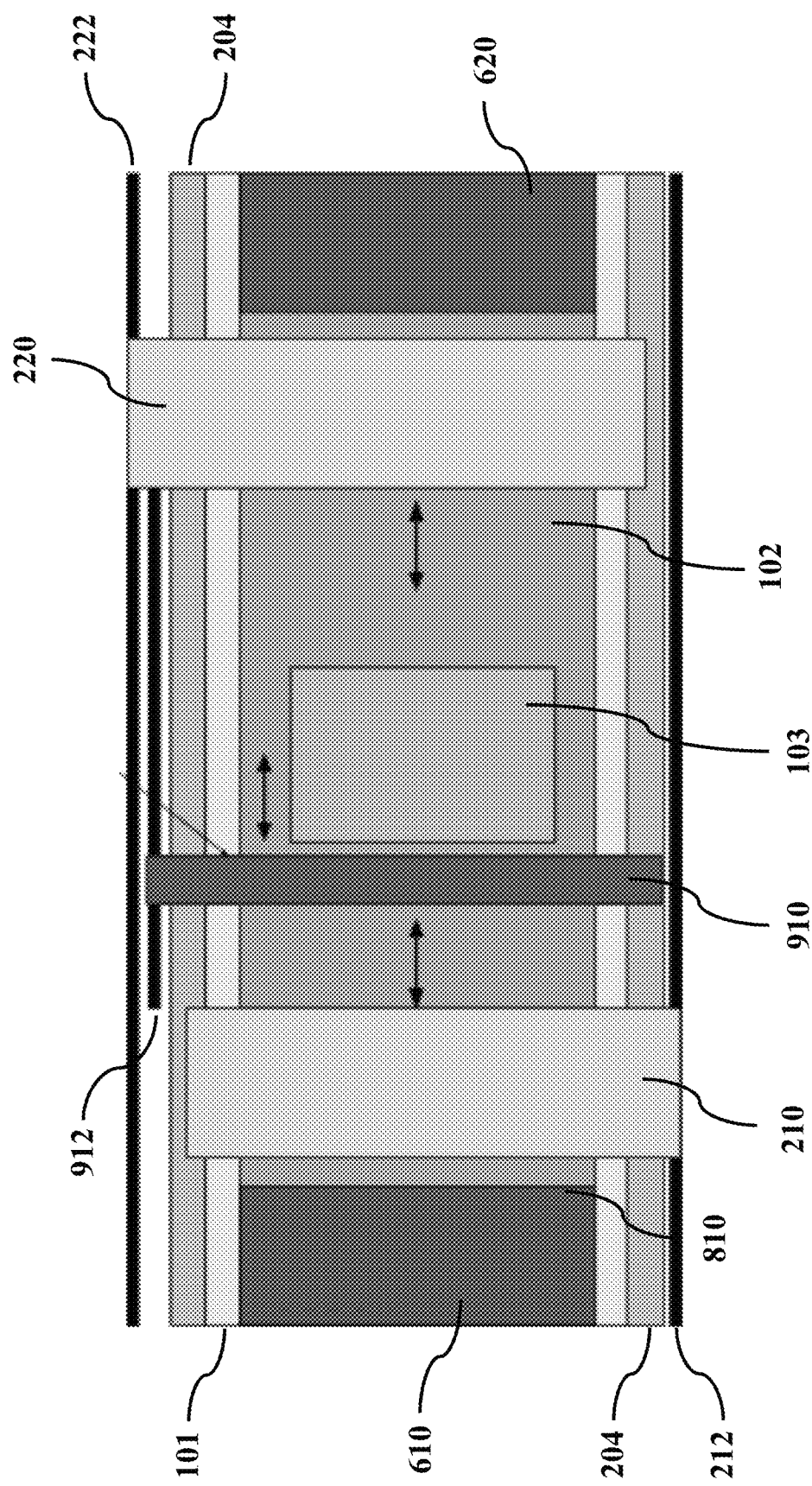
FIG. 9 shows a top-down view of another different 3D printing system with a sensor.

FIG. 9 shows a top down view of the 3D printing system comprising the in-line profilometer 910 mechanically coupled to a belt drive motion stage 912 that directs movement of the in-line profilometer 910 across the print window 102. The 3D printing system includes the open platform 101 comprising the print window 102. The print window 102 comprises the area 103 that is to be covered by the film of the viscous liquid. The 3D printing system includes the first deposition head 210 that is configured to move across the open platform 101 comprising the print window 102. The deposition head 210 is mechanically coupled to the first belt drive motion stage 212 that directs movement of the first deposition head 210. The 3D printing system also includes the second deposition head 220 that is mechanically coupled to the second belt drive motion stage 222 that directs movement of the second deposition head 220 across the open platform 101 comprising the print window 102. The open platform also includes linear bearing rails 204 to help movement of the first deposition head 210 and the second deposition head 220. Furthermore, the 3D printing system includes the first cleaning zone 610 and the second cleaning zone 620 adjacent to the open platform 101 to clean the deposition head 210 and the deposition head 220 respectively.

Computer Systems

The present disclosure provides computer systems that are programmed to implement methods of the disclosure. Computer systems of the present disclosure may be used to regulate various operations of 3D printing, such as providing a film of a viscous liquid adjacent to an open platform and directing an optical source to provide light to the viscous liquid to cure at least a portion of the viscous liquid.

Figure 10:
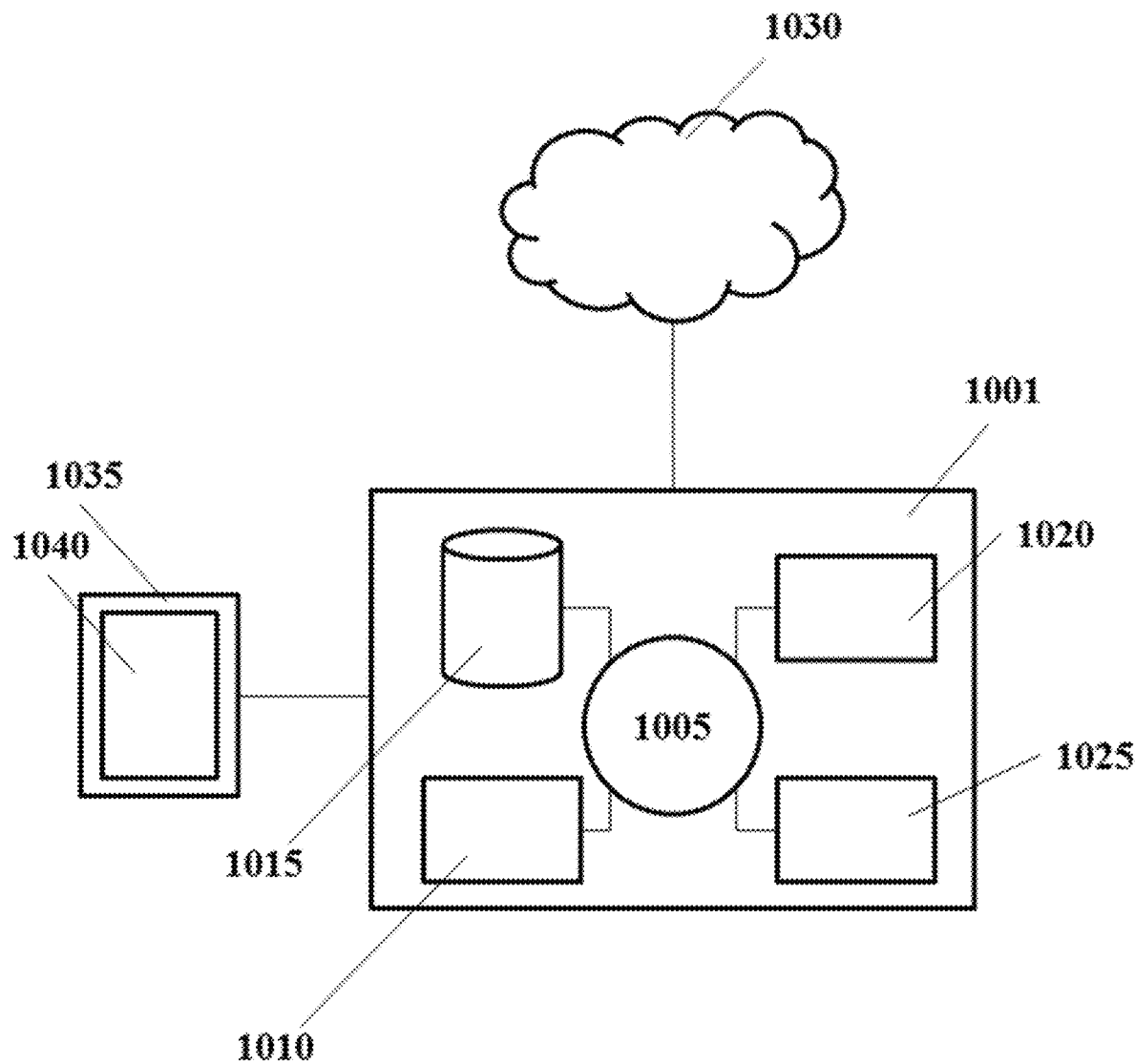
FIG. 10 shows a computer system that is programmed or otherwise configured to implement methods provided herein.

FIG. 10 shows a computer system 1001 that is programmed or otherwise configured to communicate with and regulate various aspects of a 3D printer of the present disclosure. The computer system 1001 can communicate with the light sources, build head, one or more deposition heads, or one or more sources of one or more viscous liquids of the present disclosure. The computer system 1001 may also communicate with the 3D printing mechanisms or one or more controllers of the present disclosure. The computer system 1001 can be an electronic device of a user or a computer system that is remotely located with respect to the electronic device. The electronic device can be a mobile electronic device.

The computer system 1001 includes a central processing unit (CPU, also "processor" and "computer processor" herein) 1005, which can be a single core or multi core processor, or a plurality of processors for parallel processing. The computer system 1001 also includes memory or memory location 1010 (e.g., random-access memory, read-only memory, flash memory), electronic storage unit 1015 (e.g., hard disk), communication interface 1020 (e.g., network adapter) for communicating with one or more other systems, and peripheral devices 1025, such as cache, other memory, data storage and/or electronic display adapters. The memory 1010, storage unit 1015, interface 1020 and peripheral devices 1025 are in communication with the CPU 1005 through a communication bus (solid lines), such as a motherboard. The storage unit 1015 can be a data storage unit (or data repository) for storing data. The computer system 1001 can be operatively coupled to a computer network ("network") 1030 with the aid of the communication interface 1020. The network 1030 can be the Internet, an internet and/or extranet, or an intranet and/or extranet that is in communication with the Internet. The network 1030 in some cases is a telecommunication and/or data network. The network 1030 can include one or more computer servers, which can enable distributed computing, such as cloud computing. The network 1030, in some cases with the aid of the computer system 1001, can implement a peer-to-peer network, which may enable devices coupled to the computer system 1001 to behave as a client or a server.

The CPU 1005 can execute a sequence of machine-readable instructions, which can be embodied in a program or software. The instructions may be stored in a memory location, such as the memory 1010. The instructions can be directed to the CPU 1005, which can subsequently program or otherwise configure the CPU 1005 to implement methods of the present disclosure. Examples of operations performed by the CPU 1005 can include fetch, decode, execute, and writeback.

The CPU 1005 can be part of a circuit, such as an integrated circuit. One or more other components of the system 1001 can be included in the circuit. In some cases, the circuit is an application specific integrated circuit (ASIC).

The storage unit 1015 can store files, such as drivers, libraries and saved programs. The storage unit 1015 can store user data, e.g., user preferences and user programs. The computer system 1001 in some cases can include one or more additional data storage units that are external to the computer system 1001, such as located on a remote server that is in communication with the computer system 1001 through an intranet or the Internet.

The computer system 1001 can communicate with one or more remote computer systems through the network 1030. For instance, the computer system 1001 can communicate with a remote computer system of a user. Examples of remote computer systems include personal computers (e.g., portable PC), slate or tablet PC's (e.g., Apple® iPad, Samsung® Galaxy Tab), telephones, Smart phones (e.g., Apple® iPhone, Android-enabled device, Blackberry®), or personal digital assistants. The user can access the computer system 1001 via the network 1030.

Methods as described herein can be implemented by way of machine (e.g., computer processor) executable code stored on an electronic storage location of the computer system 1001, such as, for example, on the memory 1010 or electronic storage unit 1015. The machine executable or machine readable code can be provided in the form of software. During use, the code can be executed by the processor 1005. In some cases, the code can be retrieved from the storage unit 1015 and stored on the memory 1010 for ready access by the processor 1005. In some situations, the electronic storage unit 1015 can be precluded, and machine-executable instructions are stored on memory 1010.

The code can be pre-compiled and configured for use with a machine having a processor adapted to execute the code, or can be compiled during runtime. The code can be supplied in a programming language that can be selected to enable the code to execute in a pre-compiled or as-compiled fashion.

Aspects of the systems and methods provided herein, such as the computer system 1001, can be embodied in programming. Various aspects of the technology may be thought of as "products" or "articles of manufacture" typically in the form of machine (or processor) executable code and/or associated data that is carried on or embodied in a type of machine readable medium. Machine-executable code can be stored on an electronic storage unit, such as memory (e.g., read-only memory, random-access memory, flash memory) or a hard disk. "Storage" type media can include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer into the computer platform of an application server. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to non-transitory, tangible "storage" media, terms such as computer or machine "readable medium" refer to any medium that participates in providing instructions to a processor for execution.

Hence, a machine readable medium, such as computer-executable code, may take many forms, including but not limited to, a tangible storage medium, a carrier wave medium or physical transmission medium. Non-volatile storage media include, for example, optical or magnetic disks, such as any of the storage devices in any computer(s) or the like, such as may be used to implement the databases, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a ROM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a processor for execution.

The computer system 1001 can include or be in communication with an electronic display 1035 that comprises a user interface (UI) 1040 for providing, for example, (i) activate or deactivate a 3D printer for printing a 3D object, (ii) determining when to clean the deposition head, or (iii) determine any defects in the film of the viscous liquid. Examples of UI's include, without limitation, a graphical user interface (GUI) and web-based user interface.

Methods and systems of the present disclosure can be implemented by way of one or more algorithms. An algorithm can be implemented by way of software upon execution by the central processing unit 1005. The algorithm can, for example, determine a volume of the viscous liquid that must be dispensed into a pool of excess viscous liquid for a subsequent printing step.

Examples

Examples of viscous liquid compositions comprising a photoactive resin and metal particles are provided in Tables 1 and 2.

TABLE 1

| Type | Components | Parts by weight |
|---|---|---|
| Monomer | Sartomer SR339 | 2.30 |
| Monomer | Sartomer SR833s | 11.51 |
| Photoinitiator | camphorquinone | 0.23 |
| Co-initiator | ethyldimethylamino benzoate | 0.14 |
| Photoinhibitor | 2,2',4-Tris(2-chlorophenyl)-5-(3,4-dimethoxyphenyl)-4',5'-diphenyl-1,1'-biimidazole | 0.23 |
| UV Absorber | 2-(2H-Benzotriazol-2-yl)-4,6-bis(2-methyl-2-butanyl)phenol | 0.52 |
| Steric anti-settling additive | Byk Ceraflour 929 | 5.14 |
| Metal | LPW-316-AAJM (316L stainless steel particles) | 79.92 |

TABLE 2

| Type | Components | Parts by weight |
|---|---|---|
| Monomer | Sartomer SR339 | 2.75 |
| Monomer | Allnex Ebecryl 130 | 10.98 |
| Photoinitiator | camphorquinone | 0.27 |
| Co-initiator | ethyldimethylamino benzoate | 0.17 |
| Photoinhibitor | 2,2',4-Tris(2-chlorophenyl)-5-(3,4-dimethoxyphenyl)-4',5'-diphenyl-1,1'-biimidazole | 0.27 |
| UV Absorber | Everlight Eversorb 40 | 0.48 |
| Flow additive | Evonik Tegorad 2500 | 0.01 |
| Steric anti-settling additive | Byk Ceraflour 929 | 5.14 |
| Metal | LPW-316-AAJM (316L stainless steel particles) | 79.93 |

Examples of viscous liquid compositions comprising a photoactive resin and ceramic particles are provided in Tables 3 and 4.

TABLE 3

| Type | Components | Parts by weight |
|---|---|---|
| Monomer 1 | Sartomer SR531 | 11.11 |
| Oligomer 2 | Sartomer SR368 | 6.67 |
| Oligomer 3 | Allnex Ebecryl 8311 | 4.67 |
| Dispersing aid | Gelest MCR17 | 0.07 |
| Photoinitiator | camphorquinone | 0.44 |
| Co-initiator | ethyldimethylamino benzoate | 0.27 |
| Photoinhibitor | 2,2',4-Tris(2-chlorophenyl)-5-(3,4-dimethoxyphenyl)-4',5'-diphenyl-1,1'-biimidazole | 0.44 |
| UV Absorber | 2-(2H-benzotriazol-2-yl)-4,6-ditertpentylphenol | 0.48 |
| Visible Absorber | Quinoline Yellow | 0.01 |
| Silica particles | Novum glass I-1-38 | 75.84 |

TABLE 4

| Type | Components | Parts by weight |
|---|---|---|
| Monomer 1 | Sartomer SR531 | 11.32 |
| Oligomer 1 | Sartomer SR368 | 6.72 |
| Oligomer 2 | Allnex Ebecryl 8311 | 4.90 |
| Photoinitiator | camphorquinone | 0.43 |
| Co-initiator | ethyldimethylamino benzoate | 0.44 |
| Photoinhibitor | 2,2',4-Tris(2-chlorophenyl)-5-(3,4-dimethoxyphenyl)-4',5'-diphenyl-1,1'-biimidazole | 0.27 |
| UV Absorber | 2-(2H-benzotriazol-2-yl)-4,6-ditertpentylphenol | 0.44 |
| Visible Absorber | Quinoline Yellow | 0.48 |
| Silica particles | Novum glass I-1-38 | 37.01 |
| Alumina particles | $Al_2O_3$ | 39.35 |

While preferred embodiments of the present invention have been shown and described herein, it will be obvious to those skilled in the art that such embodiments are provided by way of example only. It is not intended that the invention be limited by the specific examples provided within the specification. While the invention has been described with reference to the aforementioned specification, the descriptions and illustrations of the embodiments herein are not meant to be construed in a limiting sense. Numerous variations, changes, and substitutions will now occur to those skilled in the art without departing from the invention. Furthermore, it shall be understood that all aspects of the invention are not limited to the specific depictions, configurations or relative proportions set forth herein which depend upon a variety of conditions and variables. It should be understood that various alternatives to the embodiments of the invention described herein may be employed in practicing the invention. It is therefore contemplated that the invention shall also cover any such alternatives, modifications, variations or equivalents. It is intended that the following claims define the scope of the invention and that methods and structures within the scope of these claims and their equivalents be covered thereby.

What is claimed is:

1. A system for printing a three-dimensional (3D) object, comprising:
    a print head comprising a nozzle and a flattener adjacent to a surface that is transparent or semi-transparent, wherein said print head is configured to move across said surface, and wherein said nozzle is in fluid communication with a source of a viscous liquid comprising a photoactive resin;
    an optical source configured to provide light that is directed through said surface; and
    a controller operatively coupled to said print head and said optical source, wherein said controller is configured to:
        (a) while said print head is moving across said surface, direct dispensing of said viscous liquid through said nozzle to deposit a film of said viscous liquid over said surface, wherein said flattener comes in contact with said film of said viscous liquid subsequent to said deposition; and
        (b) direct said optical source to provide said light that is directed through said surface to said film to cure said photoactive resin in at least a portion of said film.

2. The system of claim 1, wherein said flattener is movable along a direction towards or away from said surface.

3. The system of claim 1, wherein said flattener comprises a wiper.

4. The system of claim 3, wherein said wiper is a blade, a roller, or a rod.

5. The system of claim 1, wherein said flattener is further configured to (i) reduce or inhibit flow of said viscous liquid out of said print head, or (ii) remove any excess of said viscous liquid.

6. The system of claim 5, wherein said flattener is configured to come in contact with said surface to (i) reduce or inhibit said flow of said viscous liquid out of said print head, or (ii) remove said excess of said viscous liquid.

7. The system of claim 5, wherein said flattener or an additional flattener is configured to direct at least a portion of said excess of said viscous liquid to said surface.

8. The system of claim 1, wherein said flattener is disposed at a distance away from said surface, such that a thickness of said film of said viscous liquid is substantially the same as said distance between said flattener and said surface.

9. The system of claim 1, further comprising a motion stage coupled to said print head, wherein said motion stage is configured to direct movement of said print head across said surface.

10. The system of claim 1, further comprising a build head configured to move along a direction away from said surface during printing of at least a portion of said 3D object, wherein said build head is configured to support said at least said portion of said 3D object.

11. The system of claim 1, further comprising an additional print head comprising an additional nozzle, which said additional nozzle is in fluid communication with an additional source of an additional viscous liquid, wherein said additional print head is configured to move across said surface and used to deposit a film of said additional viscous liquid over said surface.

12. The system of claim 1, wherein said light of said optical source comprises a first wavelength sufficient for curing said photoactive resin in a first portion of said film of said viscous liquid, wherein said optical source is further configured to provide an additional light having a second wavelength sufficient for inhibiting curing of said photoactive resin in a second portion of said film of said viscous liquid, and wherein said first wavelength and said second wavelength are different.

13. The system of claim 1, wherein said light of said optical source comprises a first wavelength sufficient for curing said photoactive resin in a first portion of said film of said viscous liquid, wherein said system further comprises an additional optical source configured to provide an additional light having a second wavelength sufficient for inhibiting curing of said photoactive resin in a second portion of said film of said viscous liquid, and wherein said first wavelength and said second wavelength are different.

14. The system of claim 1, wherein said surface is part of a print window or a transparent film.

15. The system of claim 1, wherein said surface is part of an open platform that is movable.

16. A system for printing a three-dimensional (3D) object, comprising:
a print head having a housing comprising a nozzle and a wiper, wherein said print head is configured to (i) move over a surface that is part of a print window, or a transparent or a semi-transparent film, and (ii) dispense a resin through said nozzle to said surface, wherein said resin comprises a polymeric precursor configured to form a polymeric material;
an optical source configured to provide light to cause formation of said polymeric material from at least said polymeric precursor; and
a controller operatively coupled to said deposition head and said optical source, wherein said controller is configured to:
(a) direct said print head to move over said surface;
(b) while said print head is moving over said surface, direct dispensing of said resin from said nozzle to said surface; and
(c) direct said optical source to provide said light directed through said surface to said resin dispensed over said surface to cause formation of said polymeric material from at least said polymeric precursor,
wherein said wiper (i) distributes said resin subsequent to said resin being dispensed to said surface, or (ii) removes an excess of said resin subsequent to said light being directed to said resin.

17. The system of claim 16, wherein said wiper is disposed at a distance away from said surface to distribute said resin subsequent to said resin being dispensed to said surface.

18. The system of claim 16 wherein said wiper is in contact with said surface to remove said excess of said resin subsequent to said light being directed to said resin.

19. The system of claim 16, wherein said wiper is movable along a direction towards or away from said surface.

20. The system of claim 16, wherein said wiper is a blade, a roller, or a rod.

21. The system of claim 16, further comprising a build head configured to move along a direction away from said surface during printing of at least a portion of said 3D object, wherein said build head is configured to support said at least said portion of said 3D object.

22. The system of claim 16, wherein said surface is part of an open platform that is movable.

23. The system of claim 16, wherein said polymeric precursor comprises (i) monomers configured to polymerize to form said polymeric material, or (ii) oligomers configured to cross-link to form said polymeric material.

24. The system of claim 16, wherein said resin further comprises (i) a photoinitiator configured to initiate formation of said polymeric material from said polymeric precursor, and (ii) a photoinhibitor configured to inhibit formation of said polymeric material from said polymeric precursor.

25. The system of claim 16, wherein said resin further comprises a plurality of particles for forming at least a portion of said 3D object.

26. The system of claim 25, wherein said plurality of particles comprises at least one metal particle or at least one ceramic particle.

27. The system of claim 25, further comprising a heating unit configured to supply heat that is directed to at least a portion of said plurality of particles, wherein said heat is sufficient to sinter said at least said portion of said plurality of particles.

28. The system of claim 16, wherein said resin further comprises an extractable material that is soluble in a solvent, wherein a first solubility of said extractable material in said solvent is higher than a second solubility of said polymeric material in said solvent.

29. The system of claim 28, wherein, in (b), said light causes formation of (i) a first solid phase comprising said polymeric material, and (ii) a second solid phase comprising said extractable material, and wherein said system further comprises a source of said solvent, wherein said solvent is sufficient to extract said extractable material from said second solid phase.

30. The system of claim 1, wherein said controller is configured to direct dispensing of said viscous liquid through said nozzle while said nozzle is moving across said surface, to deposit said film of said viscous liquid over said surface.

31. The system of claim 16, wherein said controller is configured to direct dispensing of said resin from said nozzle to said surface while said nozzle is moving across said surface.

\* \* \* \* \*